United States Patent
Watkins

[11] Patent Number: 5,816,354
[45] Date of Patent: Oct. 6, 1998

[54] SINGLE TRACK VEHICLE

[76] Inventor: Jonathan Watkins, 3740 Blue Bird Canyon Rd., Vista, Calif. 92084-7432

[21] Appl. No.: 331,082

[22] Filed: Oct. 28, 1994

Related U.S. Application Data

[63] Continuation-in-part of Ser. No. 105,973, Aug. 11, 1993, Pat. No. 5,628,379, which is a continuation-in-part of Ser. No. 619,014, Nov. 28, 1990, Pat. No. 5,257,671.

[51] Int. Cl.$^6$ ..................................................... B62D 61/04
[52] U.S. Cl. .............................. 180/209; 74/560; 180/21; 280/293
[58] Field of Search ................................. 180/209, 24.01, 180/21, 219, 24.03, 22, 408, 411; 280/98, 99, 102, 755, 765.1, 767, 293, 294, 297, 301; 74/560, 561

[56] References Cited

U.S. PATENT DOCUMENTS

| | | |
|---|---|---|
| 54,706 | 5/1866 | Fasig . |
| 1,336,823 | 8/1920 | Dessaules ................................. 180/209 |
| 1,501,304 | 7/1924 | Boehm . |
| 1,730,282 | 10/1929 | McClure et al. . |
| 1,802,050 | 4/1931 | Duresen . |
| 1,858,743 | 5/1932 | Langstreth . |
| 2,526,263 | 10/1950 | Neal . |
| 2,530,041 | 11/1950 | Bennett ................................. 180/24.01 |
| 3,236,323 | 2/1966 | Austin . |
| 3,242,763 | 3/1966 | Buchwald ................................. 74/560 |
| 3,362,726 | 1/1968 | Bell ......................................... 180/209 |
| 3,700,059 | 10/1972 | Sutton . |
| 3,980,150 | 9/1976 | Gigli . |
| 4,133,402 | 1/1979 | Soo Hoo . |
| 4,293,052 | 10/1981 | Daswick et al. . |
| 4,313,511 | 2/1982 | Soo Hoo . |
| 4,513,837 | 4/1985 | Archer . |
| 4,691,798 | 9/1987 | Engelbach . |
| 4,700,962 | 10/1987 | Salmon . |
| 4,759,421 | 7/1988 | Brandli ................................... 180/209 |
| 5,029,894 | 7/1991 | Willman . |
| 5,048,864 | 9/1991 | Geiger . |
| 5,181,740 | 1/1993 | Horn . |
| 5,325,935 | 7/1994 | Hirooka et al. .......................... 180/140 |

FOREIGN PATENT DOCUMENTS

| | | |
|---|---|---|
| 1166804 | 6/1958 | France . |
| 2717592 | 11/1977 | Germany . |
| 2830465 | 2/1979 | Germany ............................... 180/209 |
| 2114076 | 4/1990 | Japan . |
| 144846 | 6/1920 | United Kingdom . |
| 2104464 | 7/1981 | United Kingdom . |

*Primary Examiner*—Anne Marie Boehler
*Attorney, Agent, or Firm*—Price, Gess & Ubell

[57] ABSTRACT

A vehicle having a chassis frame and a single front and single rear wheel aligned on the longitudinal axis of the vehicle, and retractable side wheels on opposite sides of the frame. A basic linkage transmits force to the side wheels for extending and retracting them in response to operator activation. The linkage is activated by a foot pedal lever which stows behind the driver's legs and a mechanism for locking the foot pedal lever in position behind the driver's legs and releasing it only when the driver depresses the foot pedal lever. The side wheels are further automatically steerable in synchronism with the vehicle front wheel by a mechanism which detects the front wheel position and activates an electrical motor to position the side wheels in accordance with the front wheel position. The steering mechanism is further capable of steering the side wheels to a position perpendicular to the track of the vehicle. Finally, an additional or second pair of side wheels may be provided with both pairs being retractable and extendable and one pair arranged to come into play when the vehicle tips.

8 Claims, 37 Drawing Sheets

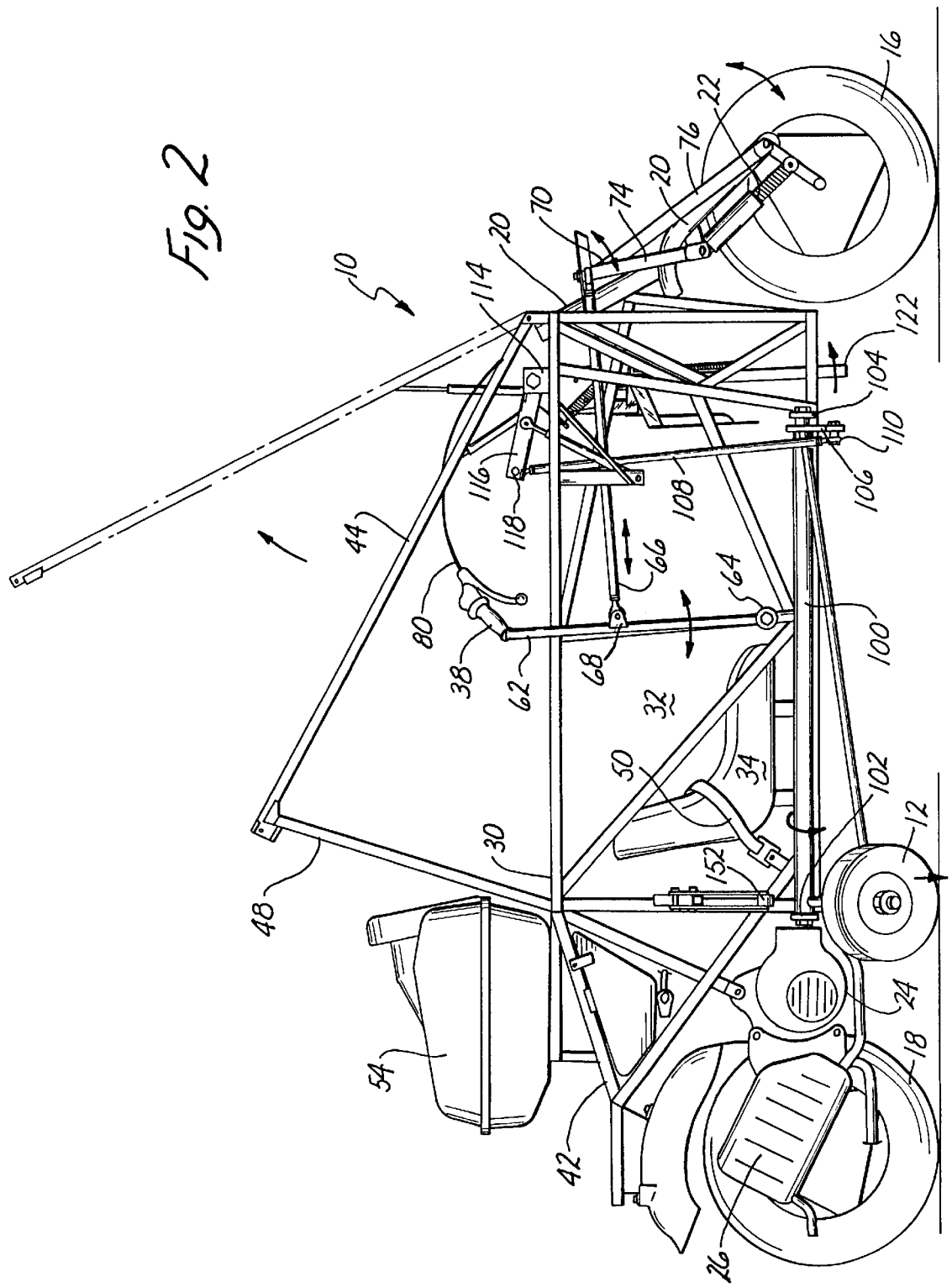

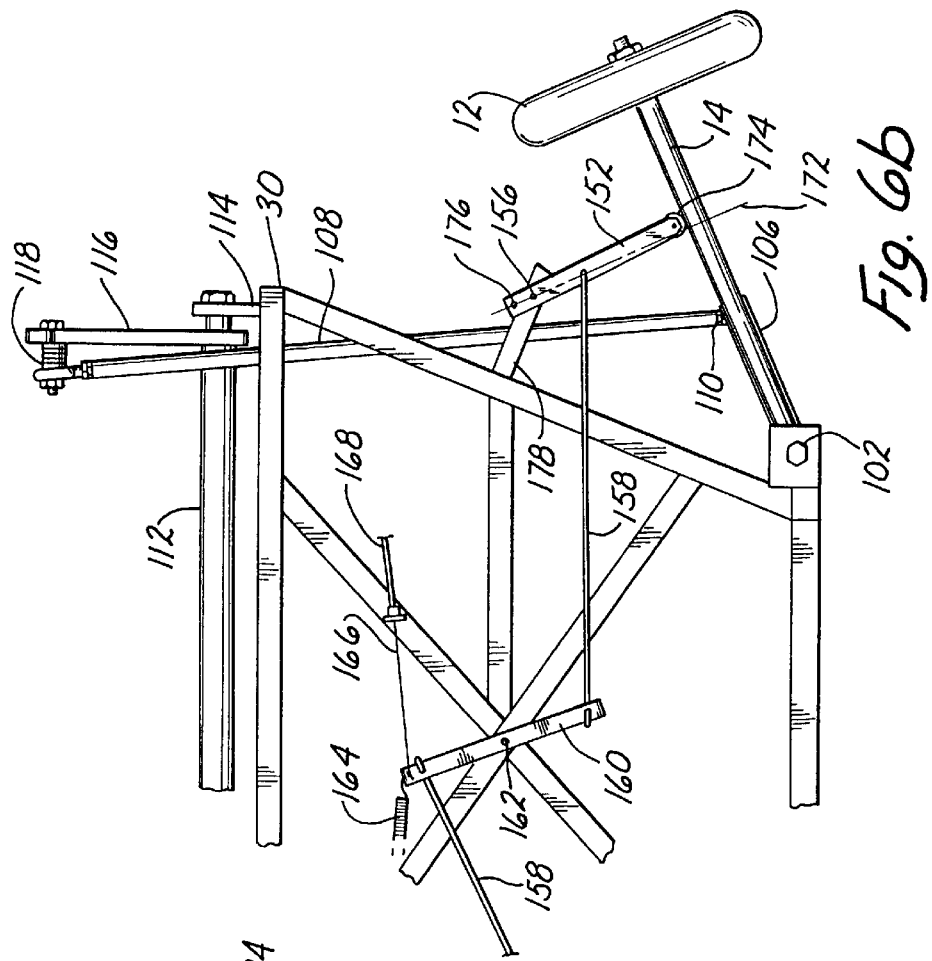
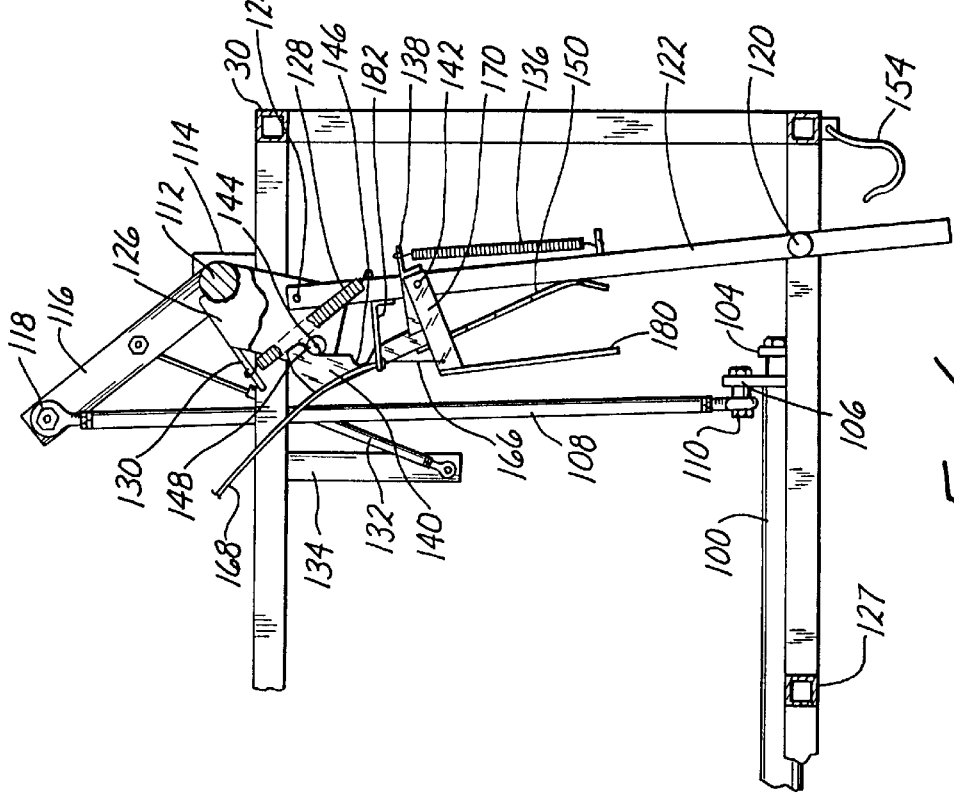

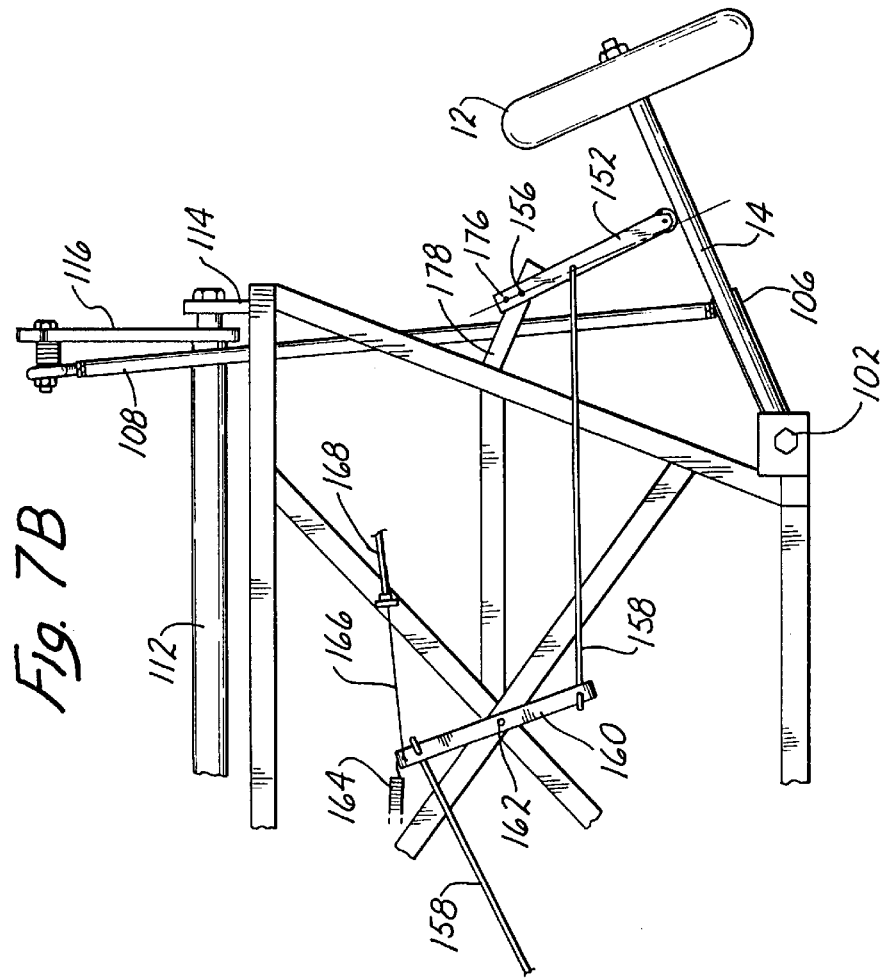
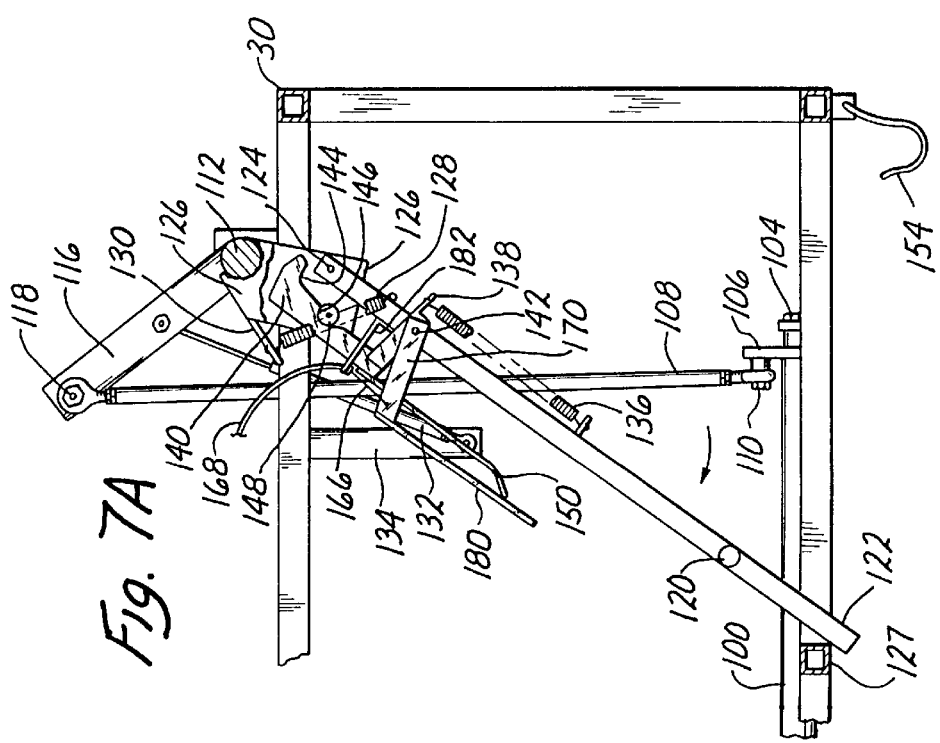

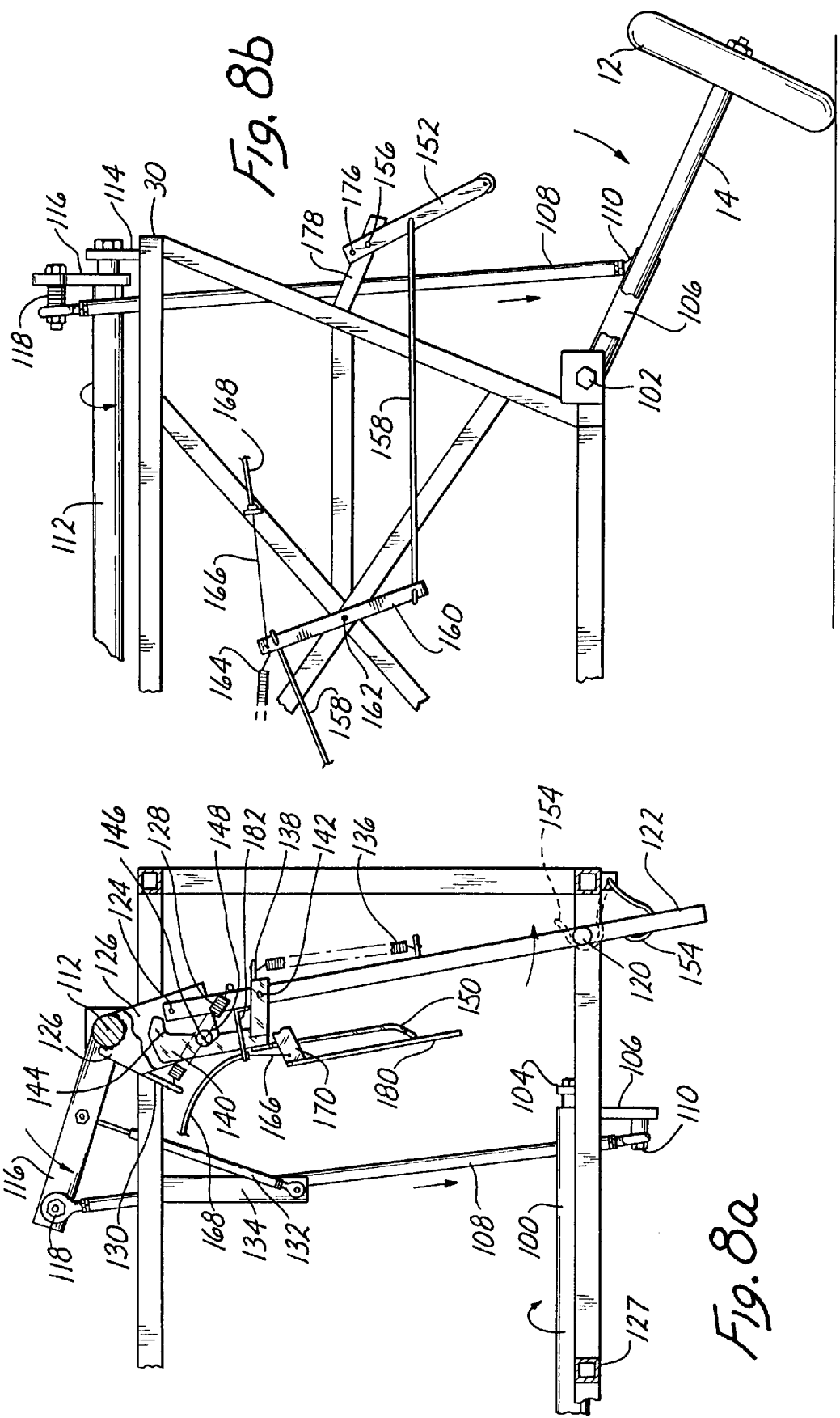

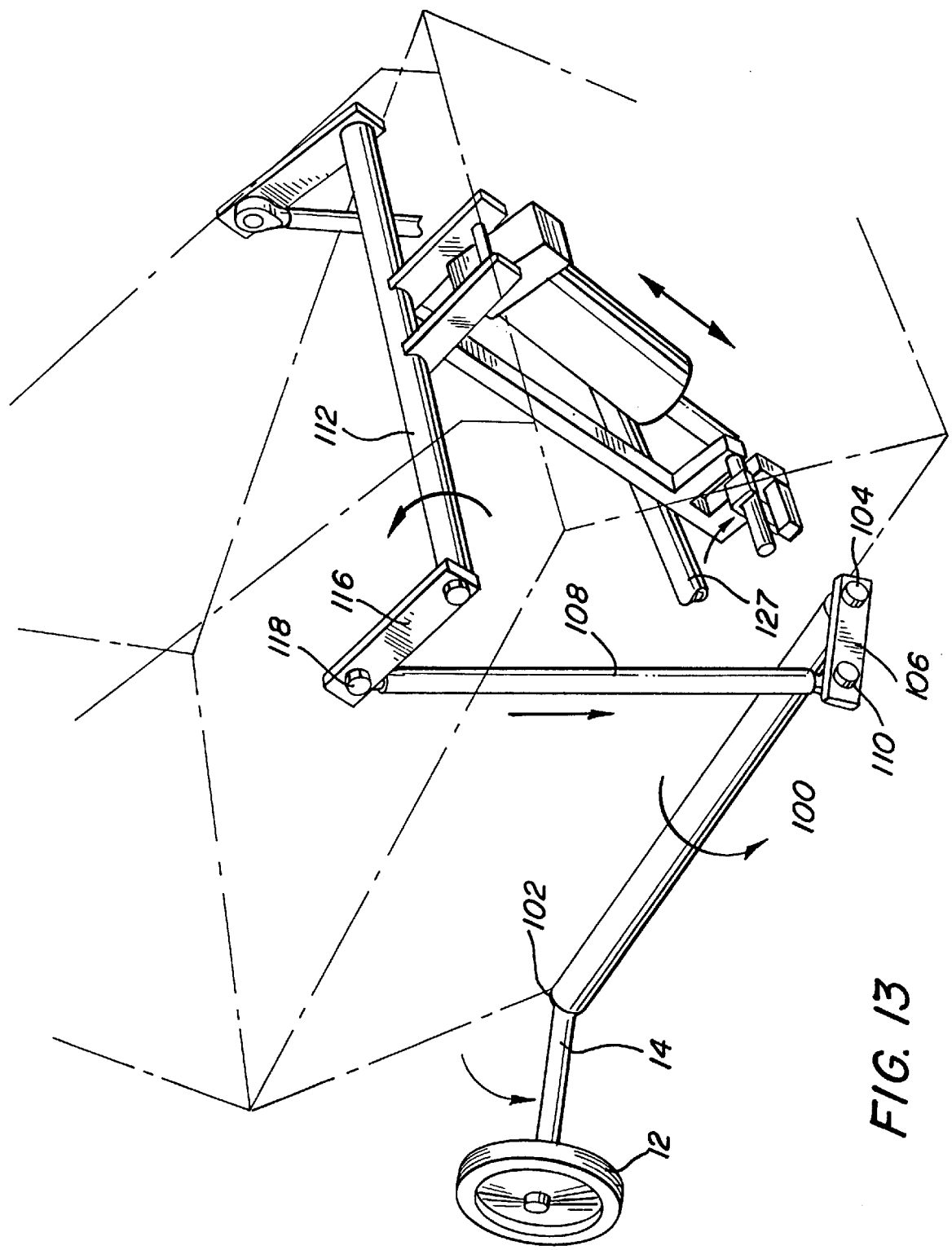

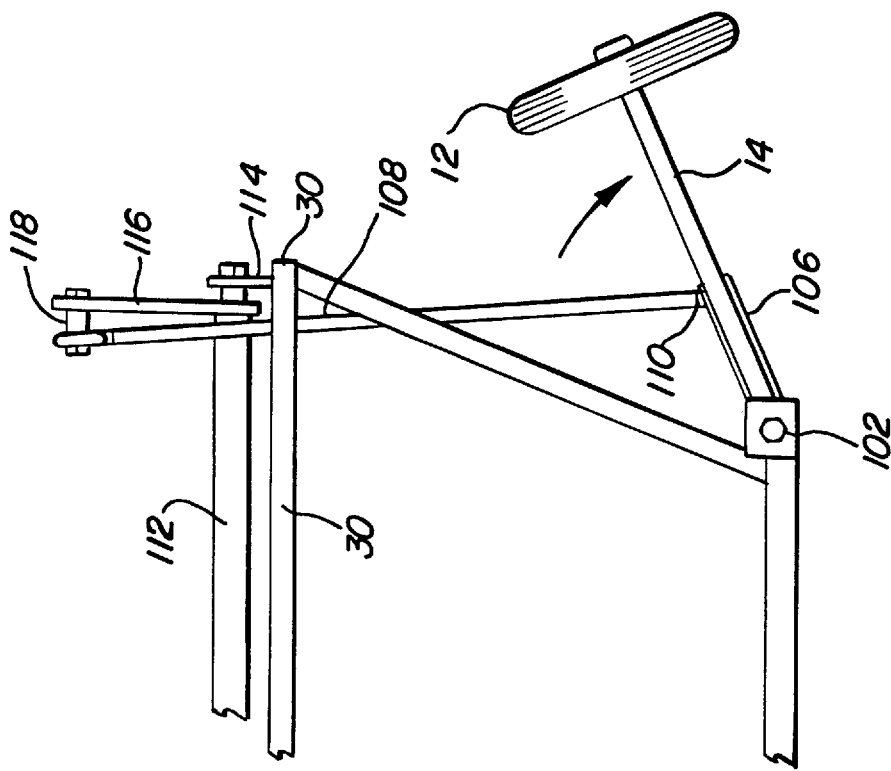
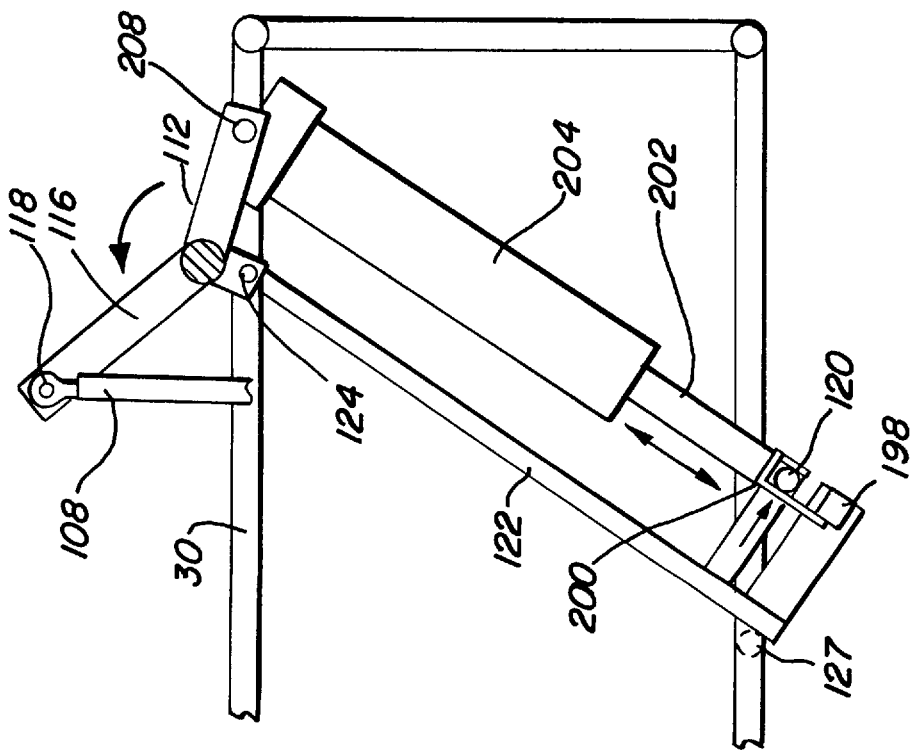
FIG. 13b
FIG. 13a

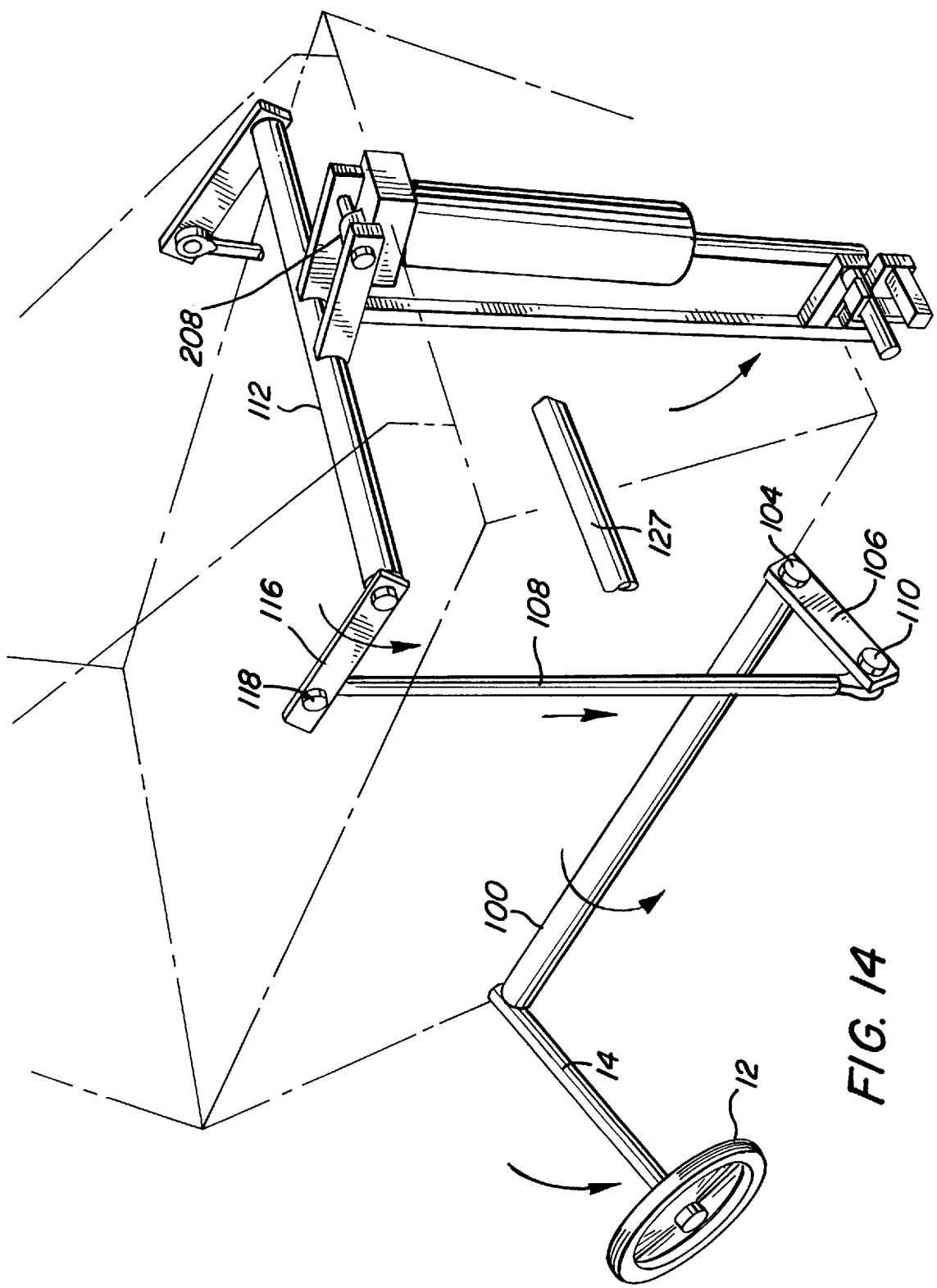

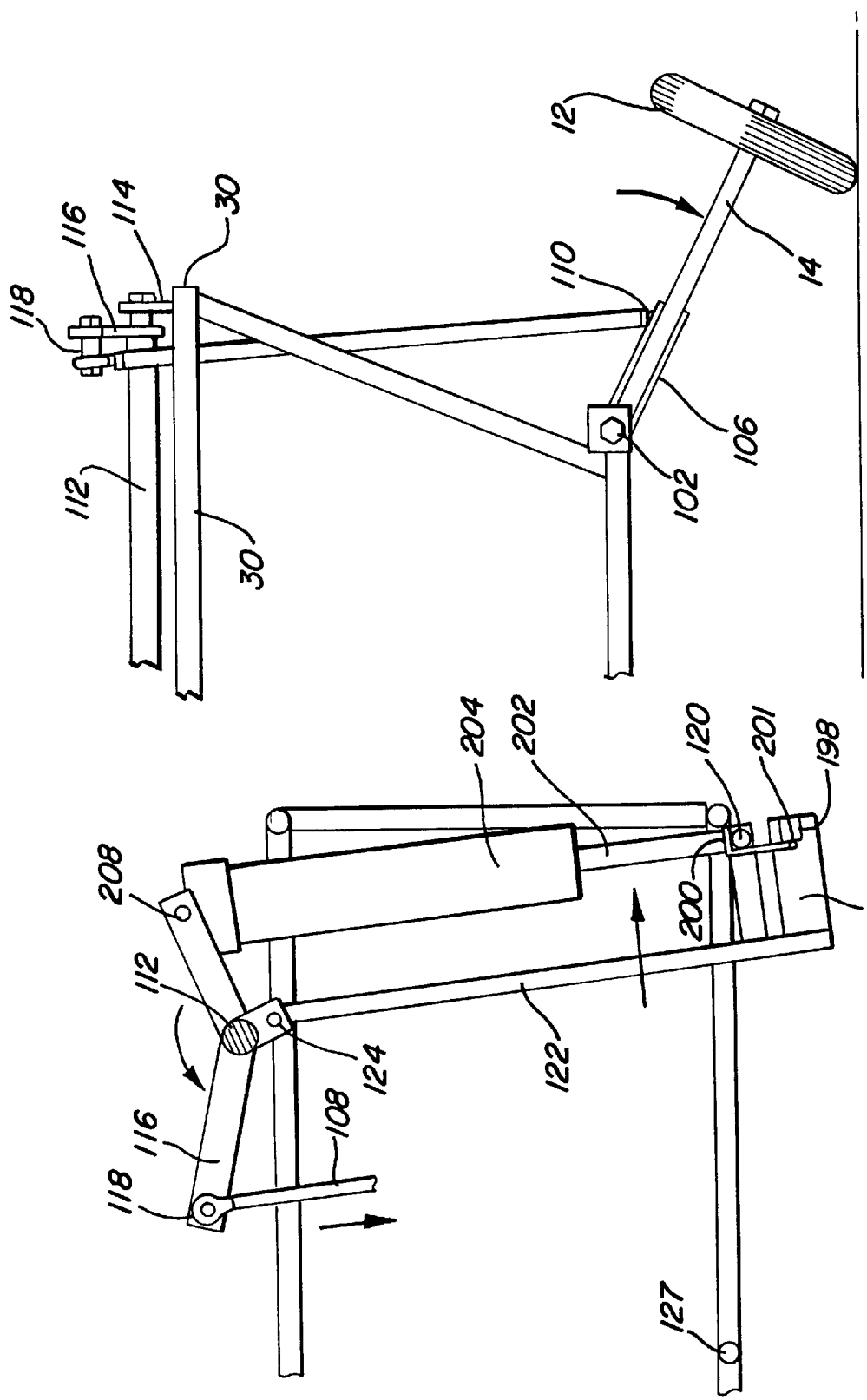

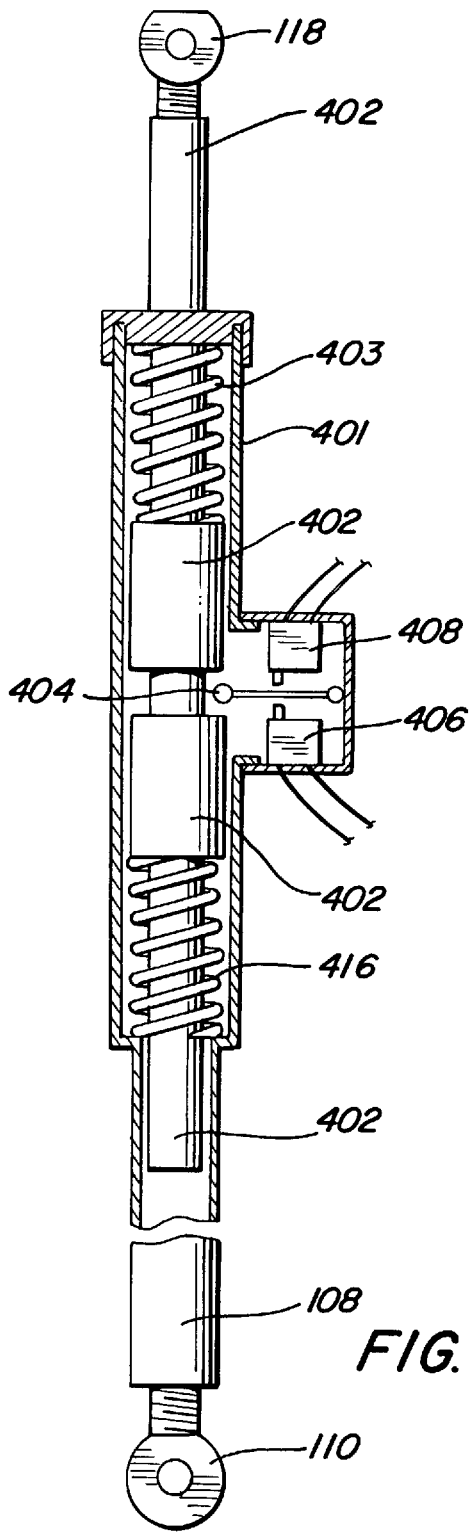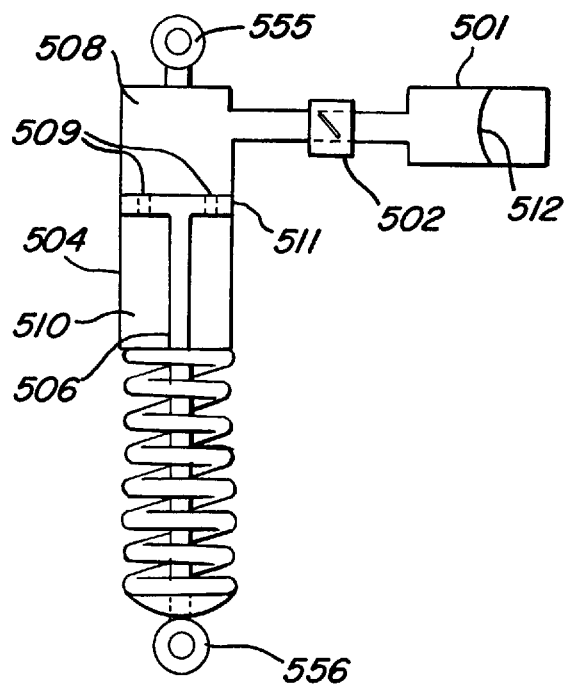
FIG. 19
FIG. 22

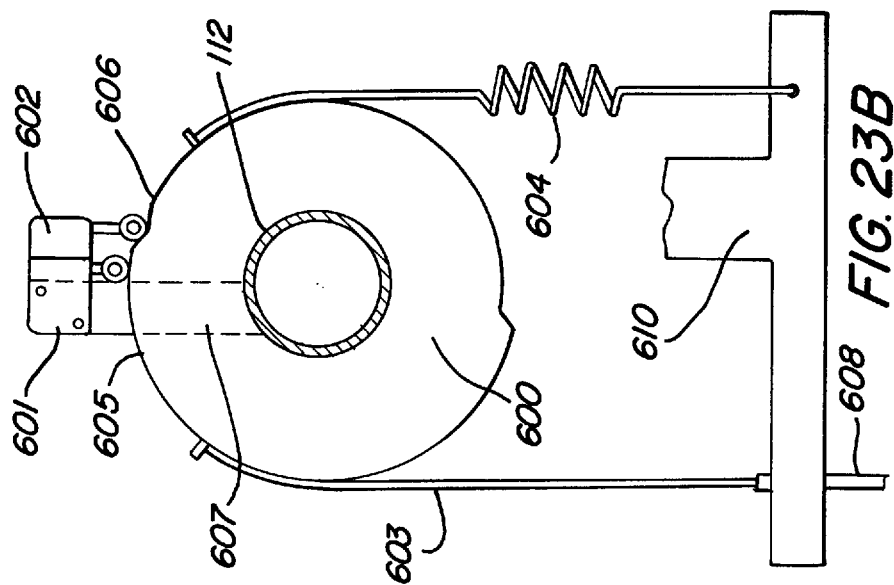
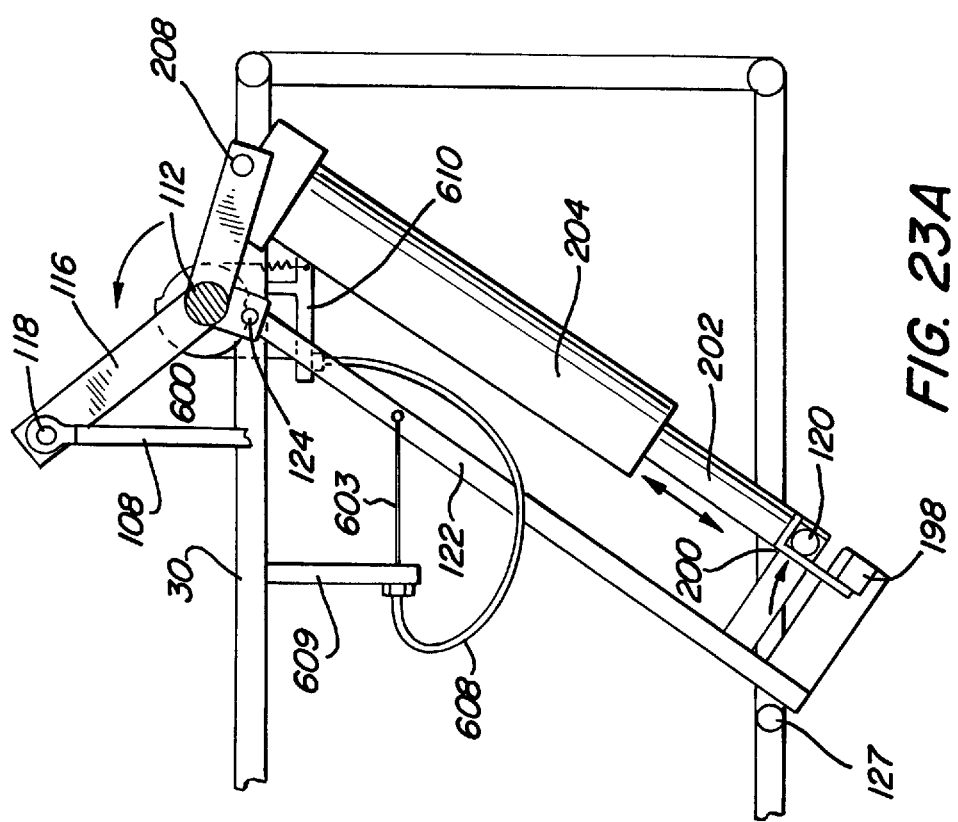
FIG. 23B
FIG. 23A

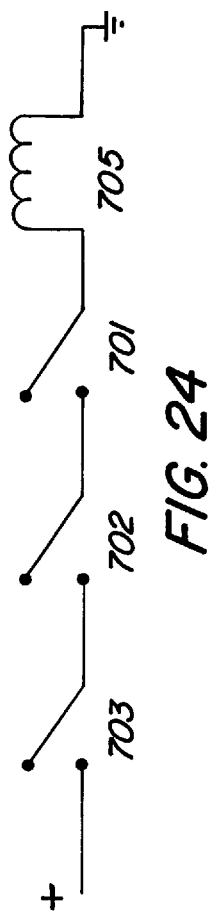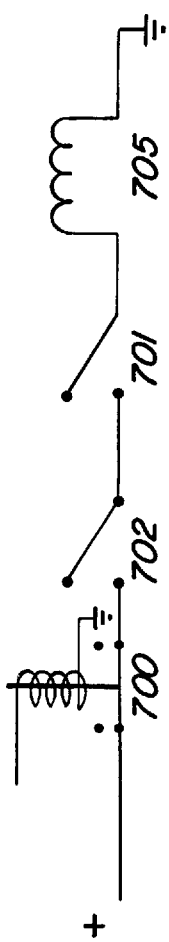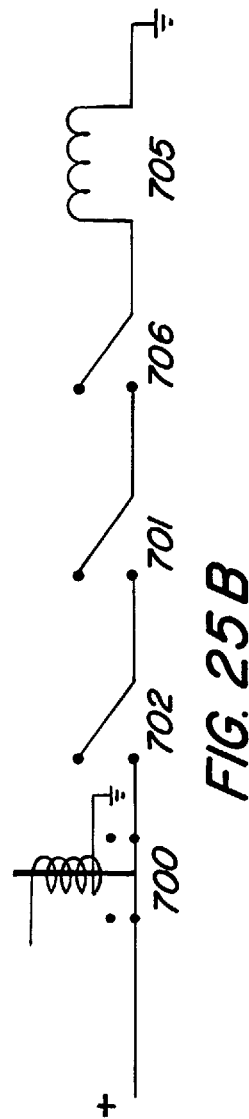

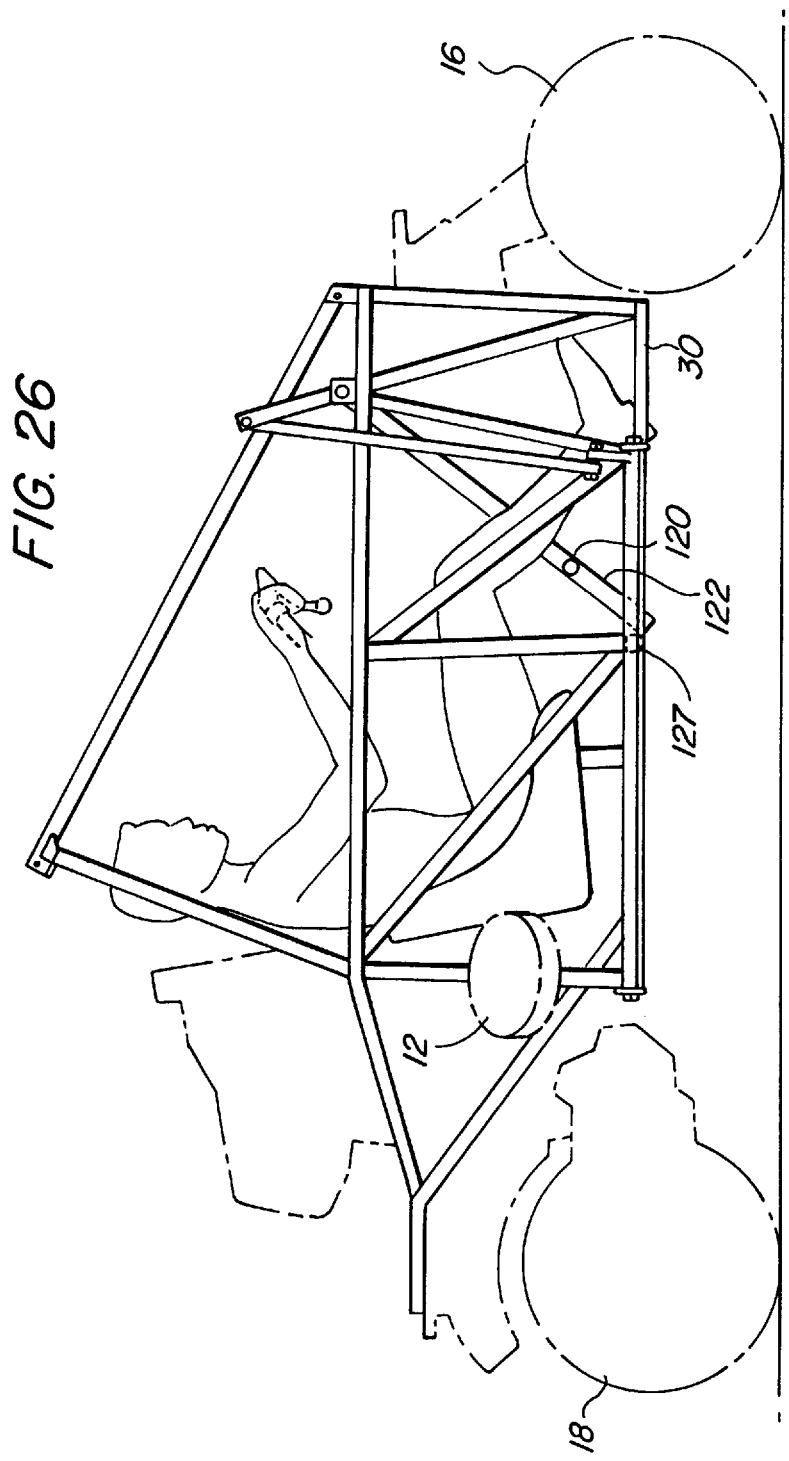

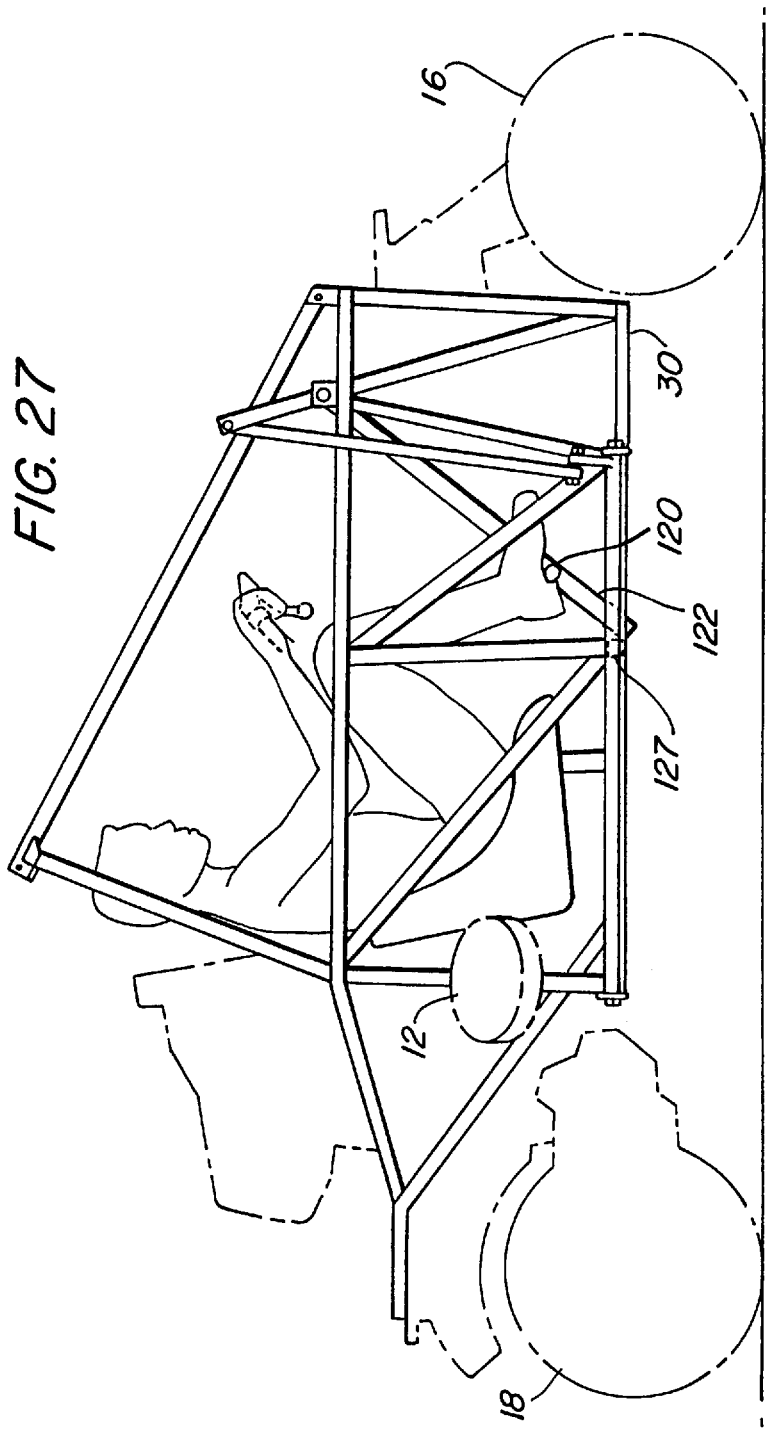

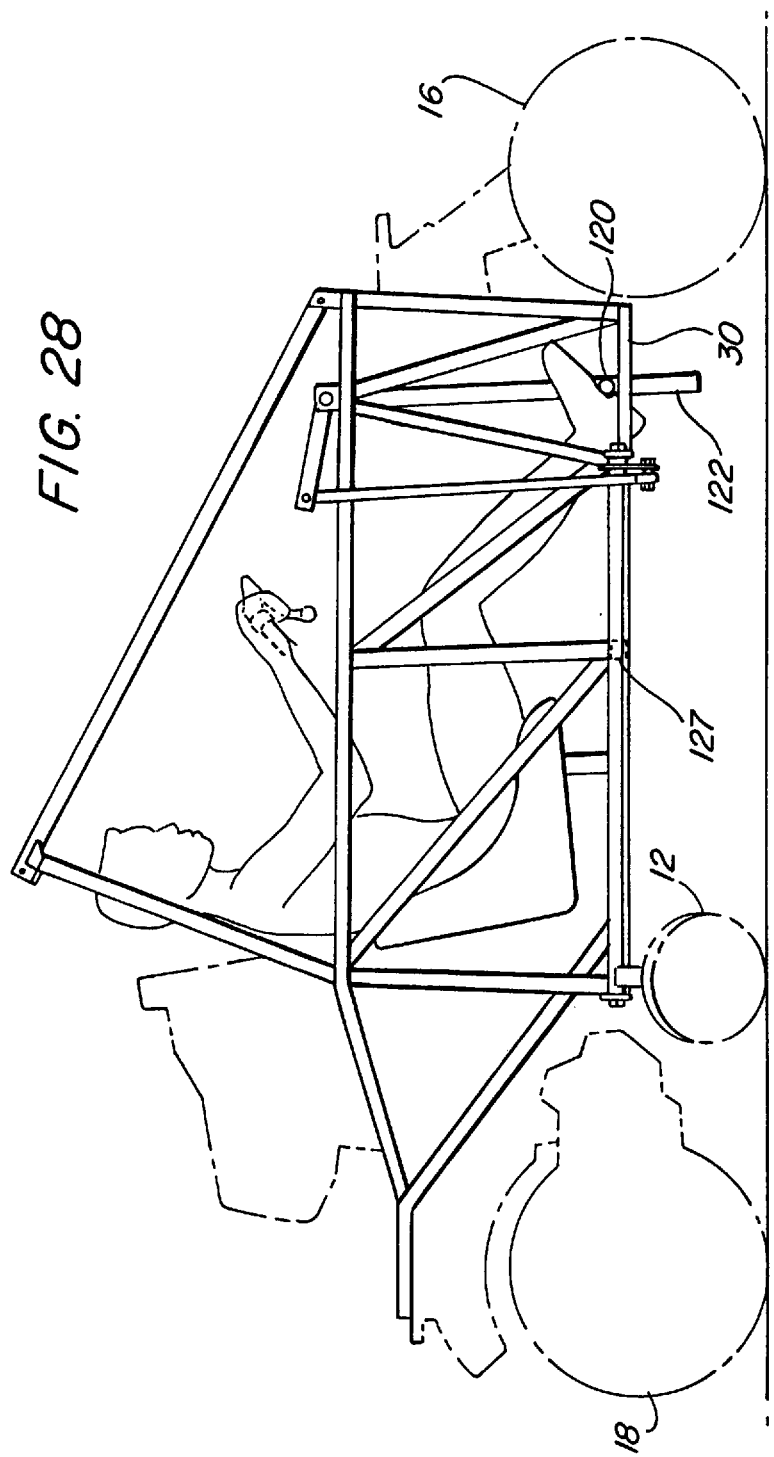

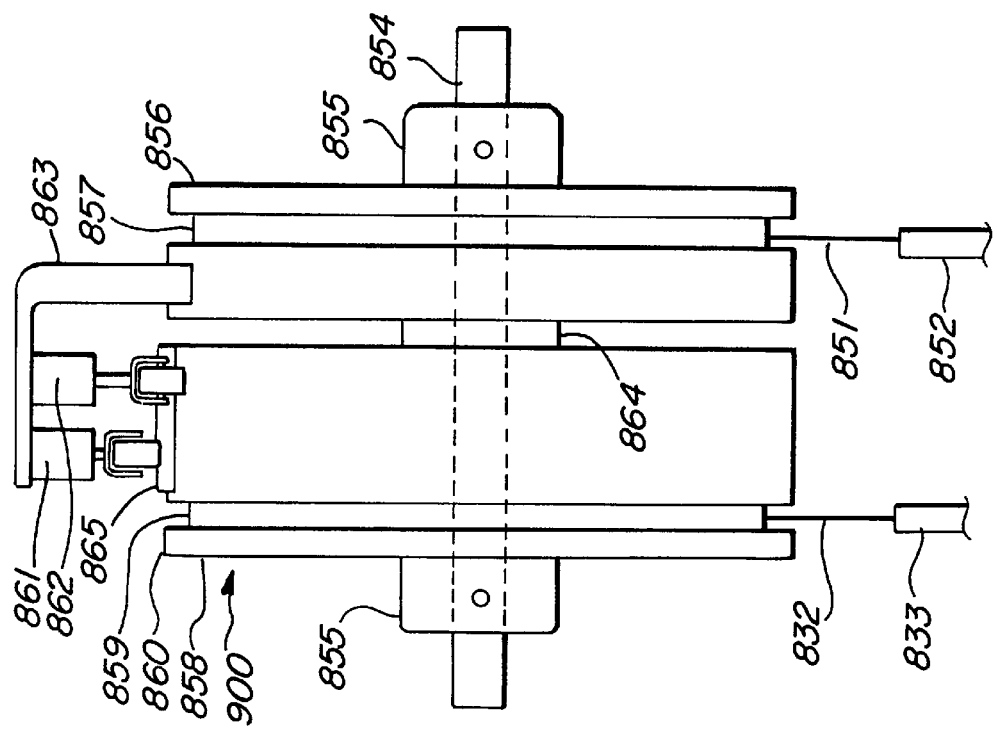
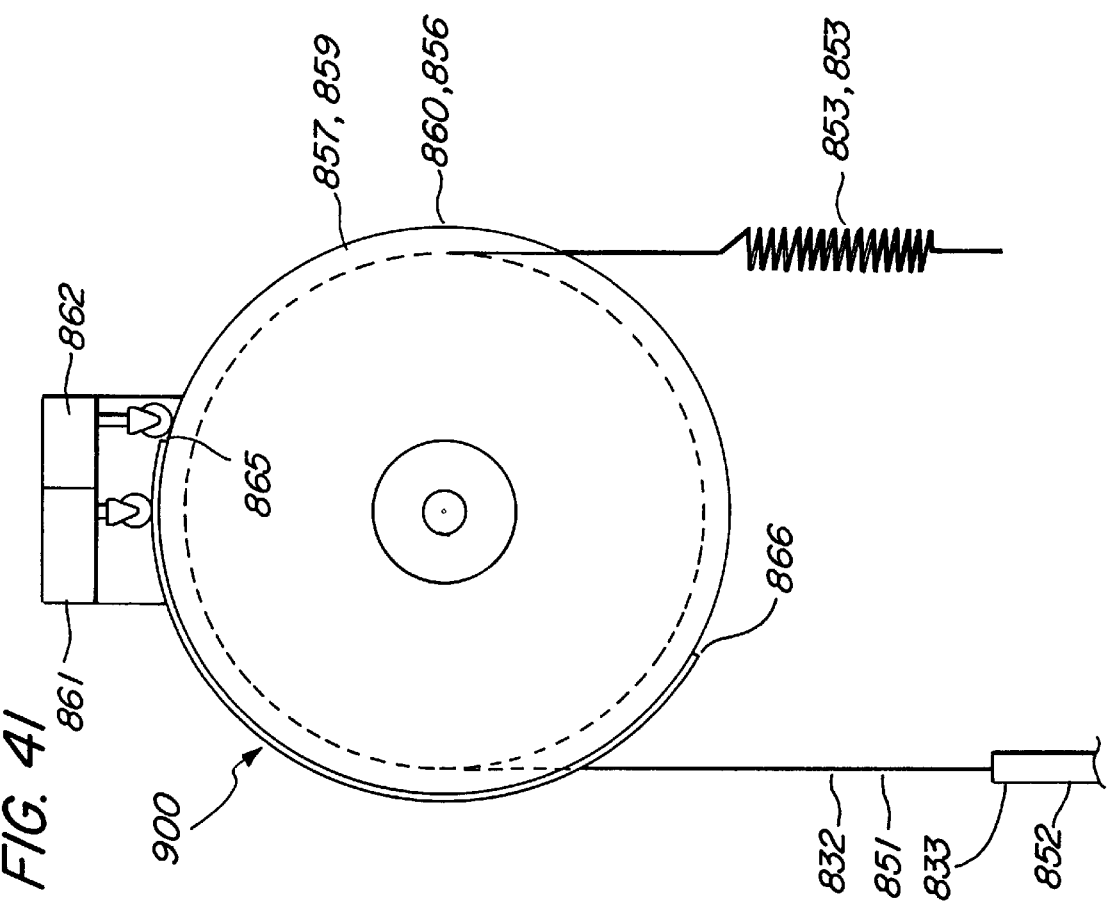

SINGLE TRACK VEHICLE

CONTINUATION INFORMATION

This application is a continuation-in-part of U.S. patent application Ser. No. 08/105,973, filed Aug. 11, 1993, now U.S. Pat. No. 5,628,379, which is a continuation-in-part of U.S. patent application Ser. No. 07/619,014, filed Nov. 28, 1990, now U.S. Pat. No. 5,257,671.

BRIEF SUMMARY OF THE INVENTION BACKGROUND AND OBJECTIVES

The subject disclosure relates to a motor vehicle of the type having a chassis frame elongated in a fore and aft direction, a single front and a single rear wheel, and retractable side wheels on opposite sides of the frame.

It is an object of my invention that the side wheels serve the following functions:

(a) Hold the vehicle upright when it is stopped or moving slowly.

(b) Create a righting force to aid the vehicle driver in the transition to and from the position in which the vehicle is held upright by side wheels to dynamically-balanced driving.

(c) Permit a maximum lean angle equal to the optimum tire traction loss lean angle.

(d) Provide various optimal configurations for assisting the operator to manipulate the side wheels while maintaining operator feedback information on side wheel position and force required to hold the vehicle upright.

(e) Prevent the vehicle rear suspension movement from interfering with vehicle lean angle when the vehicle is being driven in the held-up-by-side-wheel mode.

(f) Catch the vehicle in a three-wheel driving mode when tire traction is lost at the optimum tire traction loss lean angle.

(g) Right the vehicle from the maximum static lean angle.

(h) Minimize effort required to manipulate the side wheels and to right the vehicle from the maximum static lean angle.

(i) In the case of steered side wheels, to eliminate any side wheel steering feedback through the vehicle steering.

Prior vehicles of this type have lacked the ability to retract side wheels far enough to allow the vehicle to lean up to the optimum tire traction loss lean angle. A side wheel retraction system which limits lean angle to only 25 degrees, for example, means the structure involved in the side wheels, even when retracted, will strike the ground when the vehicle rounds turns at moderate speeds. An inspection of currently-produced, nonside wheel, high-performance motorcycle and motor scooter products will demonstrate the ability to lean 40 degrees or more to either side of vertical. This is a standard design feature, and for good reason.

A two-wheeled vehicle in motion, like a motorcycle, is dynamically balanced, and to turn a corner it will lean at an angle determined by the radius of the corner and the velocity of the vehicle, which will define a safe condition as long as tire adhesion to the road surface is maintained. While 40 degrees lean is more lean than the average operator will plan to normally use, misjudgment of a corner's sharpness will require more lean on occasion to safely turn the corner than normally desired. This extra margin to lean (safety margin) must be designed into the vehicle. For this same reason automobiles are capable of rounding corners at far higher speeds than planned daily use requires. Emergency conditions and the unexpected may require a sharper than normally desired turn. If the maximum lean angle is much less than 40 degrees, the vehicle has an unsafe turn radius limitation, which forces a wider turn than would be allowed with a greater maximum lean angle. In an unexpected condition, if the lean angle is limited and a sharper turn is attempted than the vehicle maximum lean angle will allow, the vehicle will be forced into a wider turn, out of its intended lane of travel, and cross either into the adjacent lane or the road shoulder, depending upon the direction of the turn. Thus, the vehicle could be forced into a lane of oncoming traffic or off the road, both of which would involve unacceptable risk.

It is a further object of my invention to provide means to right the vehicle when stationary or moving, from a lean angle as much as about the optimum tire traction loss lean angle by force applied by the feet of the driver on pedals, within the normal levels of strength of grown people. The greater the lean angle, the greater the force required to right a vehicle.

Further objectives include:

(a) Automobile comfort and safety.

(b) Driving enjoyment akin to that experienced with a motorcycle, economy, ease of maintenance, providing a vehicle qualifying for diamond lane privileges, and providing a vehicle of lower ecological damage compared with other feasible vehicle alternatives.

Automobile comfort is achieved by providing basically an automobile-type seat and seating position, as contrasted to motorcycle seats and driving positions. It is an objective to provide glass and body screening such as may be found in a convertible, as opposed to the wind buffeting and noise found in a motorcycle. A heater can be provided.

Automobile safety can be enhanced by a seat belt and a shoulder harness, by a tubular steel cage and a roll cage, or by a comparable safe body construction. Use of a driving helmet is preferable. An air bag passive restraint could also be provided.

Motorcycle-type ride enjoyment is created because operating the vehicle is like operating a very responsive motorcycle, with an exception that the feet never have to touch the pavement during use. Motorcycle economy is inherent in the small and efficient motorcycle-like motor, the vehicle's low weight, and the provision of low drag with the two wheels. Maintenance is easier due to fewer and less complicated parts. Small and efficient power plants burn less gas and create less emissions.

The technology exists to develop my vehicle. Although prior somewhat similar vehicles were proposed starting as early as about 1924, apparently full-scale production has not been achieved. One difficulty may have been the failure to create a system for righting the vehicle within the strength capabilities of normal drivers. It is an objective of my invention to provide a family of mechanisms to right this vehicle.

It is another objective of my invention:

(a) To provide side wheels replacing the rider's feet to hold the vehicle upright at stops and at low speed, the wheels to be retracted at other occasions.

(b) To permit 40 degrees or more vehicle lean to either side up to the optimum tire traction loss lean angle when the side wheels are retracted.

(c) To operate the side wheels by reasonable foot pressure.

(d) To provide a down lock for the side wheels for parking.

(e) To provide rollover, side impact, and other crash protection.

Vehicle operating conditions are much like that of a motorcycle with certain exceptions:

(a) A leg-powered retractable side wheel system is substituted for the direct use of the driver's feet to touch the ground to balance the vehicle during low speeds and stops.

(b) When a rider uses a motorcycle, he learns to position the motorcycle in a balanced condition as it sets into motion. My vehicle is operated somewhat differently in this regard. Leg power is still used, but through foot pedals and mechanical advantage or by a power assist system. My vehicle could be driven in a dynamically-unbalanced condition at any speed, but it is desirable to transition to the dynamically-balanced mode at 5–10 mph. The faster the vehicle is driven, the more force is required to correct the vehicle if it is in an undesirable disposition.

(c) Seating the driver high in a motorcycle is disadvantageous compared to the low seating position in my vehicle. The lower position of the weight of the driver (in a vehicle in which his weight is a significant portion of overall vehicle/occupant weight) leads to more responsive handling and safety due to a lower center of gravity.

My invention will be best understood, together with additional objectives and advantages thereof, from the following description, read with reference to the drawings, in which:

DRAWINGS

FIG. 5b is an elevational view of a side wheel and associated parts in positions they may assume when the foot pedal is in the position shown in FIG. 5a.

FIG. 6a is an elevational view of the foot pedal and associated parts in a second position.

FIG. 6b is an elevational view of the side wheel and associated parts in positions they may assume when the foot pedal is in the position shown in FIG. 6a.

FIG. 7a is an elevational view of the foot pedal and associated parts in a third position.

FIG. 7b is an elevational view of the side wheel and associated parts they may assume when the foot pedal is in the position shown in FIG. 7a.

FIG. 8a is an elevational view of the foot pedal and associated parts in a fourth position.

FIG. 8b is an elevational view of the side wheel and associated parts in positions they may assume when the foot pedal is in the position shown in FIG. 8b.

FIGS. 12, 12a, 12b, 13, 13a, 13b, 14, 14a, and 14b illustrate an embodiment employing a linear actuator for motorized partial extension and retraction in conjunction with the basic linkage.

FIGS. 15–21 illustrate an embodiment employing a power assist apparatus in conjunction with the basic linkage.

FIG. 22 is a schematic diagram of apparatus for freezing the rear suspension of a vehicle according to the preferred embodiment.

FIGS. 23a and 23b are schematic diagrams illustrating apparatus for establishing a positional relationship between a foot pedal level and a linear actuator according to an embodiment of the invention.

FIGS. 24, 25a, and 25b are circuit schematics useful in illustrating operation of various warning features according to a preferred embodiment.

FIGS. 26–28 are sequential schematic diagrams illustrating the relationship between the driver's legs and the hanging foot pedal lever during activation thereof according to the preferred embodiment.

Figure 29:
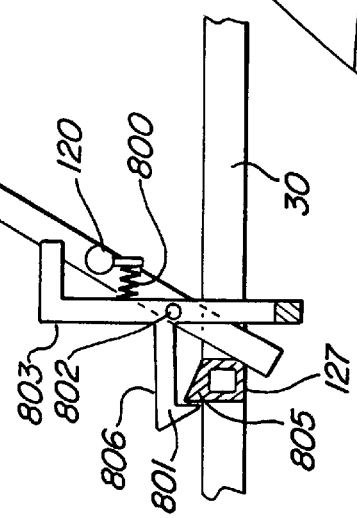

FIG. 29 is a partial broken-out side view illustrating a foot pedal lever locking mechanism according to the preferred embodiment.

Figure 30:
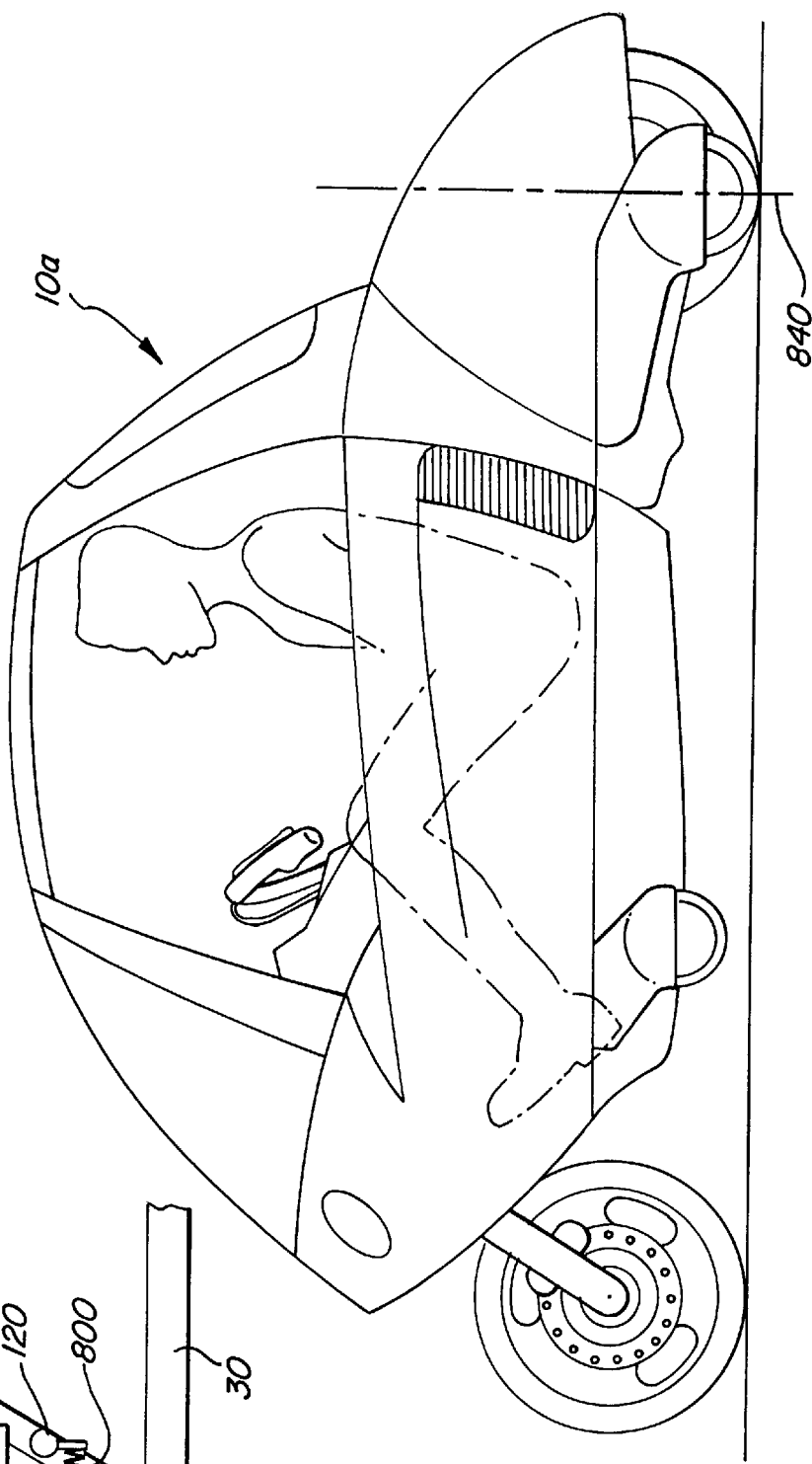

FIG. 30 is a side view of a single track vehicle embodiment employing two pairs of operator-manipulatable side wheels.

Figure 31:
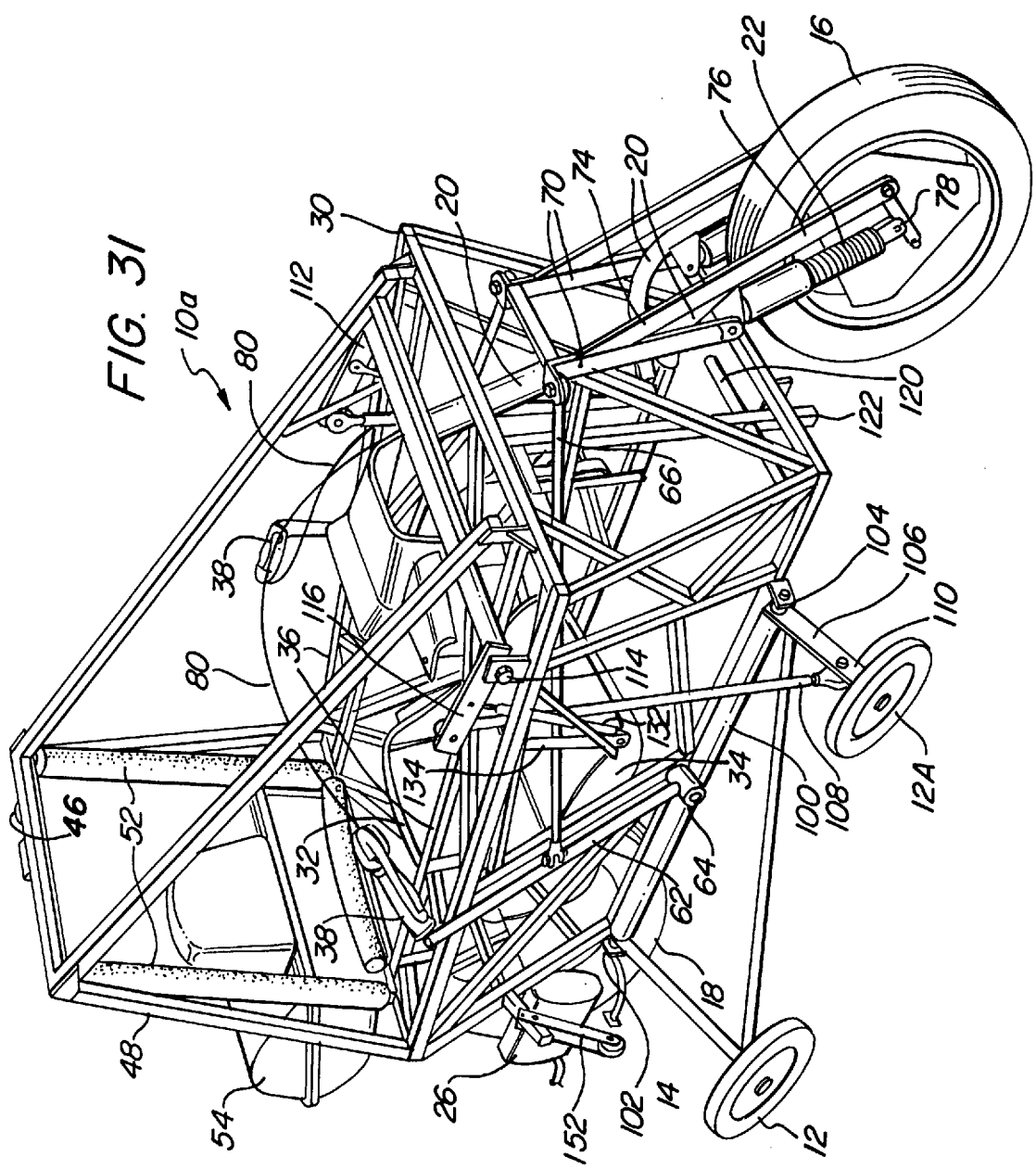

FIG. 31 is a perspective view illustrating the internal structure of a single track vehicle embodiment employing two pairs of side wheels.

Figure 32:
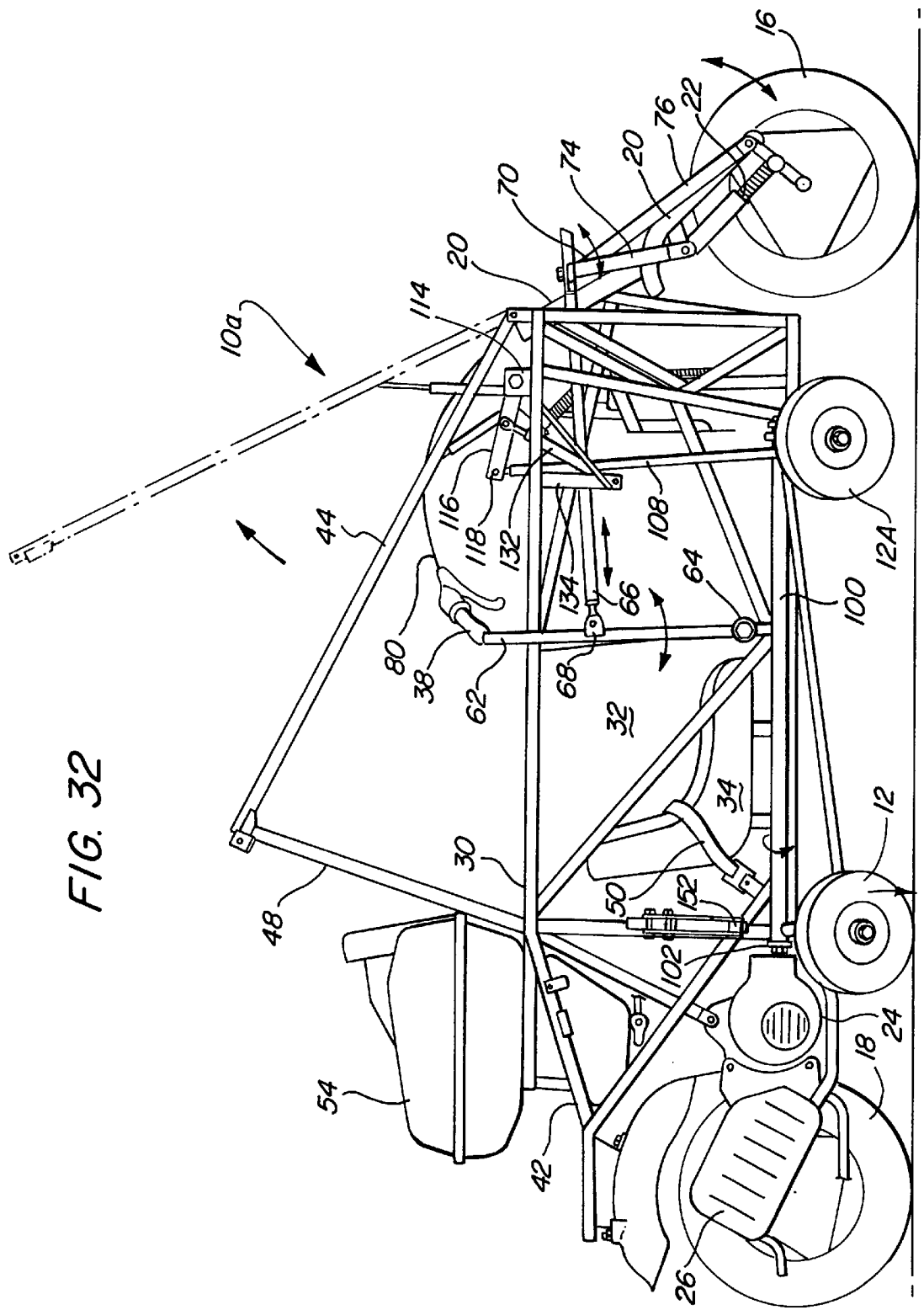

FIG. 32 is a side view of the embodiment of FIG. 31.

Figure 33:
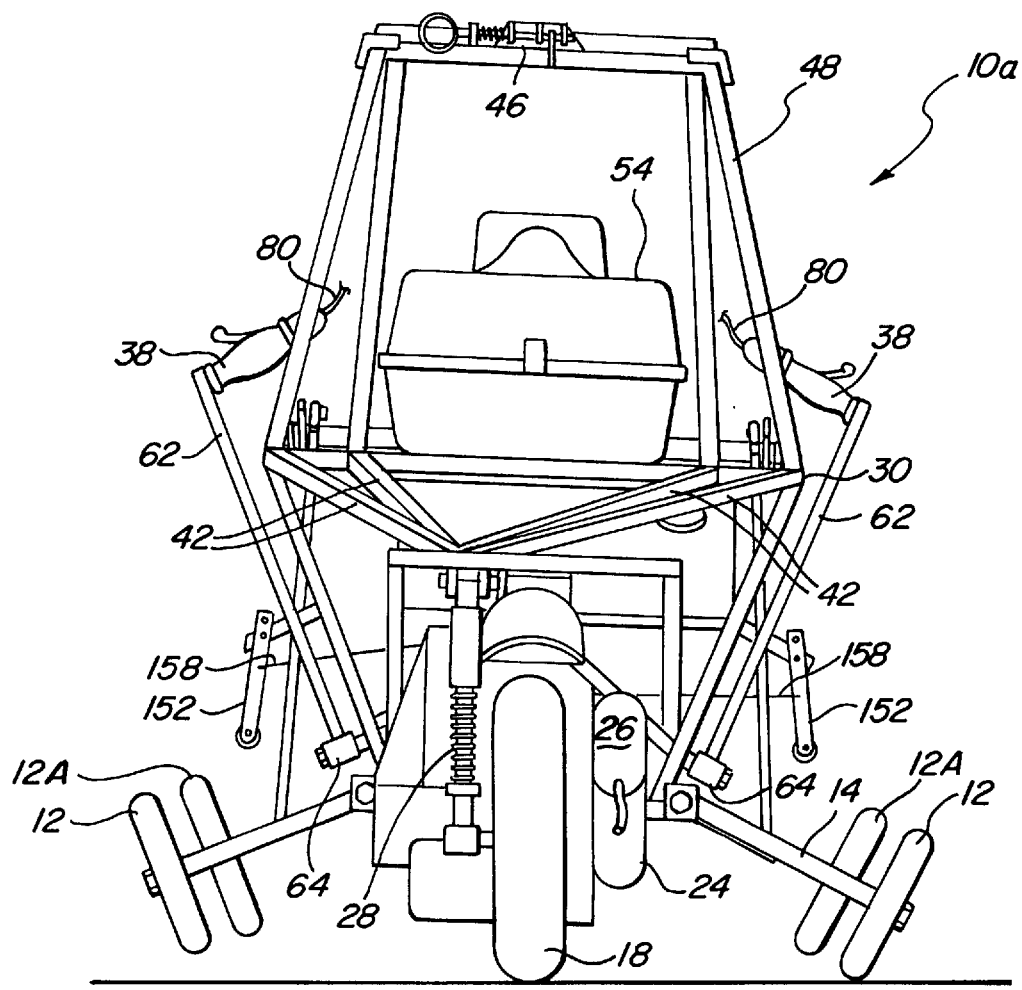
Figure 34:
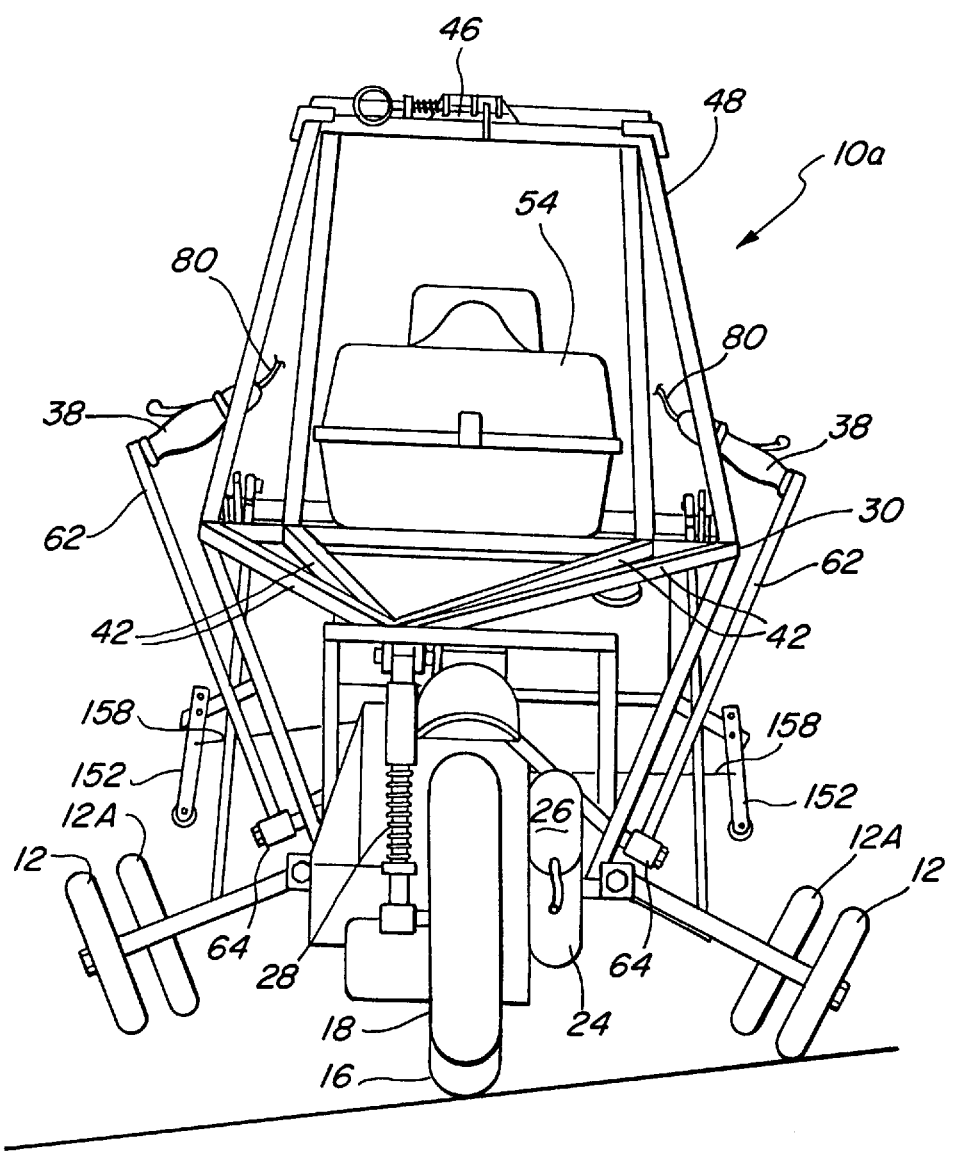
Figure 35:
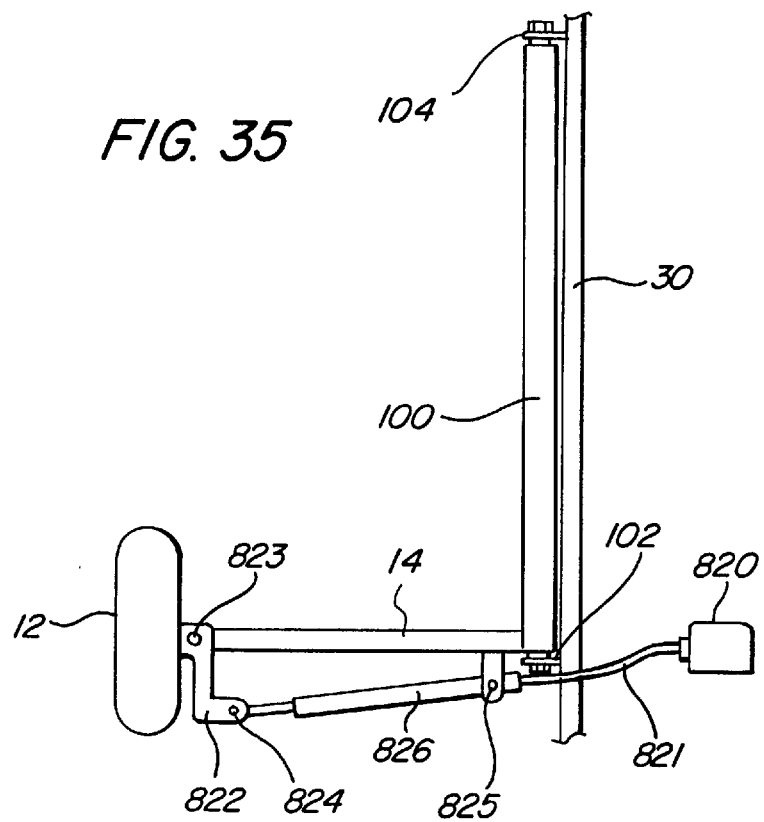
Figure 36:
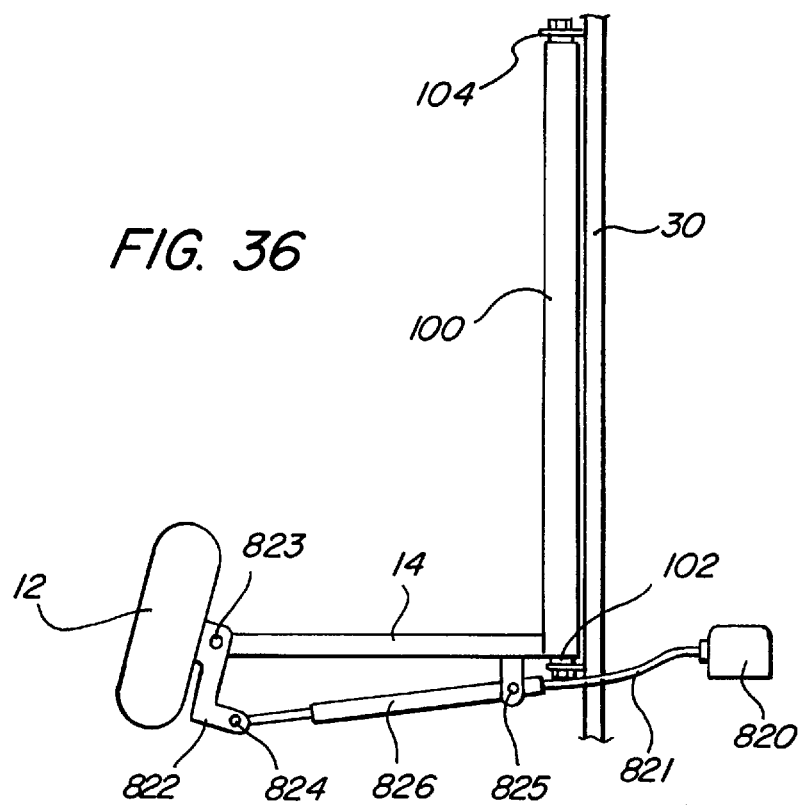
Figure 37:
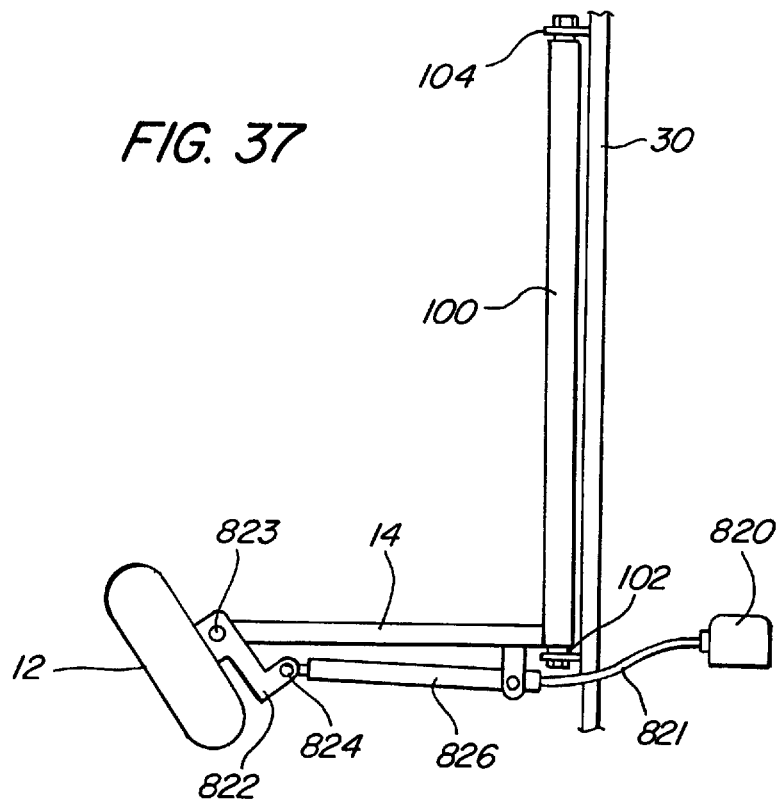
Figure 38:
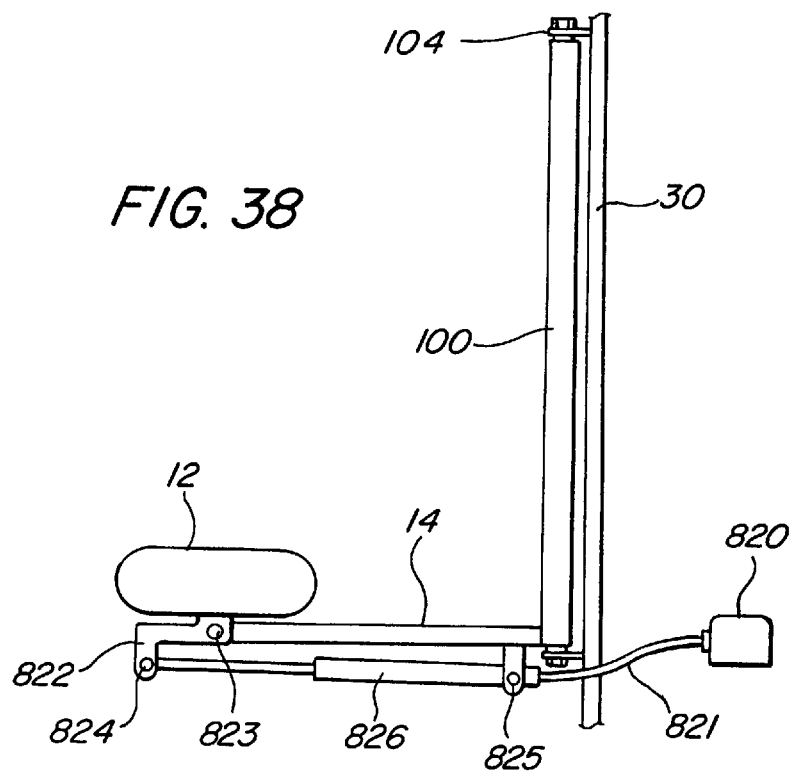

FIGS. 33 and 34 are front views of the embodiment of FIGS. 31 and 32.

FIGS. 35–38 are respective partial top views of side wheel steering apparatus according to the preferred embodiment in various steering positions.

Figure 39:
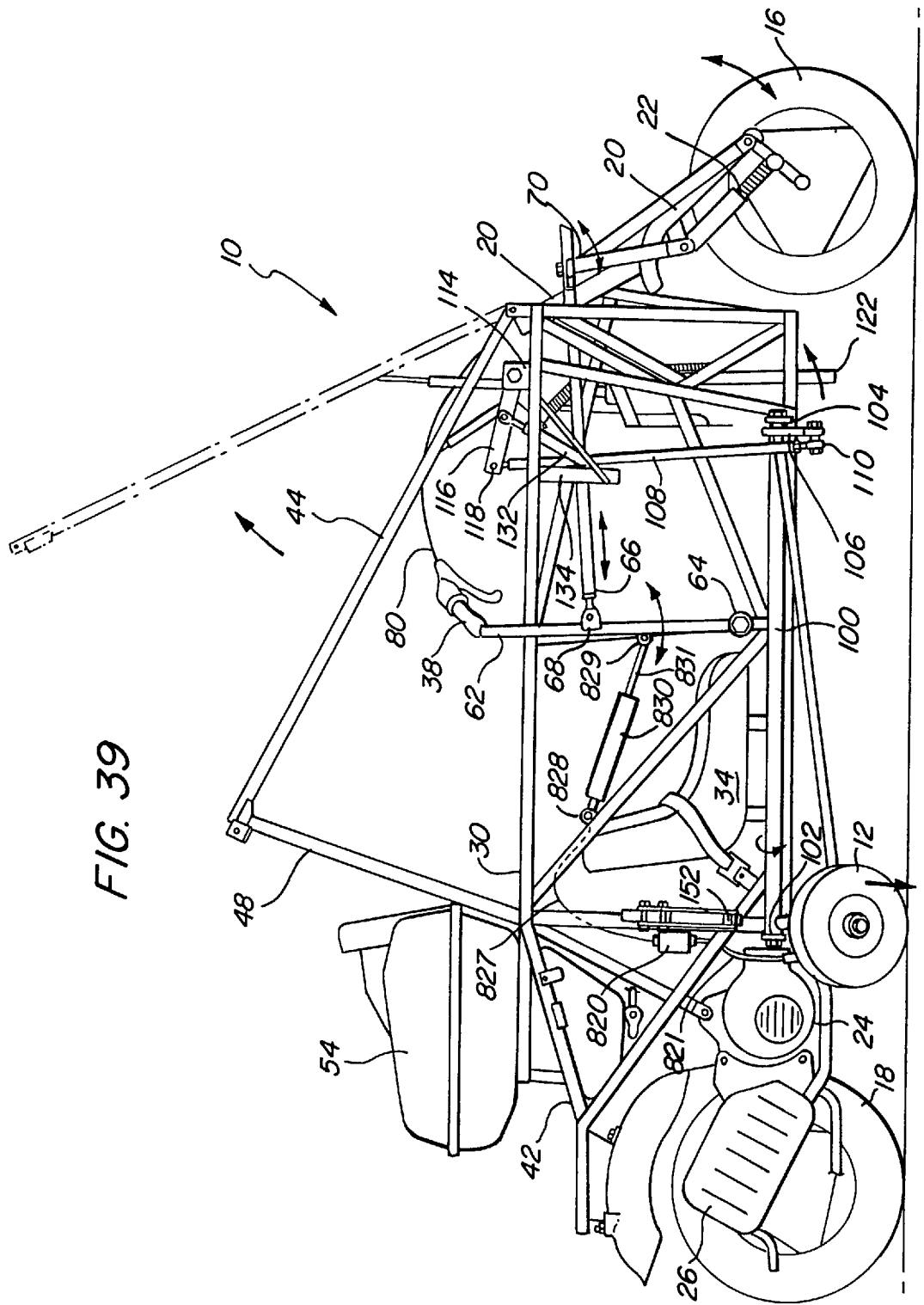
Figure 39A:
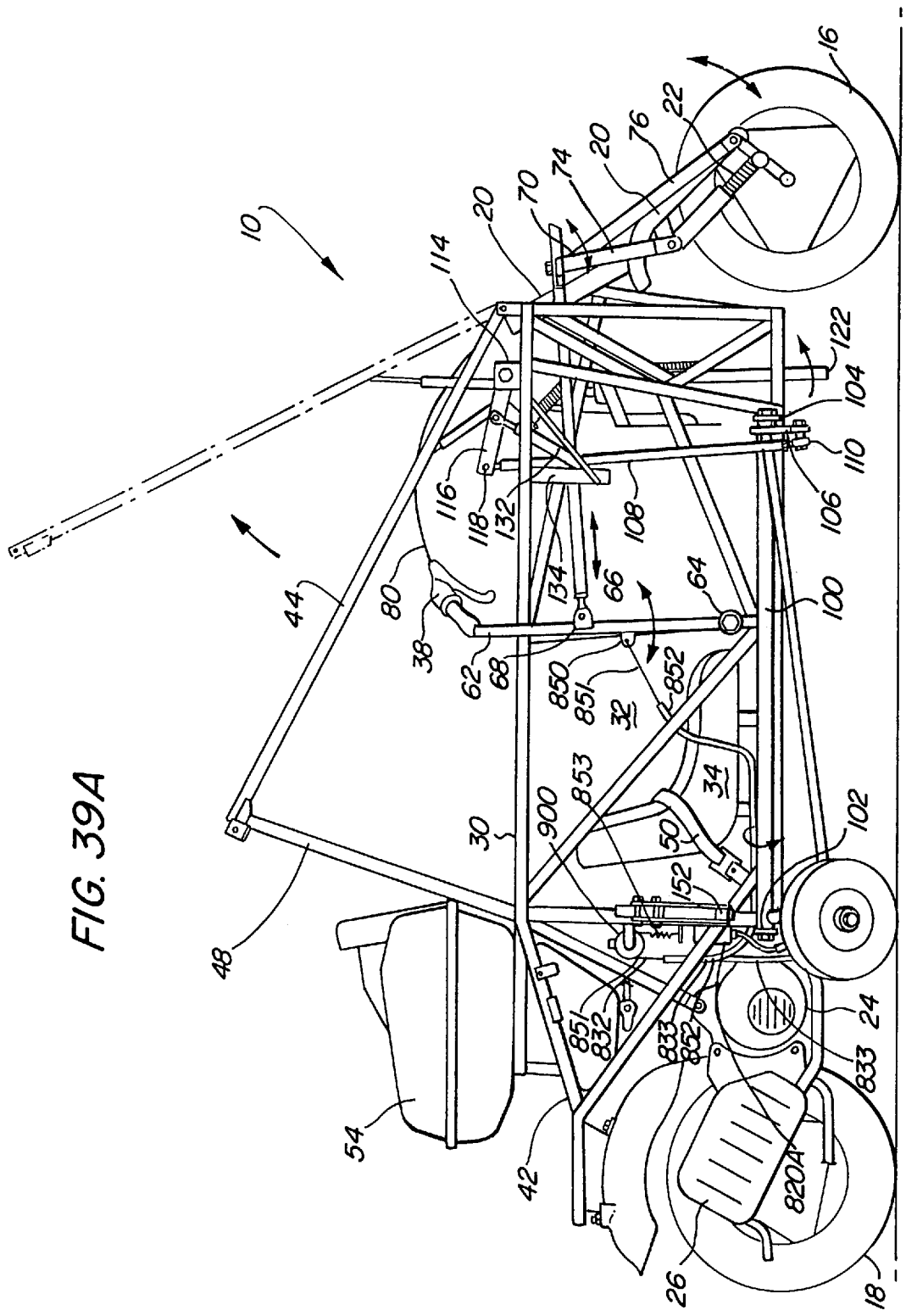

FIG. 39A is a side view of a single track vehicle embodiment incorporating side wheel steering apparatus.

Figure 40:
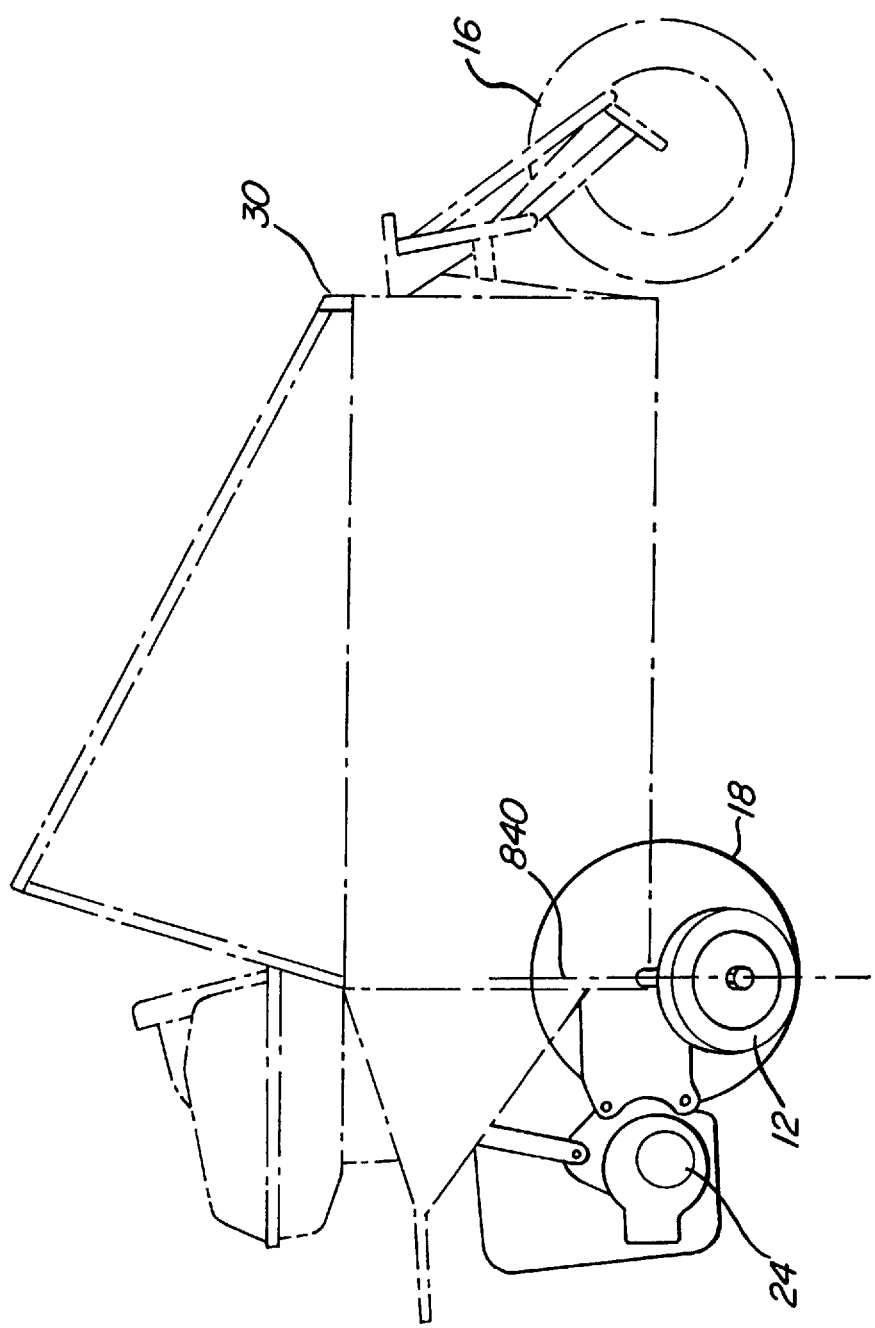

FIG. 40 is a side schematic view of a single track vehicle embodiment.

FIG. 41 is a side view of alternate side wheel steering apparatus.

FIG. 42 is a front view of the apparatus of FIG. 41.

Figure 43:
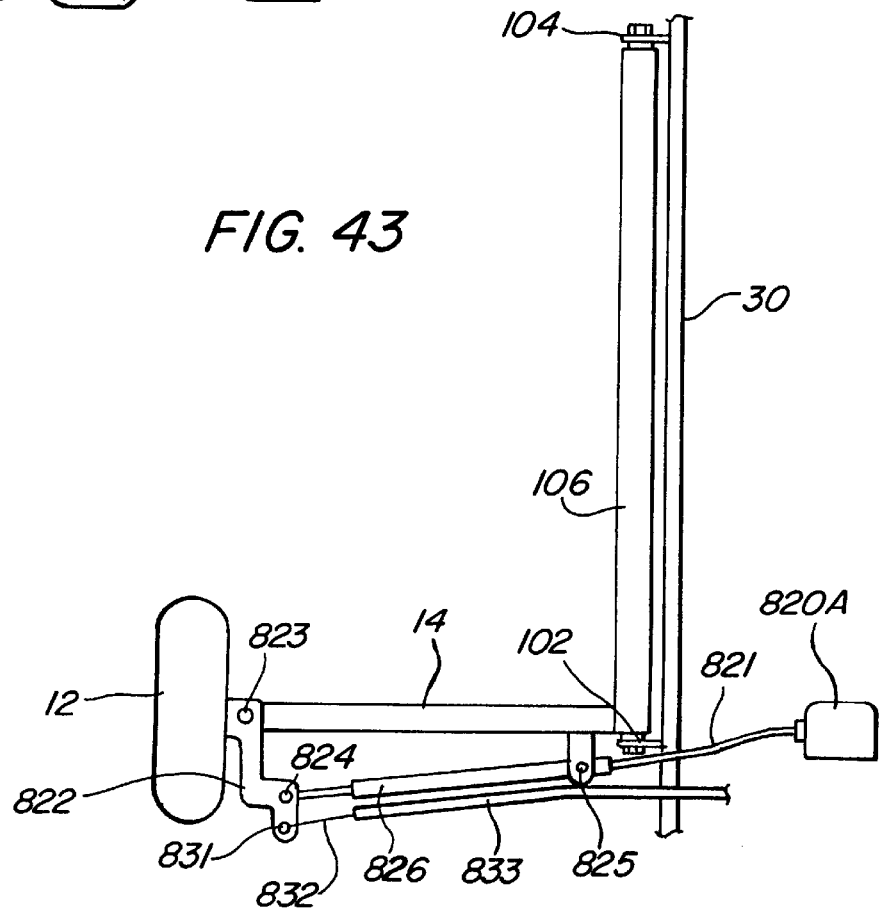

FIG. 43 is a top view of side wheel steering apparatus according to the alternate embodiment of FIGS. 41 and 42.

FIGS. 44-1, 44-2, and 44-3 are electrical schematic diagrams illustrative of circuitry of the alternate side wheel steering embodiment.

DESCRIPTION

I will, first, describe the vehicle 10 in general and then, second, I will describe the mechanism for raising and lowering side wheels 12 supported on arms 14.

Vehicle 10 is generally classifiable with two-wheel vehicles such as motorcycles, scooters and the like with basically only two wheels, a forward wheel 16, and a rear wheel 18. In the prototype shown in the drawing, various parts were adapted from a Yamaha XC200 motor scooter including forward wheel 16, front fork and stem 20, front shock absorber 22, rear wheel 18, motor and case 24, muffler 26, rear shock absorber 28, etc. It is possible in production that some of these developed and proven parts in the scooter field can be used or adapted for use in my vehicle 10. This would avoid having to engineer and develop all parts independently.

The framework 30 of the vehicle is shown to be formed largely as trusses. Framework 30 has obvious functions in tieing together structures associated with front and rear wheels 16, 18, in forming a passenger compartment 32 (here shown as a one-person compartment), in supporting seat 34, etc. Notable in framework 30 is the two side frame trusses 36 disposed in a generally horizontal plane at about elbow height relative to the passenger (as indicated by the location of handgrips 38). These side frame trusses 36 are tied together at front and back by diagonal front frame members 40 and diagonal rear frame members 42 so as together to form a continuous truss which, among other structural purposes, helps define a protecting trusswork about passenger compartment 32 to help protect the passenger against side, front, and rear forces in accident situations.

I am confining this general description mostly to matters in which my invention is an improvement over prior inventions of others dealing with vehicles with a single front wheel, a single rear wheel, and retractable side wheels. The drawings do not show and I will not describe many other details such as front windshield, general body panels, lights, other accessories, floor, etc. At least a partial top is preferable for driving in all types of weather, and I have shown, to facilitate vehicle entry and exit, a pivotal top frame 44, a top latch 46, and a rear supporting frame 48. Frames 44, 46 also serve a purpose in accident roll situations like a roll bar in topless vehicles or a top in closed vehicles. How much side glass will be provided, if any, is optional. Top panels, front, back, and side panels, and a floor may be integrated into framework 30, as is common in automobile manufacture, so that part of the strength of the frame is in formed and built-up panels, etc., rather than in separate trusses per se.

A seat belt 50 is provided. I show pads 52 on rear top supporting frame 48 to protect the occupant, who should also have a helmet. A rear-mounted baggage compartment 54 is a useful accessory. A shoulder harness and an air bag can also be provided in order to improve the driver's crash protection.

Although not presently preferred, the figures illustrate a different form of steering than the handlebar found in motorcycles. I term this "side steering" in that steering is accomplished by a hand grip 38 on each side of the driver that are not directly connected to each other.

Figure 4:
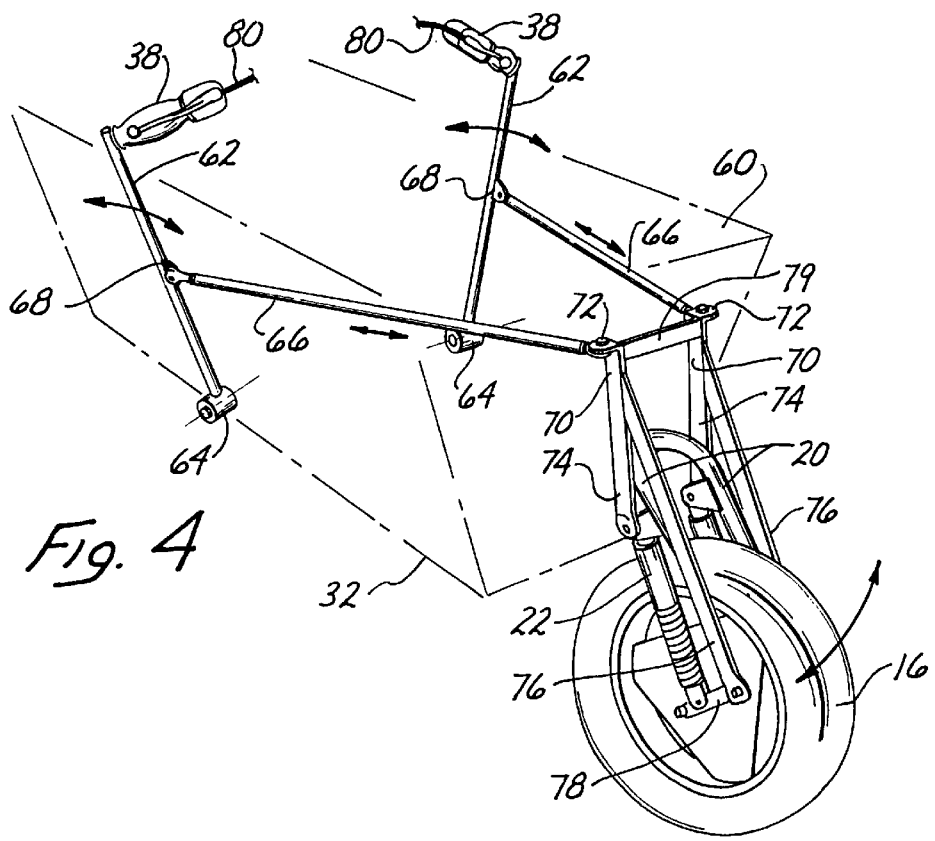
FIG. 4 is a perspective view of the steering components of the vehicle.

The steering system 60 is most easily understood from FIG. 4. Hand grips 38 are fixedly connected to and extend laterally inwardly from a pair of upright levers 62 pivotally mounted at 64 to framework 30, to pivot in planes extending primarily fore and aft of vehicle 10.

Generally horizontally-extending connecting rods 66 have their rear ends pivotally connected at 68 to the vertically central portions of levers 62. An inverted U-shaped assembly 70 on each side has an upper end pivotally connected at 72 to the forward end of the associated connecting rod 66. A shorter leg 74 is connected to the assembly of the front fork 20 and front shock absorber 22. A longer leg 76 is connected to the front wheel axle 78. A member 79 connects together the upper ends of assemblies 70. It will be observed that hand grips 38 are indirectly connected together by connecting rods 66, assembly 70, and front fork 20.

When force is applied to one or both hand grips 38, one lever 62 will be pivoted forwardly and the other rearwardly. If force were applied by both hands simultaneously, one would be pushing and the other would be pulling. The movement of levers 62 results in a turning moment to front fork 20 and front wheel 16.

This side steering, without a centrally-pivoted handlebar, makes driver exit from and entrance into passenger compartment 32 easier than if that obstruction were present. It provides the leg room necessary to operate landing gear and leaves room for an air bag restraint system. It also eliminates structure in front of the driver that could strike him in certain accident situations. A variable steering ratio is provided. The variable ratio steering system is provided by the inherent geometry of a bell crank push-pull tube system. The front end assembly could be re-engineered to integrate steering assembly 70 into the front fork and stem assembly 20.

Cable 80 extends from hand grips 38 to front and rear brakes. I have not shown a cable for the accelerator.

I will now describe the two-stroke system for moving side wheels 12 up and down. Wheels 12 are supported on arms 14 which are rigidly extending laterally from the rear portions of longitudinal torque tubes 100 pivotally supported at their rear ends at 102 and at their front ends at 104, as shown particularly in FIGS. 1 and 2.

According to the preferred embodiment, the side wheels are respectively positioned when retracted such that, while driving in the dynamically-balanced mode, the vehicle is able to tilt to the angle at which the vehicle experiences tire traction loss before the side wheels contact the road surface using the intended equipment tires and road surface of intended use in optimum condition. This is a necessary feature to allow the vehicle to corner with the same capability as it would have if it did not have retractable side wheels. If the side wheels contact the road surface substantially before the lean angle which will produce front or rear tire traction loss, the vehicle has an artificial turn radius/speed limitation caused by the side wheel-induced lean limitation and the vehicle is more dangerous with the side wheels than if they were removed. Typically, the lean angle at which tire traction is lost will be equal to or greater than 40 degrees for typical tires on a clean pavement road surface.

Rigidly extending laterally from the front portion of longitudinal torque tubes 100 are lower crank arms 106. An upright connecting rod 108 is pivotally connected at its lower end at 110 to arm 106. A lateral torque tube 112 extends across the front upper framework 30 and is pivotally supported on lugs 114. Rigidly attached to lateral tube 112 at each end is an upper crank arm 116 which is pivotally connected at its end 118 to connecting rod 108. It will be seen, thus, that the raising and lowering of side wheels 12 depends on pivoting of upper crank arms 116 either driven by foot pedals or forced by springs.

Foot rests 120 for right and left feet extend from either side of the lower end of a foot pedal lever 122. The foot pedal lever 122 is pivotally connected at 124 sandwiched between a pair of plates 126 that are secured to lateral torque tube 112 and indirectly to upper crank arm 116 to pivot together. A tension spring 128 between foot pedal lever 122 and an arm 130 forming part of double plates 126 always tries to pull foot pedal lever 122 rearward towards the driver and against stop 127 (see FIG. 5*a*). Air spring 132 (FIGS. 6*a* and 6*b*) is an extension spring common in automotive use in hoods and hatchbacks. Air spring 132 extends between upper crank arm 116 and an arm 134 fixed to the frame and is always trying to retract side wheels 12 by pushing on upper crank arm 116 to act on connecting rod 108 to rotate torque tube 100 to raise wheels 12. Tension spring 136 acts between an attachment point on foot pedal lever 122 and the end of an arm 138 fixed to ratchet member 140. Ratchet member 140 is pivotally connected to foot pedal lever 122 at 142 (see FIG. 8*a*). Spring 136 always presses upper rest 144 or lower rest 146 of ratchet member 140 into engagement with a roller-type pawl 148 secured between plates 126.

Air spring 132 is always trying to retract side wheels 12. Air spring 132 can be prevented from reaching its objective of retracting wheels 12 by foot pressure on rests 120 of foot pedal lever 122, which will hold wheels 12 in an unretracted position by the action of roller pawl 148 engaged in upper rest 144 or lower rest 146 of ratchet member 140. In traveling down the road at normal speeds, wheels 12 should be fully retracted (raised). At rest or at very low speeds, wheels 12 should be held extended, as represented by roller pawl 148 engaged in lower rest 146 and by foot pedal lever 122 held fully forward by feet on foot rests 120 (FIGS. 8a and 8b). To park the vehicle upright, foot pedal lever 122 should be secured forward by latch 154, which is illustrated as having a hook shape and engaging rests 120 (see especially FIG. 8a).

Presuming the parts are in the FIG. 8a position, roller pawl 148 is engaged in lower rest 146 and side wheels 12 are fully extended, as shown in FIG. 8b. Parts are locked in this position because roller pawl 148 is engaged in the lowermost rest 146 in ratchet member 140, and latch 154 is engaged to foot pedal lever 122. To release this, the driver depresses foot pedal lever 122 in FIG. 8a, and the force of gravity releases hook latch 154. Upon removal of foot pressure, foot pedal lever 122 will retract against stop 127 driven by air spring 132 acting between arm 134 and upper crank arm 116. The driver then presses handle 180 toward handle 150 on ratchet 140, pushing both against foot pedal lever 122, thereby stretching tension spring 136 to permit ratchet member 140 to pivot away from pawl 148 to release from ratchet member 140, thereby permitting air spring 132 to act on upper crank arm 116 to rotate torque tube 100 to raise arms 14 supporting wheels 10. Actually, FIG. 8a represents when foot pedal lever 122 has been almost fully extended.

A valuable lesson was learned with this linkage, and a modification effected to improve the safety of the vehicle. The linkage as described above allowed the driver the option to leave the side wheels partially extended while driving, either on purpose or by accident, and then forget to fully retract the side wheels as driving continued. During driving at road speed in dynamic balance, the partially-retracted side wheels have no effect. Thus the driver is unaware of partial side wheel extension until a corner of sufficient sharpness is rounded at a sufficient speed to cause the side wheels to contact the road. At side wheel touchdown, the driver is typically surprised and terrified, as he or she is no longer able to stay on the road in the lane of intended travel. The lesson here is that an intermediate position of the side wheels must require continuous driver action (such as continuously holding a switch closed with a foot or a hand) to maintain said position. Any intermediate side wheel position which the driver can set and forget during normal driving is very dangerous.

The modification to the design described in the original application which achieved this improvement was to redesign handle 180 such that when the feet are removed from foot rests 120, a foot switch lever detecting the lack of foot pressure, similar to item 200 on FIG. 13a, causes the pressing of handle 180 toward handle 150 and against foot pedal lever 122, completing the retraction of the side wheels whenever the feet are removed from the foot rests 120. In this way the "set and forget" danger is removed.

Other valuable lessons learned through experimentation were (1) the possibility and danger of the driver either putting the vehicle in motion and attempting to drive the vehicle with the side wheels locked in the extended parking position; and (2) the driver shutting off the engine and attempting to exit the vehicle without the side wheels locked in the extended parking position. Problem (1) will cause the driver to wonder why the wheels do not retract, rather than pay attention to his or her driving; and problem (2) causes the vehicle to tip over as the driver exits the vehicle.

The solution to these problems lies in a warning system:

1. FIG. 24 illustrates a warning system to eliminate the danger of a driver attempting to drive the vehicle with the side wheels locked in the extended parking position. Switch 703 is mounted on the hand throttle which detects the advancing of the throttle above a fast idle. Switch 702 is mounted on hook 154 to detect the parking latch engaged to the foot pedal lever position. These two switches are wired in series with switch 701, which detects when the side wheels are extended to the parking position. These switches, wired in series with the warning means 705, form a warning circuit which can detect an intent to drive the vehicle with the side wheels locked in the extended parking position, and warn the driver through a horn, light, or combination means. Another switch can detect transmission selector position and, in series with the hook switch and side wheel switch, can detect the intent to drive the vehicle by the gear selector in positions other than park or neutral. Another switch can detect vehicle speed and, in series with the hook switch and side wheel position switch, give a warning above a designated speed.

2. FIG. 25a illustrates a warning system to eliminate the danger of the driver attempting to exit the vehicle with the motor off and the side wheels not locked in the extended parking position. Switch 702, mounted on hook 154 to detect hook position and side wheel extension detection switch 701, may be used in combination with a detector which indicates whether the engine is running or not. The ignition switch is not desirable as a detector in this capacity, because the engine may stall with the ignition switch in the ON position. In such case, the driver could think the ignition switch was off. Since there would be no warning, the driver might mistakenly believe the side wheels are locked in the extended parking position.

One way to detect whether the engine is running or not is measuring the engine alternator output, which is normally done in automotive practice by a charge light relay, which lights what is commonly called the "idiot light" in most automobiles when the engine is not running with the ignition key on, or if there is a defect in the charging system. The voltage created by the alternator running, which prevents the charge light relay from lighting the idiot light, can power the solenoid of the engine off relay 700, breaking the circuit when the engine is running. The warning circuit is powered directly by the battery, so the circuit can function whether the ignition is on or off. When the engine is running and the alternator is charging the battery, the engine off relay solenoid is energized to cut off the battery power to the warning circuit. The parking latch 154 position switch 702, in combination with a side wheel extension switch 701 and the engine off relay 700, can detect when the engine is not running and the side wheels are not locked in the down position for parking, and warn the driver through a horn, light, or combination means. Further enhancements include a switch on the parking brake to detect the parking brake engaged (FIG. 25b). The intent of the warning circuit would be to make sure the side wheels are in the locked extended parking position and the parking brake is set before the driver exits the vehicle. These warnings are unique to this type of vehicle and can be used in combination with the standard automotive and motorcycle warning and safety systems such as those which (1) do not allow starting of the engine when the vehicle is in gear or without brakes applied, (2) require that automatic transmission vehicles must be in park before the key can be removed from the ignition, and (3) provide the "attach-seat-belt" warning, etc. Alternatively, they may be a separate safety system on the vehicle.

It may be said that my mechanism has a hierarchy of spring forces. The strongest spring force is air spring 132, always trying to retract wheels 12. The intermediate level spring force is tension spring 128 that always tries to retract foot pedal lever 122. Spring 128 is overcome by spring 132 during the process of retraction of the side wheels, whereupon the ratchet member 140 is forced from rest 146 to rest 144. The other two springs 136 and 164 are the weakest because their force collectively must be less than the force of air spring 132. In FIG. 7a, thus, when lever 180 is forced by hand or foot against lever 150 and together they are forced against foot pedal lever 122, air spring 132 prevents the side wheels from going down. If the force of air spring 132 were not stronger than the collective force of springs 128 and 136, then instead lever 180 would not pivot on foot pedal lever 122 and foot pedal lever 122 would be forced forward and the side wheels would be forced down.

Suppose the vehicle 10 is in repose in the FIG. 8a position, then has the motor turned on and starts to move. During very low speeds, movement along the road surface with side wheels down would be satisfactory, or if stopped at a stop light. Hook latch 154 will be released as the driver's feet press foot pedal lever 122 forward. When the speed reaches some level, say 10 miles per hour, the support of side wheels 12 are no longer needed, and the wheels are raised first by release of foot pressure (position in FIGS. 7a and 7b), and then retracted by pressing handles 180 and 150 against foot pedal lever 122, or automatically in the redesign and preferred embodiment, so that the FIGS. 5a and 5b parts relationships are assumed.

Figure 5B:
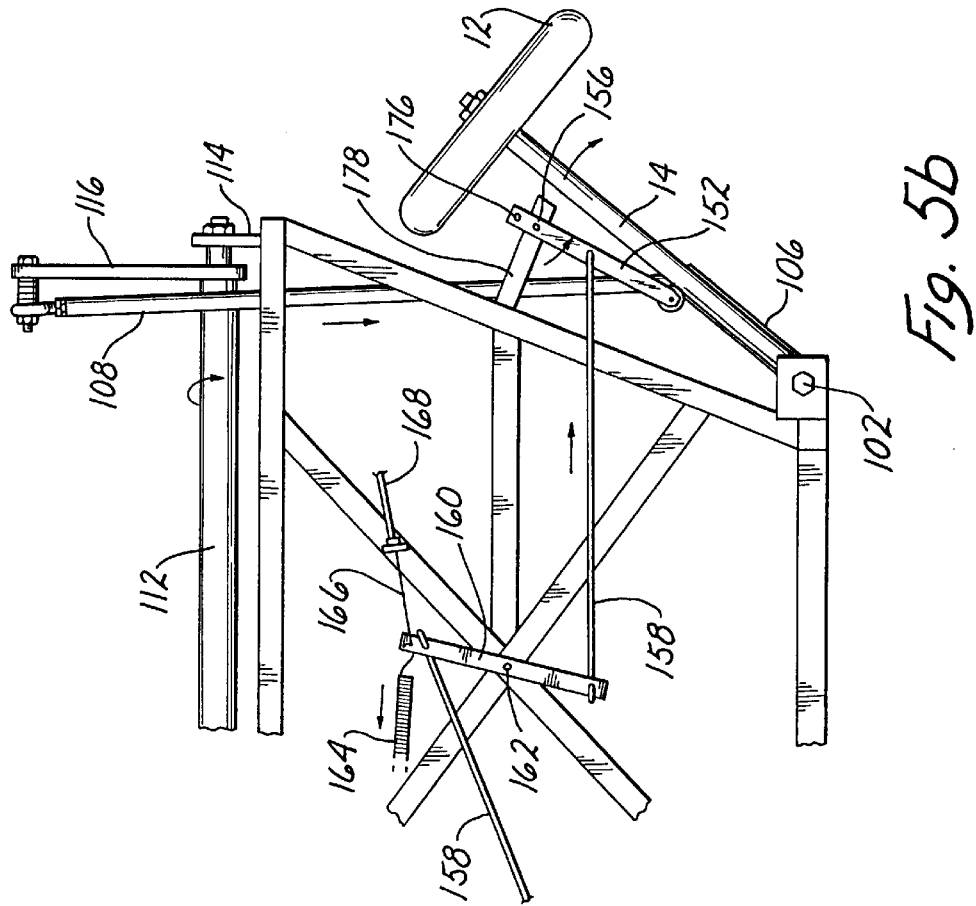
Figure 5A:
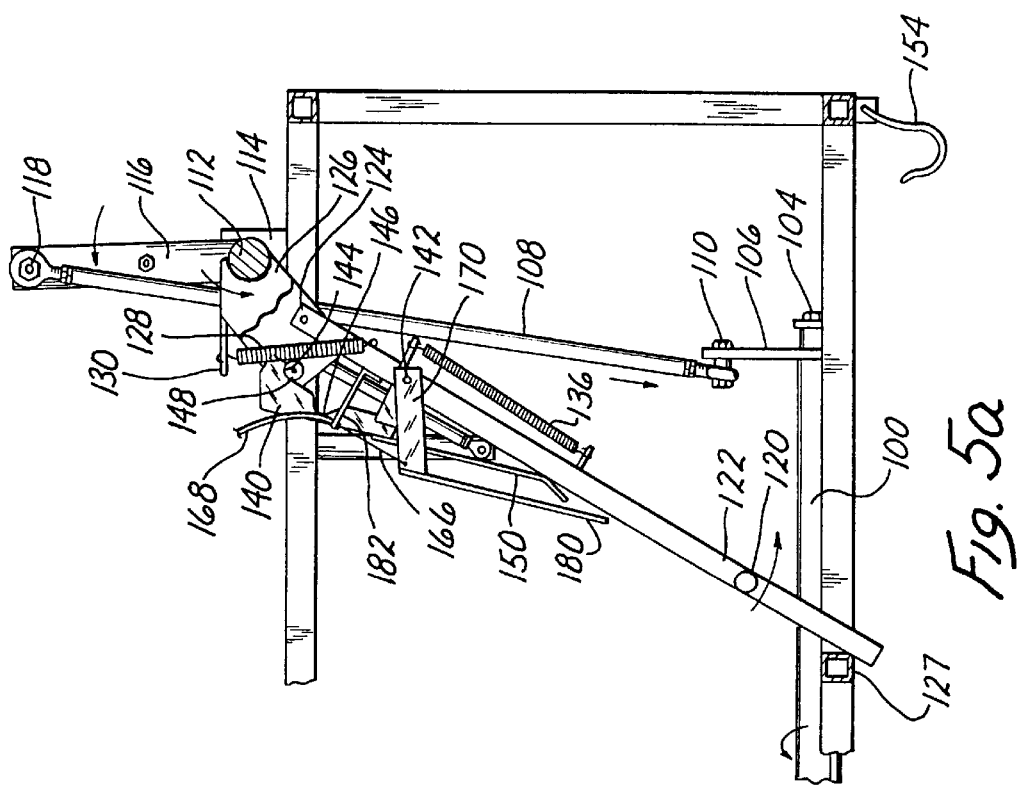
FIG. 5a is an elevational view of a foot pedal and associated parts.
Figure 9:
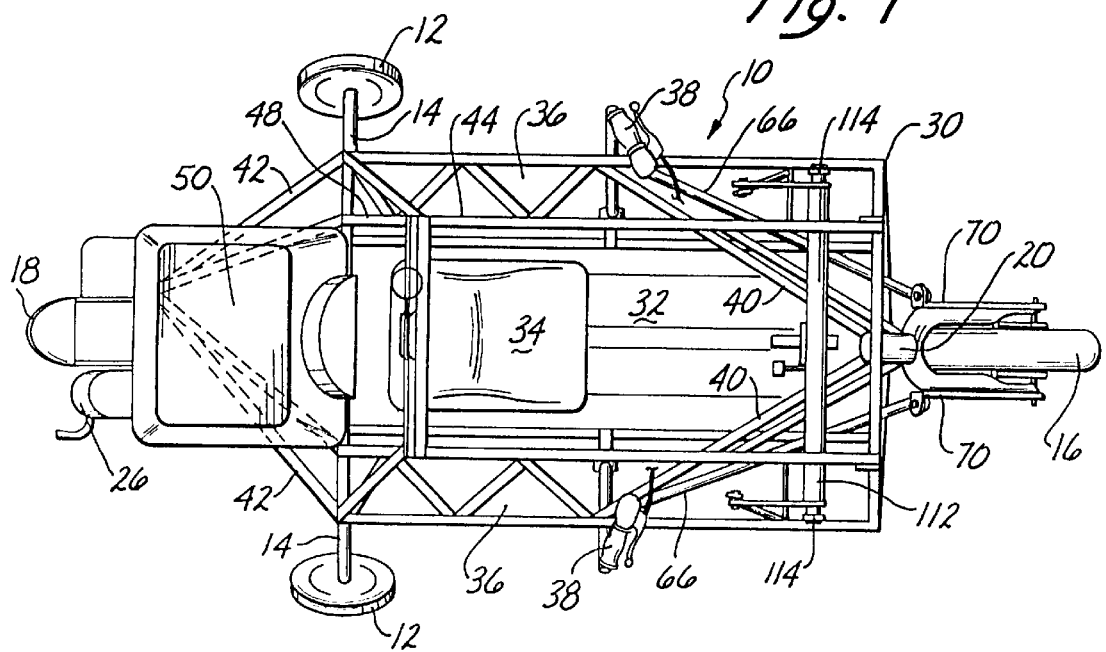
FIG. 9 is a top view of the vehicle.

When, during travel, the vehicle is slowed sufficiently, the side wheels 12 may be extended by applying foot pressure on rests 120 to move the parts from the FIG. 5a position toward the FIG. 6a position. As the parts move from the FIG. 5a to the FIG. 6a position, ratchet 140 is engaged with pawl 148 so that plates 126, lateral torque tube 112, upper crank arm 116, connecting rod 108, longitudinal torque tube 110, and arms 14 lower side wheels 12 to the partially extended position shown in FIG. 6b.

It will be noted at this point that a pawl lever 152 has assumed a position against arm 14 to prevent raising of side wheels 12 (FIG. 6b). This is because two strokes of the foot pedal lever 122 are needed to fully lower side wheels 12, and pawl lever 152 is holding wheel 12, which holds from retraction the entire assembly. Foot pedal lever 122 is free to pivot rearwardly to stop 127, driven by spring 128, when foot pressure is released. The driver depresses foot pedal lever 122 a second time to bring the parts to the FIG. 8b situation. I will later describe how pawl lever 152 comes into play.

With the parts in the FIGS. 6a and 6b situation, the feet can be released from foot pedal lever 122 so that the parts can assume the FIGS. 7a and 7b positions. Note that the side wheel parts are in the same positions in FIGS. 6b and 7b. As the parts move from the FIG. 6a to the FIG. 7a position, roller pawl 148 moves from upper rest 144 to lower rest 146. Pawl lever 152 is preventing various parts, including longitudinal torque tube 100, rod 108, upper crank arm 116, plates 126, and air spring 132 from moving so that as spring 128 brings foot pedal lever 122 against stop 127, pawl 148 moves from engagement with upper rest 144 to engagement with lower rest 146. Now as foot pedal lever 122 moves from the FIG. 7a position to the FIG. 8a position, the pawl 148 is engaged with lower rest 146 and side wheel 12 can be moved by the force of feet on rests 120 of foot pedal lever 122 to the fully extended position of FIG. 8b or to some place in between that might be desirable, such as in turning a corner at slow speeds. Side wheels 12 could be secured in the fully extended position by engaging hook 154 with foot rests 120, as indicated in dotted lines in FIG. 8a.

The vehicle 10 is designed so that when side wheels 12 are fully retracted, the vehicle can lean as far as 40 degrees or greater to the vertical on either side, which is necessary in moving around curves at normal speeds in dynamically-balanced motorcycle-like fashion.

It should be explained that the two-stroke foot pedal action is needed because there is a relationship between the force required to raise the vehicle from a 40-degree or more lean to a vertical position, the distance the foot rests 120 can be moved (considering the practical length of extension of the driver's foot, knee, and leg), and the amount of force the leg muscles can be expected to apply. In the two-stroke mode of applying pressure to foot rests 120, approximately one-half the muscle strength is needed. Experience with a prototype of vehicle 10 shows that the two-stroke foot pedal system is suitable for the leg muscle strength of the average person. Whereas three strokes or more of foot pedal lever 122 would be theoretically possible, it would be best avoided because the driver could become confused as to whether he was in his first, second, or third stroke of foot pedal lever 122.

Employment of variable leverage is necessary because less force is necessary to raise the vehicle incrementally (per degree) from 40 degrees lean to vertical. In FIG. 5a, upper crank arm 116 is positioned to be almost parallel to push-pull tube 108. The pivot point 118 moves in an arc which, at this point, is mostly to the rear, and a little downward, providing greatest leverage. In FIG. 8a, when the vehicle is upright and the least righting force is required, upper crank arm 116 is mostly perpendicular to push-pull tube 108. The pivot point 118 moves in an arc which, at this point, is primarily downward, providing less leverage. The moment arm against which the driver's foot is applied is substantially constant, but the moment arm is variable as to the application of the vehicle weight via rod 108 to upper crank arm 116.

It will be observed that there is a pawl lever 152 on each side of vehicle 10, acting on arms 14 supporting wheels 12. Levers 152 are pivotally mounted at 156 to frame 30 and are connected together via rods 158 and a central lever 160 to which they are pivotally connected (and which is pivotally mounted at 162 to frame 30). Note that levers 152 have rollers at their ends to roll on arms 14.

Spring 164 acts on central lever 162 in a direction to extend them to their operative FIG. 6b position, blocking arms 14 and wheels 12 from further retraction, the position assumed between first and second depressions of foot pedal lever 122. A flexible tension cable 166 in a flexible cable sheath tube 168 connects to central lever 162 oppositely to spring 164; i.e., they are both adapted to supply tension to lever 162, but in opposite directions. The other end of cable 166 secures to the pivotally-mounted arm 170 shown in FIGS. 5a, 6a, 7, and 8a, where its sequence of positions is shown.

When arms 14 and side wheels 12 are extended by foot pressure on foot rests 120 through upper crank arm 116, connecting rod 108, and torque tube 100, spring 164 forces the roller ends of pawl levers 152 to press against arms 14, and follow the arms all the way from the FIG. 5b to the FIG. 6b position in which pawl levers 152 are oriented at generally right angles to arms 14 to block arms 14 from returning upwards. In fact, in the FIG. 6b position, pawl lever 152 has gone over center relative to a line 172 going through the point of contact 174 of lever 152 with arm 14, pivotal center 156, and a point where pin abutment 176 at the upper end of lever 152 strikes arm 178 that supports lever 152. By going over center, it will be understood that pawl lever 152 tends to lock in the FIG. 6b position, keeping side wheel 12 from retracting.

Member 152 has been termed a "pawl lever" because it serves the functions of one of the pawls in a traditional ratchet-and-pawl to hold the parts from turning while the handle is being reversely turned so that the ratchet teeth can be grasped in a different location by another pawl in the ratchet-and-pawl mechanism. According to this analogy, roller 148 is the other pawl and rests 144, 146 are the teeth of a two-tooth ratchet.

Returning to the FIG. 6b position, pawl lever 152 holds side wheel 12 from raising while foot pedal lever 122 is being moved from its FIG. 6a position to its FIG. 7a position under the urging of spring 128 once the feet are removed from rests 120 or are moved rearwardly with foot pedal lever 122 as spring 128 urges it rearwardly. In the movement from FIG. 6a to FIG. 7a, roller pawl 148 has moved from engagement with upper ratchet rest or recess 144 to engagement with lower ratchet rest or recess 146. Then the foot pedal lever 122 can be forced forward again and the side wheel 12 can be extended to the FIG. 8b fully extended position, while pawl lever 152 is left behind in the same position it had in FIG. 6b.

Pawl lever 152 is moved from its position in FIGS. 6b, 7b, and 8b back to its original position in FIG. 5b by the driver using foot pressure or hand pressure to press ratchet handle 150 and handle 180 (in the FIG. 7a positions) against foot pedal lever 122, as indicated in FIG. 5a. This releases ratchet 140 and rest 144 from engagement with roller pawl 148, whereupon side wheel 12 is free to retract. In addition, handle 180 acts on arm 170 to pull on cable 166 to pull lever 160 to pull pawl levers 152 back from locked over-center position to their FIG. 5b positions to allow them to be driven by arms 14 to retract.

Note that a bracket 182 supports the end of flexible cable sheath or tube 168 in FIGS. 5a, 6a, 7a, and 8a. If the feet pressure is removed from rests 120 in FIG. 8a, it will return to the FIG. 7a disposition, so that handles 180 and 150 can be pressed to foot pedal lever 122 (FIG. 5a). Note that as handle 180 is pressed toward foot pedal lever 122, handle 180 strikes ratchet handle 150, so that both are pressed against foot pedal lever 122.

Arm 170 of handle 180 can be pivoted to the same pin 142 to foot pedal lever 122 as arm 138 on ratchet 140. Alternatively, they could be coaxial, but separate pins, or unaligned.

Figure 10:
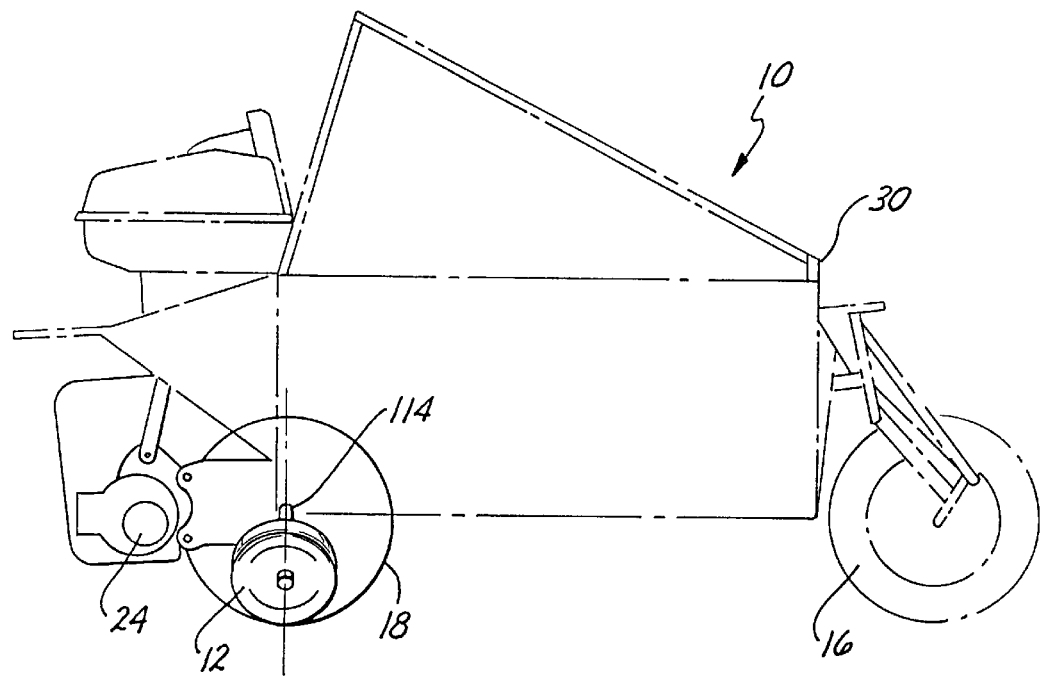
FIG. 10 is a side view of a modification, shown in full lines, to a vehicle shown in dashed lines.

To minimize tire wear when side wheels 12 contact the road during slow-moving turns when driving in the held-upright mode, it would be desirable for the axles of wheels 12 to be in, or as close as possible to, the same vertical plane laterally of vehicle 10 as the axle of rear wheel 18. FIG. 10 illustrates this being accomplished by reversing the normal relative locations of motor 24 and rear wheel 18. Usually in a motorcycle or scooter, the rear wheel is located behind (rearward relative to) motor 24, whereas in FIG. 10 rear wheel 18 is located forward relative to motor 18. This also has the advantage that as power is applied by motor 24 to rear wheel 18, the rear end of vehicle 10 will tend to squat.

Figure 11:
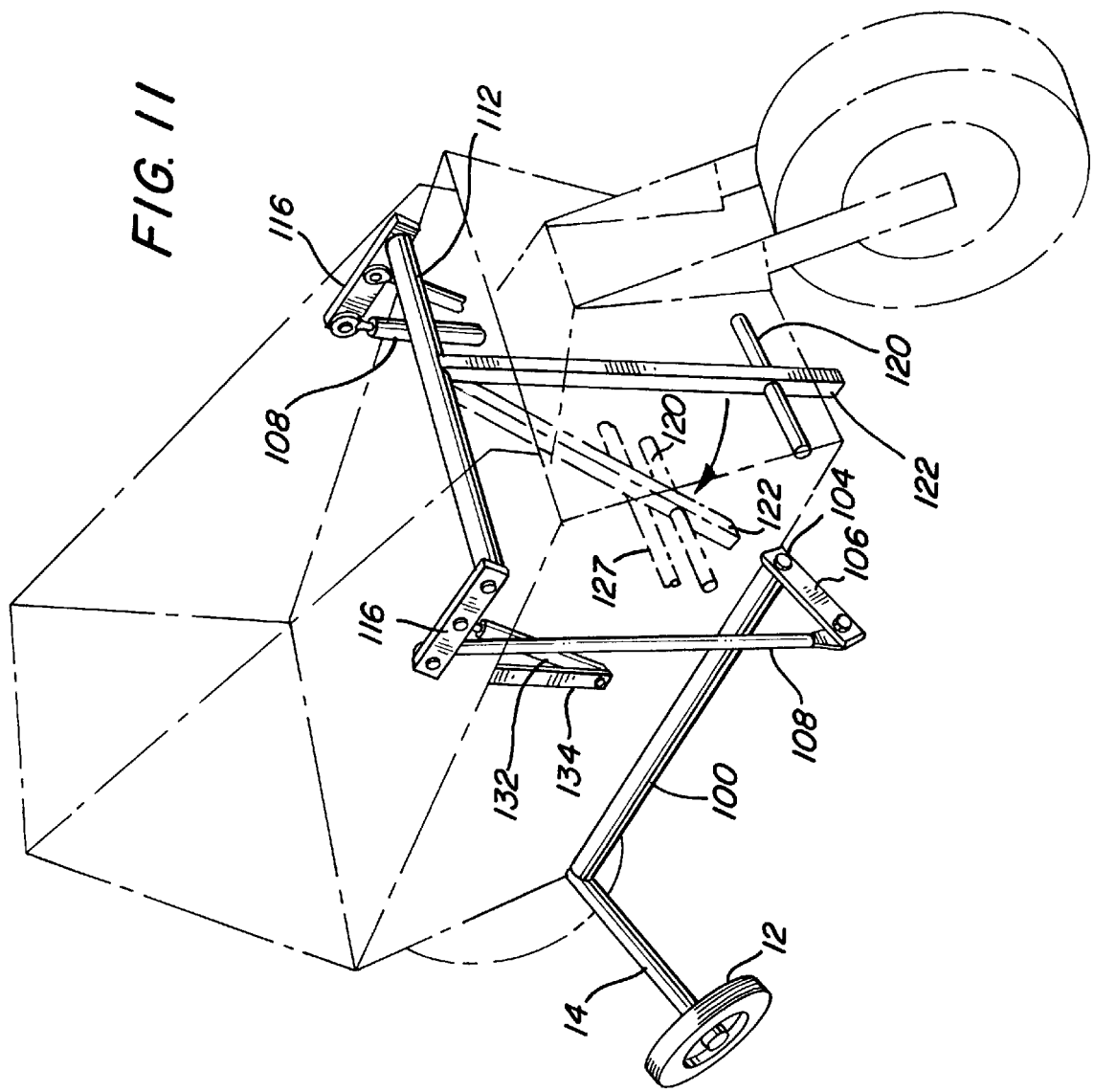
FIG. 11 is a perspective view of a basic linkage for side wheel raising and lowering according to the preferred embodiment.

FIG. 11 discloses the first embodiment basic linkage for raising and lowering the side wheels 12. Depending upon the embodiment, this basic linkage can be used as a primary linkage to transmit all the force required to manipulate the side wheels, and provide side wheel position and the force required to hold the vehicle up with side wheel feedback information, or as a pilot linkage to transmit the control movements to a power assist system, and to supply side wheel position and the force required feedback to the driver. The basic linkage includes a lateral torque tube with a hanging foot pedal connected via push-pull tubes to longitudinal torque tubes, each longitudinal torque tube connecting to an arm mounting a side wheel. The basic linkage would be adequate for a side wheel-equipped vehicle if the vehicle did not have the necessary safety requirement to lean into corners while driving in the dynamically-balanced fashion to the limits of tire traction. This requirement demands the vehicle be able to lean 40 degrees or more from vertical in the dynamically-balanced driving mode while cornering without side wheel contact with the road surface. Retracting the side wheels to this extent precludes use of the basic linkage because, without an improvement in leverage or a power assist, if the vehicle was resting on one side in a three-wheel mode, i.e., on a retracted side wheel and the front and rear wheels, the force required to depress the foot pedal lever to extend the side wheels and right the vehicle would be beyond the capability of most drivers.

The basic linkage (FIG. 11) includes the foot pedal lever 122, rigidly attached to the lateral torque tube 112. The lower end of the foot pedal lever arm mounts rigidly attached foot rest 120. The foot rest 120 includes first and second bar or rod member portions extending laterally and perpendicularly to the foot pedal lever 122. Thus, foot rest 120 preferably provides resting portions for both feet. The lateral torque tube 112 is rotatably mounted at each of its ends and mounts fixed upper crank arms 116 at each end. The respective upper crank arms 116 are, in turn, rotatably mounted to respective push-pull tubes 108. Air springs 132 are pivotally mounted to each of the upper crank arms 116. The lower end of each push-pull tube 108 is pivotally mounted to a lower crank arm 106 which is, in turn, rigidly mounted to a longitudinal torque tube 100, which is rotatably mounted at each end. Each longitudinal torque tube 100 rigidly mounts arm 14, which respectively mounts one each of the side wheels 12. The lower crank arm 106 pivots in a plane generally perpendicular to that in which the upper crank arm 116 pivots. Finally, FIG. 11 illustrates the foot pedal lever retraction stop 127, which is mounted to the frame of the vehicle.

FIGS. 1, 2, 3, 5a, 5b, 6a, 6b, 7a, 7b, 8a, 8b, and 9 illustrate the basic linkage used in conjunction with a ratchet-and-pawl mechanism to reduce the strength requirements for the driver to manipulate the side wheels, by allowing the driver to use two full strokes of the foot pedal lever 122 to move the side wheels 12 from the retracted position to the extended position. Spreading the total amount of work required to extend the side wheels from the retracted position to the extended position (the amount of work remains a constant) from one full stroke of the foot pedal, as in the first embodiment basic linkage, to two full strokes of the foot pedal reduces the driver leg strength requirement by one-half (work=force×distance). If distance (two full strokes) is doubled and work remains constant, then force is cut in half. Spreading the work over three full strokes would further reduce the driver leg strength requirement.

FIGS. 12, 12a, 12b, 13, 13a, 13b, 14, 14a, and 14b illustrate an embodiment employing motorized partial side wheel extension and retraction, together with the basic linkage of FIG. 11. This embodiment employs a linear actuator 204 to eliminate the ratchet-and-pawl mechanism and the multiple foot pedal strokes of the embodiment of FIGS. 1, 2, 3, etc., while maintaining the reduced strength requirement for the driver. In this embodiment, the linear actuator, in effect, mechanically performs the first stroke of the two-stroke ratchet-and-pawl embodiment when the driver positions his or her feet on the foot pedal lever to lower the side wheels. The embodiment of FIG. 12 includes a switch 198, a foot switch lever 200, a linear actuator rod 202 with rod eye at end, the rod eye as illustrated coaxially mounted with foot rest 120, and a linear actuator 204 with mounting eye 208. As known in the art, the linear actuator 204 normally includes a direct current (D.C.) electric motor which, when actuated, extends or retracts the rod 202 from the body of the linear actuator (increasing or decreasing the distance between mounting eyes located at the opposing ends of the linear actuator) typically by means of a motor-driven screw mechanism. Reversing the polarity of the electric force supplied to the linear actuator motor reverses the direction of travel of the rod 202 into or out of the linear actuator 204.

Figure 12:
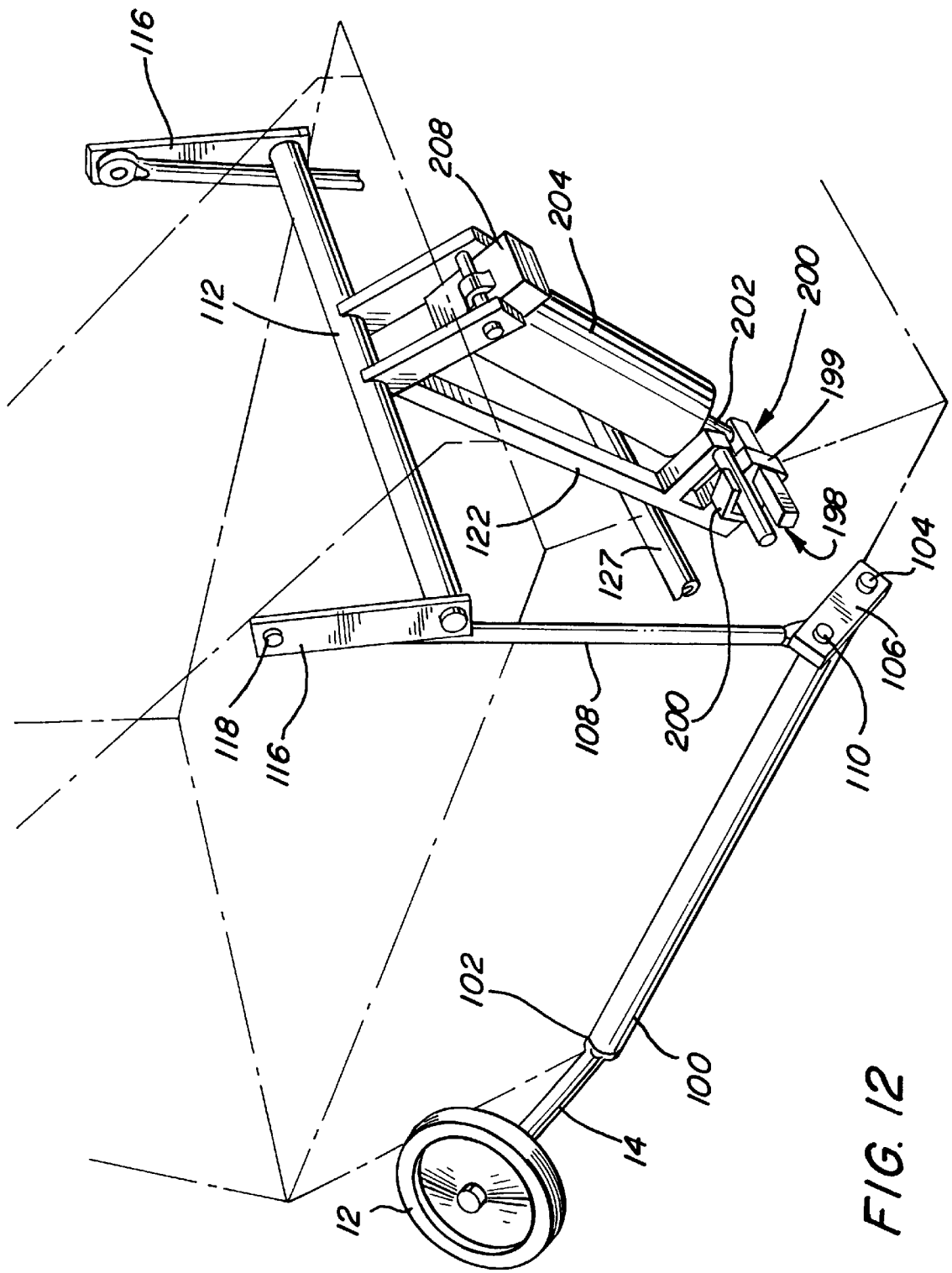
Figure 12B:
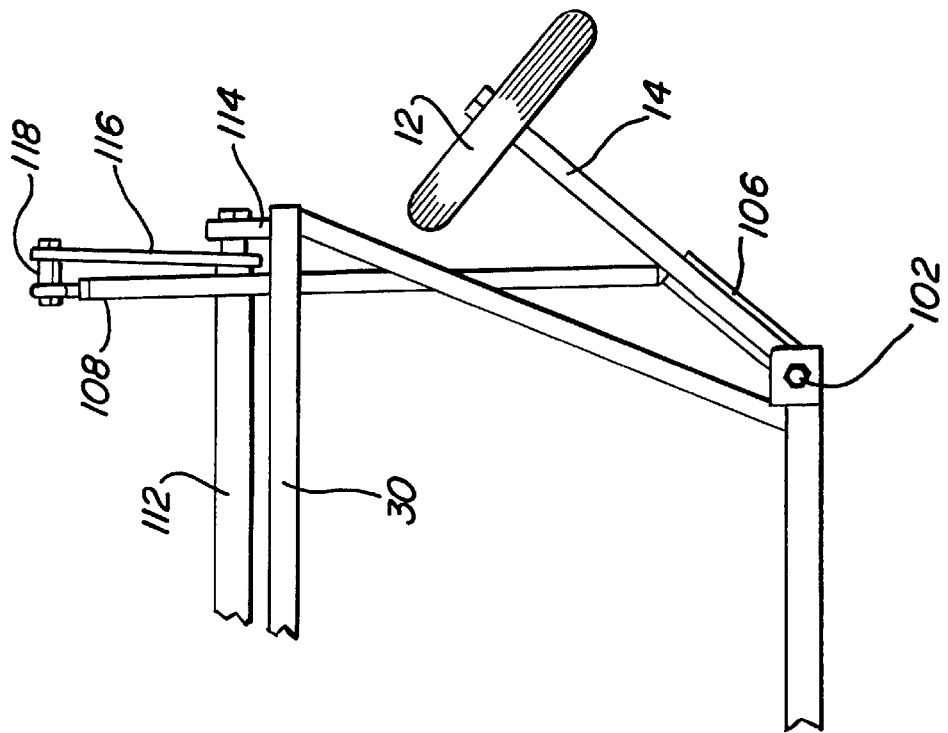
Figure 12A:
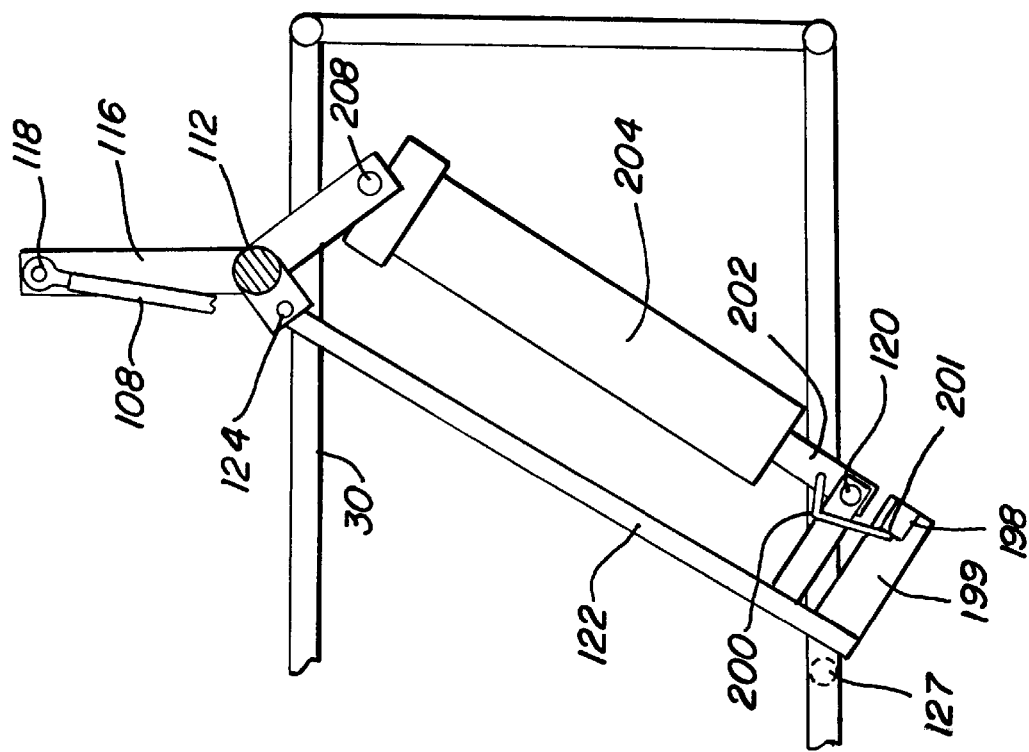

As further shown in FIG. 12a, the switch lever 200 is an inverted "L" shape lever fixed to the pivoting shaft 201 of switch 198 which is mounted on bracket 199, which extends from the foot pedal lever 122. The switch shaft, and thereby the foot switch lever 200, is internally sprung in switch 198 to a normal position; in this case, the normal position is illustrated in FIGS. 12 and 12a. After sufficient pivoting travel of shaft 201 to cause the switch to change contacts internally from the normal switch contact position (associated with retracted side wheels position) to the depressed switch contact position (associated with the linear actuator extended position), the foot switch lever 200 bottoms out and nests against foot rest 120, which then functions as in the first embodiment to carry the force of the driver's leg to further extend the side wheels.

The retracted side wheels position and associated linkage and switch positions are illustrated in FIGS. 12, 12a, and 12b. Switch lever 200 pivots shaft 201 when depressed by the driver's foot, when the driver deems it necessary to extend the side wheels. This causes the linear actuator 204 to extend the linear actuator rod 202. As illustrated in FIGS. 13, 13a, and 13b, the linear actuator rod 202 extends, forcing rotation of the lateral torque tube 112, rotating upper crank arms 116 forcing the push-pull tubes 108 downward, thereby extending and lowering side wheels 12. It may be noted that, in the position shown in FIG. 12, 12a, 13, and 13a, the foot pedal lever abuts and pushes against the frame-mounted foot pedal lever stop 127. The linear actuator 204 preferably lowers the wheels from a retraction position which allows approximately a 50-degree vehicle lean angle when the vehicle is resting on a retracted side wheel and the front and rear wheel statically, to about a 20-degree static lean angle. The force required is exerted solely by the linear actuator through the linkage between the side wheel resting on the road surface and the lever 122 pushing against stop 127.

Once the vehicle has been elevated to the 20-degree lean angle as described above, the remainder of the lowering of the side wheels 12 which will raise the vehicle from a 20-degree lean angle to vertical is achieved by application of driver-applied force through pedal 120, as illustrated in FIGS. 14, 14a, and 14b. This force is transmitted from the foot pedal lever 122 through the already extended linear actuator to force further rotation of the lateral torque tube 112, resulting in further side wheel extension and further righting of the vehicle to vertical.

A parking latch 154 is again preferably used to retain the wheels 12 in the extended, lowered position, to hold the vehicle upright when parked (FIG. 8a). The parking latch 154 holds switch lever 200 against foot rest 120, thereby holding the linear actuator rod extended and the foot pedal lever extended while the vehicle is parked, in the same manner the driver holds the side wheels extended when driving.

Figures 1, 44:
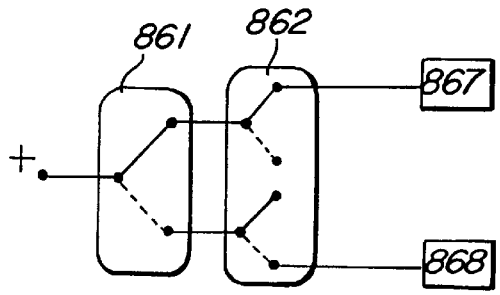
Figures 2, 44:
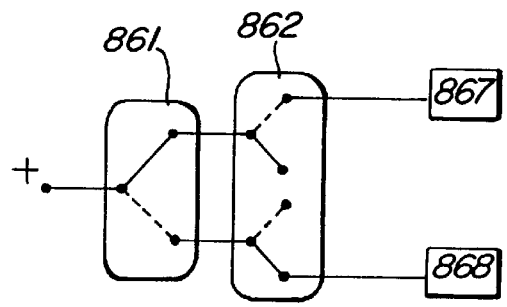
FIG. 2 is a side view.
Figures 3, 44:
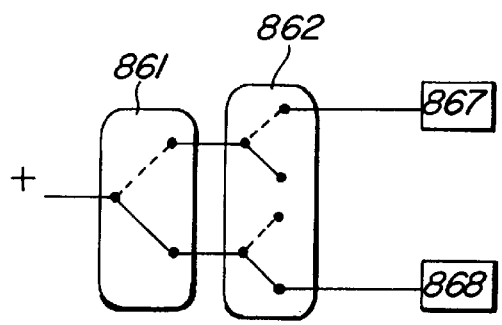

A component not illustrated in some figures, but necessary in all embodiments and illustrated in FIGS. 2, 6a, and 11, is a device to provide force to cause retraction of foot pedal lever 122, and thereby to retract side wheels. An arm 134 attached to the vehicle frame mounting one or more springs or air springs and connected to one or both upper crank arms 116 provides necessary force to cause the side wheels to retract as driver foot pressure is diminished sufficiently or removed from the foot pedal. Reduced pressure on the foot pedal by the driver allows the air springs 132, illustrated in the FIG. 11 basic linkage, to raise the side wheels to the approximately 20-degree position in this embodiment. When the driver removes his or her foot from the switch lever 200, the switch 198 opens due to internal spring mechanism pressure to return the switch contacts to the normal position (FIGS. 12, 12a), reversing the polarity of the electric current to the linear actuator motor. The linear actuator 204 then retracts rod 202, to complete raising of the side wheels 12.

According to the embodiment of FIGS. 12, 12a, 12b, 13, 13a, 13b, 14, 14a, and 14b, only one full length foot stroke is required to extend the side wheels, and the linear actuator 204 can do three-fifths of the extension of the side wheels, considerably reducing the leg strength required from the driver. Allowing the driver's leg to perform the last two-fifths of side wheel extension retains the tactile operation feedback that is required so that the driver can detect when the vehicle is close enough to dynamic balance to retract the side wheels without affecting vehicle direction.

An improved variation of this embodiment forces a positional relationship between the position of the linear actuator extension and retraction to the foot pedal lever position. As the foot pedal lever 122 is depressed or retracted, the linear actuator 204 extends or retracts simultaneously in a relative amount. Thus, a slight extension of the foot pedal lever 122 causes a slight extension of the linear actuator 204, and both extension movements are added together by the linkage to cause side wheel extension equal to the sum of the movements. Moving the foot pedal lever to one-half-stroke position causes one-half extension of the linear actuator 204. Full stroke extension of the foot pedal lever 122 results in full extension of the linear actuator 204. This can be done with a mechanical linkage or by computer.

FIGS. 23a and 23b illustrate a method to mechanically accomplish a positional relationship between the foot pedal lever, as selected by the driver, and the linear actuator, moving in response to the driver manipulating the foot pedal lever. FIG. 23a shows the relationship between the foot pedal lever 122, the cam 600, and the lateral torque tube 112. FIG. 23b shows cam and switch detail. Tension cable 603, attached to the foot pedal lever 122, is used to rotate cam 600 mounted pivotally and coaxially on the lateral torque tube 112. The tension cable is routed in a sheath 608 which is rigidly mounted to frame 30 on brackets 609 and 610. Tension spring 604 is mounted to the cam to oppose the pull of the tension cable and keep the tension cable taut. Electrical switches 601 and 602 are mounted rigidly to lateral torque tube 112 (mount 607) such that the cam sweeps across the switch plungers, the high land 605 of the cam depresses the switch plungers, and the low land 606 of the cam releases the switch plungers. By moving the mounting point 611 of the tension cable to different points along the length of foot pedal lever 122, the rotational rate of the cam can be made to change relative to the rotational rate of the lateral torque tube. This is because as the mounting point of the cable is moved away from the lateral torque tube 112 toward the foot rests, the tension cable mounting point is more distant from the center of rotation, and the circumferential arc described by the tension cable mounting point 611 is longer when the foot pedal lever is depressed. Therefore, the rotational movement of the cam is increased relative to the rotational movement of the lateral torque tube 112. The rotational movement of the cam can be adjusted so when the foot pedal lever is retracted, the linear actuator is retracted, and when the foot pedal lever is extended, the linear actuator is extended.

The two switches 601, 602 mounted on the lateral torque tube 112 are wired to make an electrical circuit which causes the linear actuator to extend or retract and rotate the lateral torque tube to cause the switches to follow the neutral position defined by the cam and the switch wiring. The extension switch 601 has the authority to extend the linear actuator. The retraction switch 602 has the authority to retract the linear actuator. The switches are circumferentially staggered so the cam land change affects them in a sequential fashion. The extension switch 601, when depressed by the high land 605, does nothing. When cam movement positions the low land 606 under the extension switch 601, the completed circuit causes the linear actuator to extend until the switch 601 (rigidly attached to transverse torque tube 112) has been rotated to the high land 605 of the cam 600 by the extension of the linear actuator. The retract switch 602 is positioned toward the lower land 606 of the cam 604. The retract switch 602, when on the low land 604 of the cam, does nothing. When the retract switch 602 is over the high land 605, by completing a circuit, it causes the linear actuator to retract until the retract switch 602 is once again over the low land. The staggering of the switches 601, 602 creates a neutral point when the extend switch plunger is over the high land and the retract switch plunger is over the low land. Movement of the foot pedal lever causes rotational movement of the cam and causes either the low land to pass under the extension switch plunger, in turn causing an extension of the linear actuator, or the high land to pass under the retract switch, causing a retraction of the linear actuator until the switches 601, 602 reposition themselves once again to the neutral point. The switches 601, 601 chase the cam 600 in an effort to regain the neutral point, thereby extending or retracting the linear actuator based upon foot pedal lever position. The extend switch 601 uses the normally closed contacts to complete the circuit to extend the linear actuator, and the retract switch 602 uses the normally open contacts to complete the circuit to retract the linear actuator. This allows both switches to operate on the same cam.

In this variation, it is necessary to have an emergency linear actuator extend button on the handle bar because if the linear actuator is slaved to the foot pedal lever position and the vehicle were resting on a retracted side wheel and the front and rear wheels, the driver would not be strong enough to move the foot pedal lever to force the extension of the linear actuator to extend the side wheels, similar to the case of the basic linkage first embodiment described above. An emergency linear actuator extend button allows this variation to function in an emergency situation similarly to the third embodiment described above, by extending the linear actuator without regard to the foot pedal lever position.

FIGS. 15–21 show another embodiment employing the basic linkage of FIG. 11 for extending and retracting of side wheels. In FIGS. 15–21, the basic linkage functions as a pilot linkage which controls a side wheel power assist system, either electric or hydraulically powered, and provides positional feedback.

Figure 15:
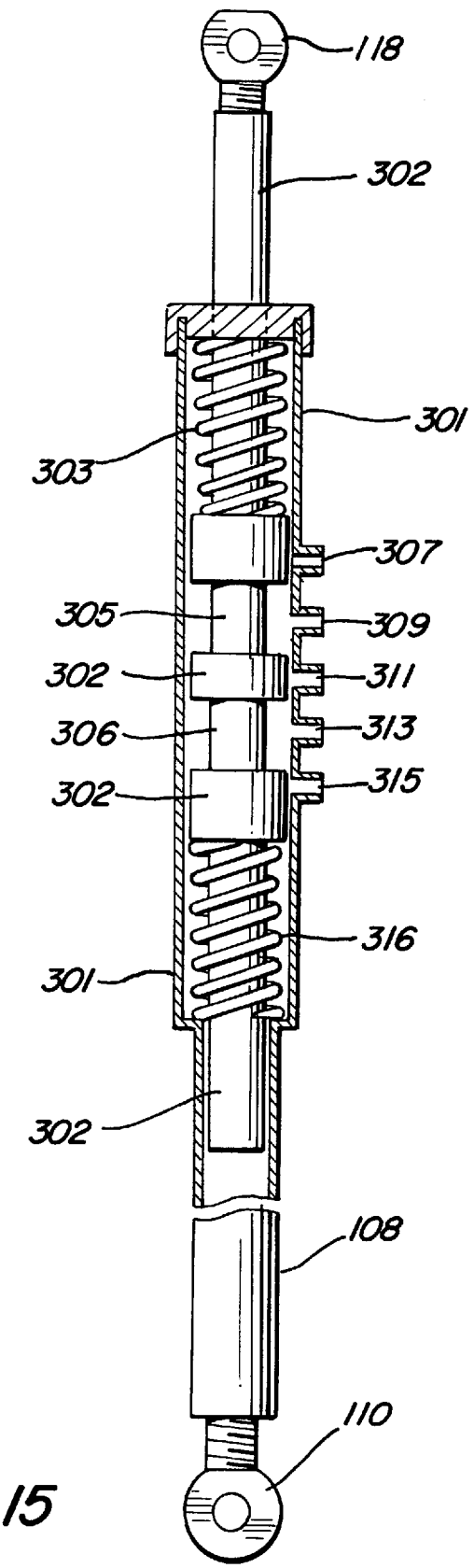

The hydraulic variation of this embodiment employs a spring center spool valve 300 mounted integrally with push-pull tube 108, upper pivotal connection eye 118 a part of valve core 302, and lower pivotal connection eye 110 an extension of spool valve housing 301. As shown in FIG. 15, the spool valve 300 includes a first spring 303, a second spring 316, and a spool valve core 302. The spool valve core provides a first spool portion 305, and a second spool portion 306. In this embodiment, the air springs 132 are sufficient to compress spring 303 to cause side wheel retraction.

A cylindrical wall forms part of the spool valve housing 301 of the spool valve 300 and has a number of ports therein, including return to reservoir ports 307 and 315, extend port 309, pressure feed port 311, and retract port 313. The spool valves receive pressurized hydraulic fluid at port 311 from a conventional hydraulic power package, and circulate return fluid via ports 307 and 315 to the reservoir of the hydraulic power package. Ports 309 and 313 connect each spool valve with the associated hydraulic cylinder 350 (FIG. 16), port 309 connecting with the cap end port 351 of the hydraulic cylinder to provide for rod extension, and port 313 connecting with the rod end port 352 to provide for rod retraction.

Figure 16:
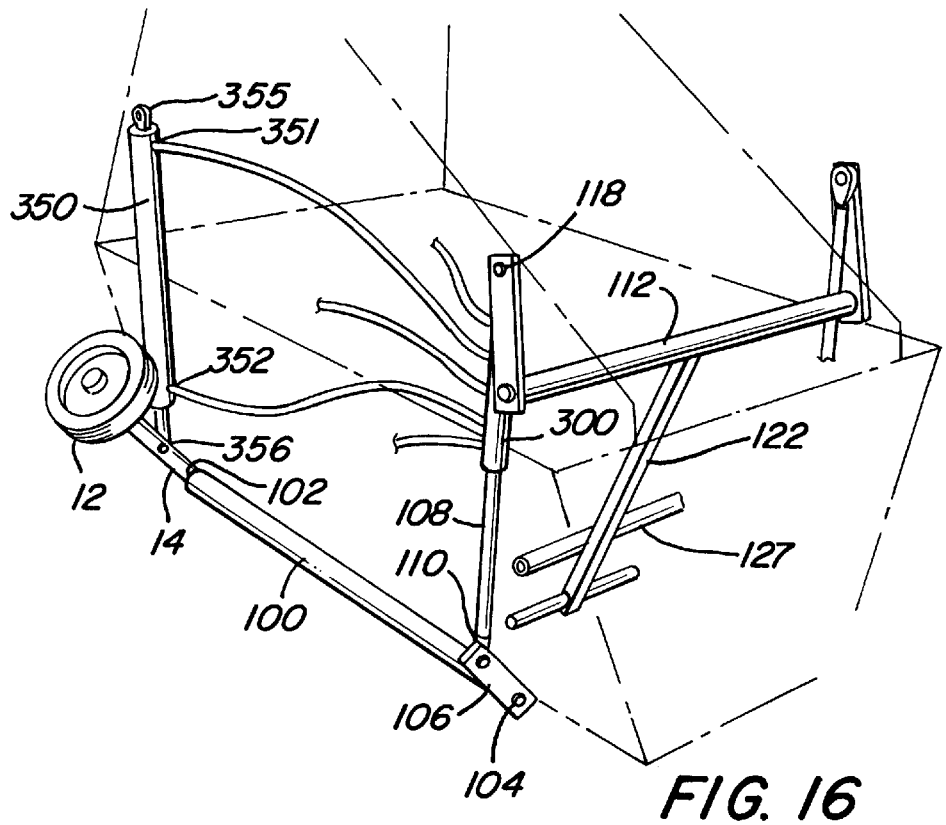
Figure 17:
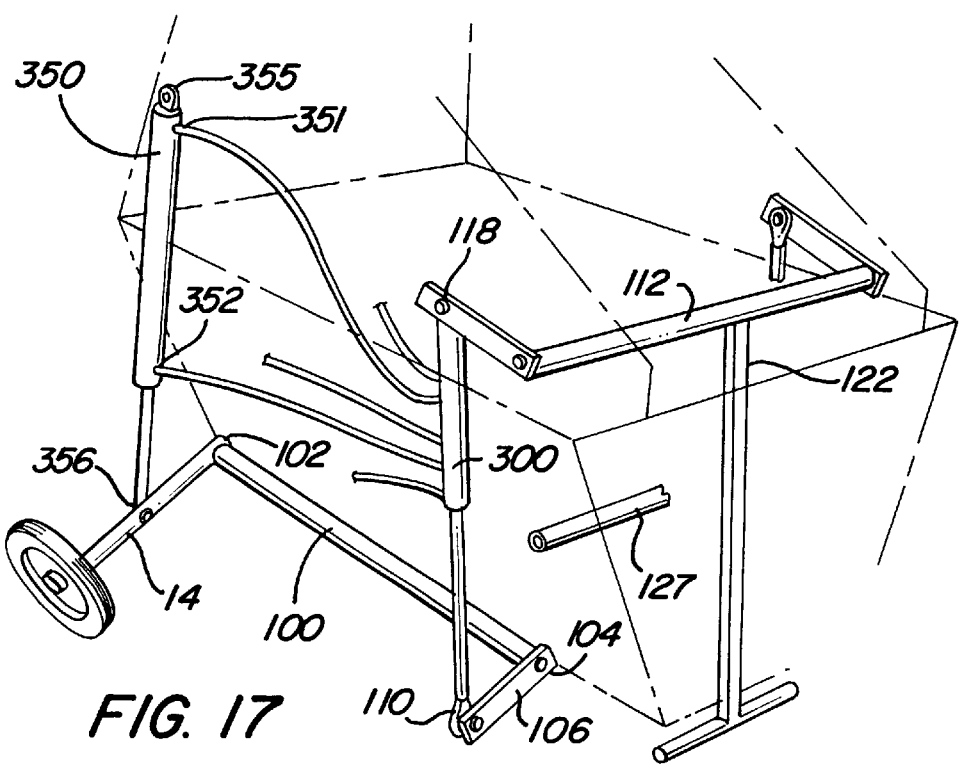
Figure 18:
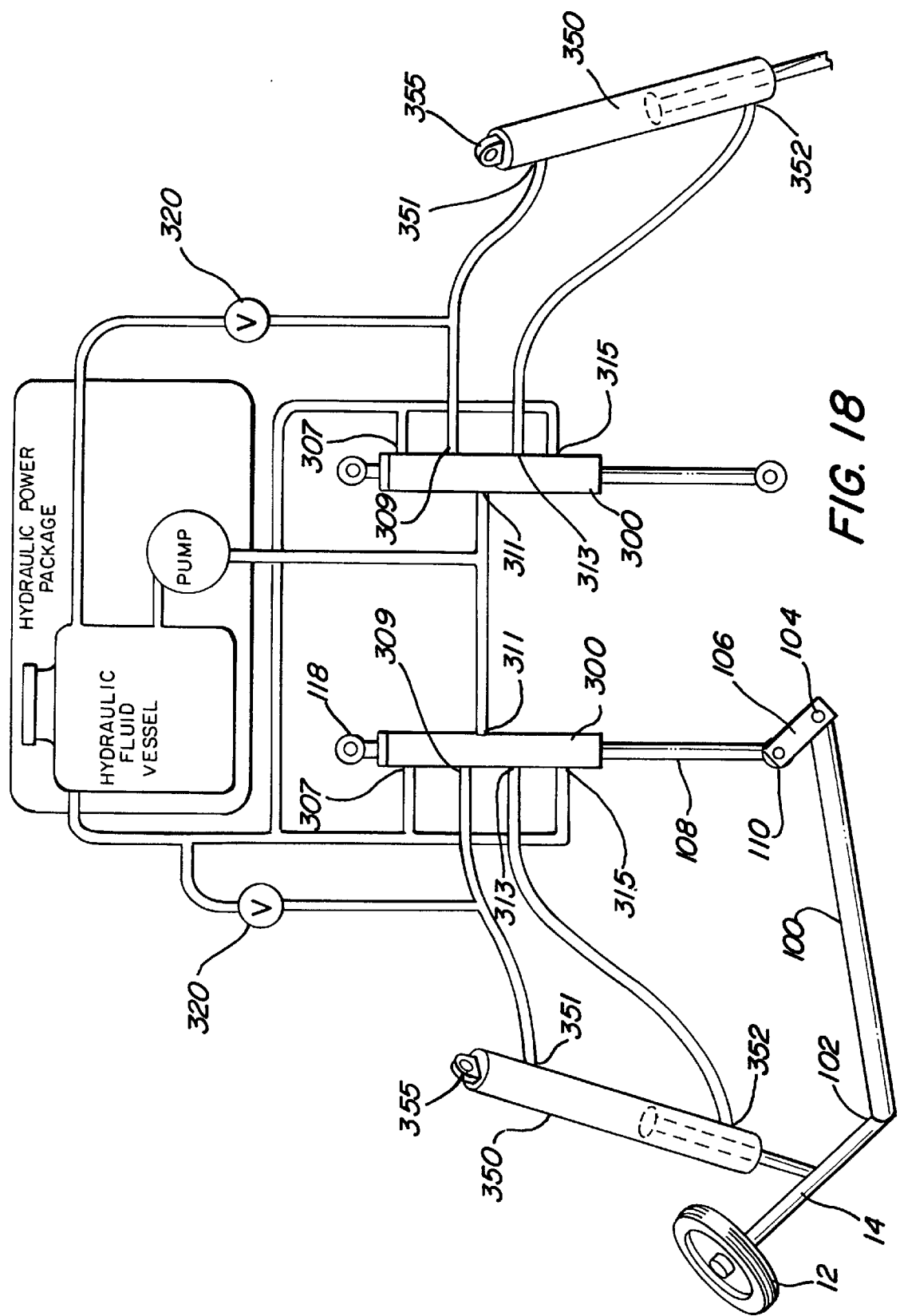

FIG. 16 illustrates the side wheels in the retracted position. The hydraulic cylinder 350 is shown mounted to frame 30 at pivotal connections 355 and to arm 14 at pivotal connections 356. The air spring 132 (as in FIG. 11, not shown) is holding foot pedal lever 122 against stop 127. Springs 303 and 316 reach equilibrium, centering spool valve core 302 in spool valve housing 301, holding the side wheel in the retracted position. The side wheel position is slaved hydraulically to the foot pedal lever 122 position. The first embodiment basic linkage is modified to become a pilot linkage indicating side wheel position and using spring pressure for artificial force feedback. If the foot pedal lever 122 is depressed, spring 316 is compressed allowing displacement of the spool valve core 302 relative to spool valve housing 301. Ports 311 and 309 are allowed to communicate via spool 305, forcing pressurized hydraulic fluid to extend the rods of a hydraulic cylinder 350 (FIG. 18) and, simultaneously, ports 313 and 315 communicate via spool 306 to empty the opposing side of the piston in cylinder 350. The cylinder 350 forces side wheel movement and spool valve housing 301 movement until the spool valve core 302 is once again centered in the spool valve housing 301.

When the driver releases the foot pedal lever 122, the air spring 132 attempts to retract the foot pedal lever 122 to raise the side wheels. The hydraulic cylinder 350 is strong enough to prevent this and thereby does not allow the spool valve housing 301 to move. Air spring 132 is strong enough to compress spring 303 moving spool valve core 302 relative to spool valve housing 301, in the opposite manner of that which caused side wheel extension. This allows pressurized hydraulic fluid to flow from port 311 to port 313 through the spool valve 300 and on to the retraction side port 352 (rod end) of cylinder 350. Return fluid from cylinder 350, port 351, is routed through ports 309 and 307 to the hydraulic power package, allowing cylinder 350 to retract, thereby retracting side wheels until foot pedal lever 122 position is stabilized, and springs 303 and 316 center spool valve core and hydraulic fluid flow is stopped.

Use of hydraulic power controlled through spool valve 300 by this embodiment of the basic linkage causes hydraulic cylinders 350 to provide the majority of the effort required to extend the side wheels, while still providing feedback to the driver on side wheel position.

To provide the continuous force required feedback feature requires optional variable volume pressure relief valves 320 installed between the ports 309 of valve 300 and ports 351 of cylinders 350. The more force required to hold the vehicle in a position using a side wheel, the greater the hydraulic pressure required in the extension side of cylinder 350. The higher the hydraulic pressure, the greater the flow through the pressure relief valve 320, and the further spring 316 would have to be compressed to further open port 309 to maintain the position of cylinder 350. Thus, further compressing spring 316 would increase foot pedal effort for the driver, supplying force required to hold the vehicle up feedback. Force required feedback could also be provided by a bias feature in the spool valve 300 acting upon spool valve core 302, which would be related to pressure in the hydraulic cylinder 350.

Figure 20:
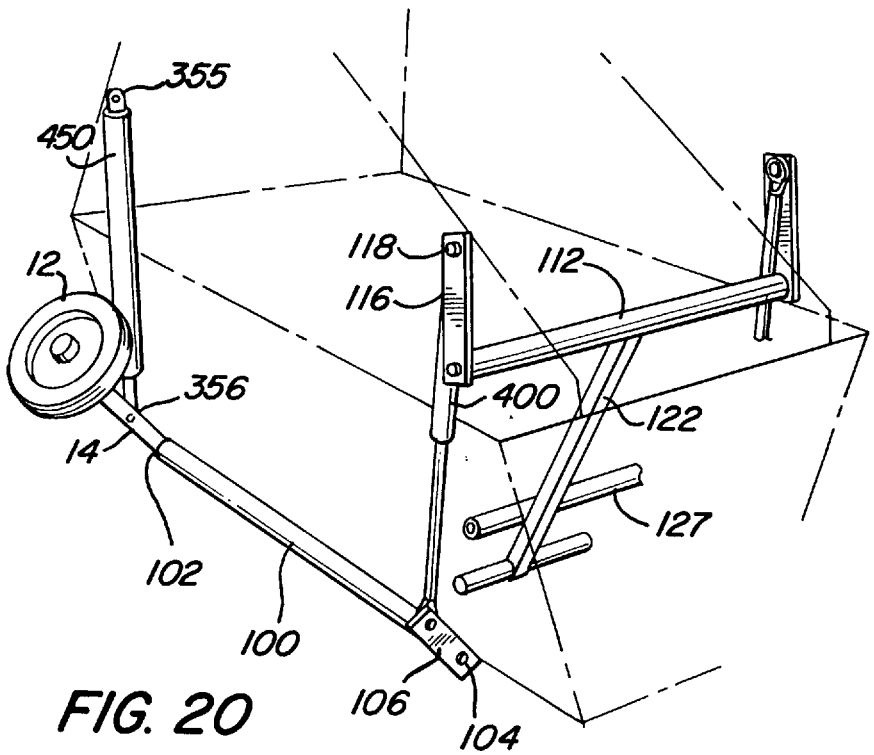
Figure 21:
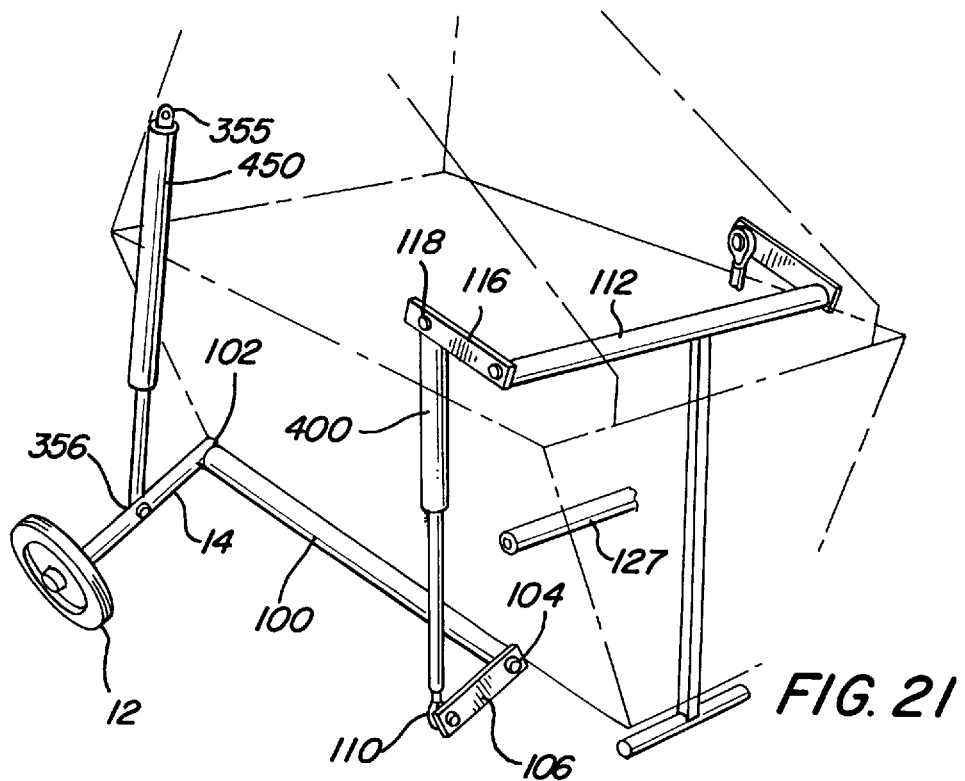

FIG. 19 shows a spring-loaded center off switch 400 integral with push-pull tube 108. In this variation of power assist side wheels, switch 400 is neutral in a spring-loaded center position. FIGS. 20 and 21 show linear actuators located in a similar fashion to the hydraulic cylinders in FIGS. 16 and 17. Movement of foot pedal lever 122 to extend or retract the side wheels, caused either by force of the driver leg (to extend) or by force of air spring 132 (to retract), will cause switch lever 404 to be driven against either extend contacts 406 or retract contacts 408, driving linear actuators 450 to reposition side wheels and pilot linkage such that switch core 402 is centered in switch housing 401 and thus neutralized. The linear actuators 450 are mounted to frame 30 at pivotal connections 355 and mounted to arms 14 at pivotal connections 356.

Another improvement according to the preferred embodiment of a retractable side wheel single-track vehicle allows freezing or restricting rear suspension movement when side wheels are not retracted. The goal is to eliminate variation in vehicle tilt due to suspension compression and extension, caused primarily by acceleration and deceleration when driving with a side wheel contacting the road (in the held up by side wheel mode). Suspension extension and contraction causes the vehicle to rotate about the point of side wheel contact to the road, causing change in vehicle lean angle. When accelerating from a stop and turning a corner simultaneously, the vehicle starts from the position of leaning toward the direction of the corner held up by a side wheel. As the vehicle accelerates and turns the corner, the driver must allow the vehicle to further lean into the corner, supported in part by a side wheel. Simultaneously, the driver is attempting to match the lean angle of the vehicle with the lean angle dynamic balance requires to turn the corner, so the side wheel can be retracted. Rear wheel suspension movement changes the lean angle of the vehicle by elevating or lowering the vehicle, which forces the driver to compensate by moving the side wheels 12, by manipulating foot pedal lever continuously to hold the vehicle at the desired tilt angle. Minimizing the effort and skill required to hold the vehicle at a desired angle eases the transition to and from held up by side wheel driving mode to dynamically-balanced driving mode.

One method to freeze the rear suspension is illustrated by FIG. 22. A hydraulic fluid-filled remote reservoir shock absorber 500 with an electrically-actuated valve 502 located between the shock absorber body and the reservoir 501 will freeze the rear suspension in the compression direction. The valve is actuated by switch 198 when the driver begins to push the foot pedal lever 122, thereby rotating switch lever 200 against foot rest 120. When valve 502 is closed, rod 506 cannot be pushed into shock absorber 500, because the only path the shock absorber hydraulic fluid can take is to move from upper chamber 508 through orifices 509 mounted in piston 511 to lower chamber 510. This is not possible, because as rod 506 attempts to push into the shock absorber, it displaces volume that the fluid flowing from the upper chamber to the lower chamber needs to occupy if movement is to occur. In the normal operation of shock absorber 500, the excess hydraulic fluid expands into reservoir 501, displacing diaphragm 512, but closing valve 502 prevents this, freezing the shock absorber in compression.

An alternative method would be to mount the rear of the longitudinal torque tube 100 on the rear suspension of the vehicle with the side wheel in approximately the lateral plane of the rear wheel axle. Thus, the side wheels would move in synchronization with the rear wheel and thereby eliminate change in vehicle lean angle due to suspension movement.

Figure 1:
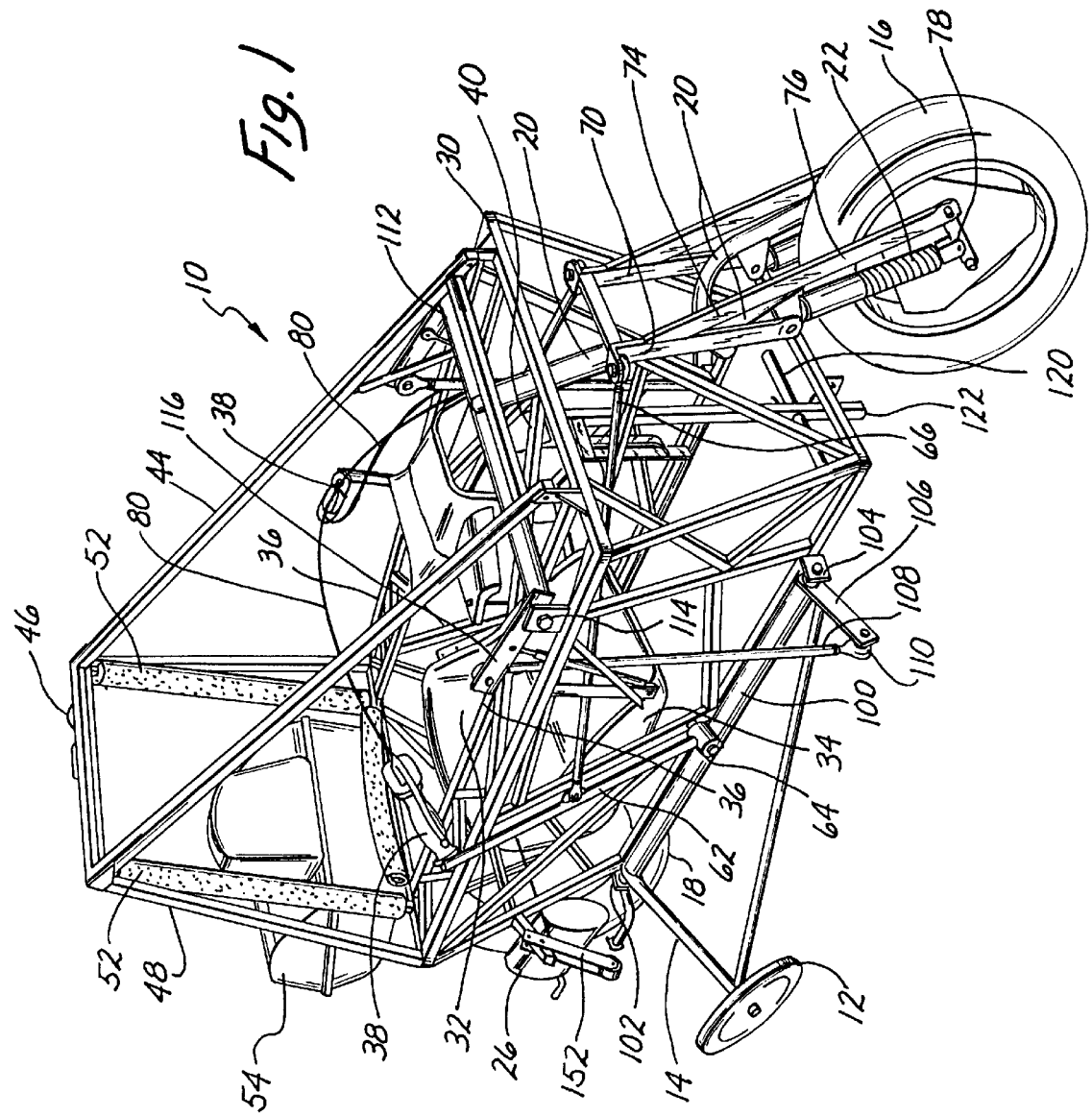
FIG. 1 is a perspective view of a specific embodiment of my new vehicle.
Figure 3:
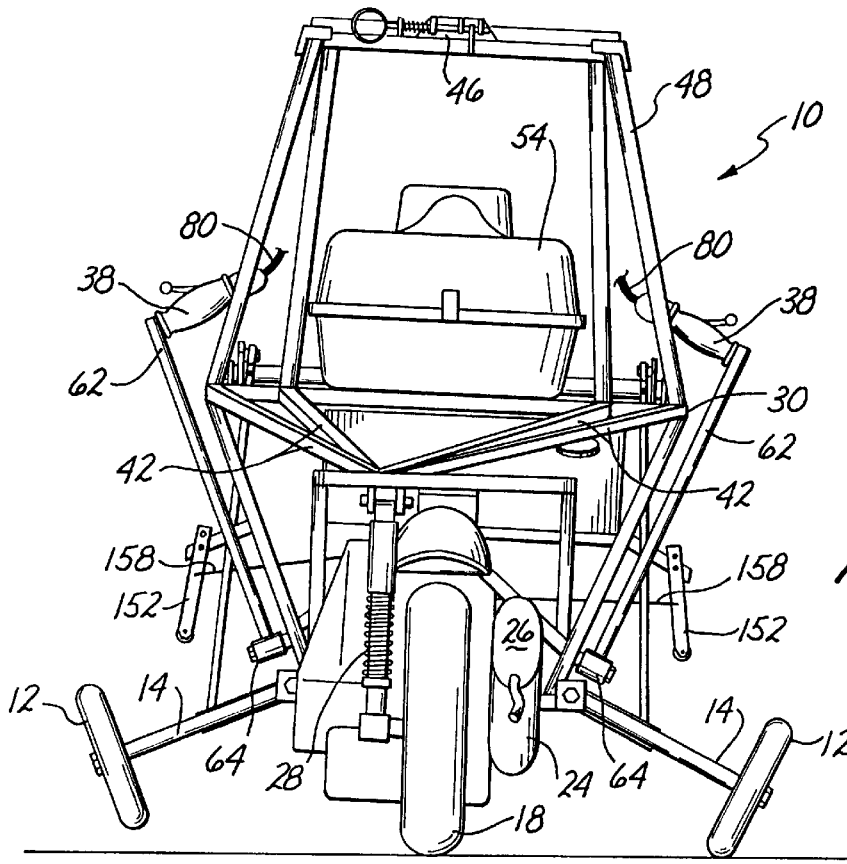
FIG. 3 is a rear view.

As noted above, the side wheel mechanism of various embodiments is actuated by a hanging foot pedal lever 122 (FIG. 1). The hanging foot pedal lever 122 is stowed under the driver's legs when the side wheels 12 are in the retracted position (FIGS. 5a, 5b, 26). When the driver wishes to extend the side wheels 12, the driver lifts and moves his feet aft to engage the foot rests 120 (FIG. 27). The driver then extends his legs (FIG. 28). The advantage of this method of employing a hanging foot pedal lever is that more lever travel is available to extend the side wheels 12, thereby reducing the leg force required to extend the foot pedal lever 122, as compared to the normal automotive practice of short travel foot pedals mounted in front of the driver's feet.

A problem attendant to extending the travel of the hanging foot pedal lever 122 is that, in a head-on collision, the hanging foot pedal lever 122 might move forward violently to injure the driver's legs. FIG. 29 illustrates a locking mechanism which holds the foot pedal lever 122 in the retracted position unless the driver places his feet on the latch lever 803. The latch lever 803 is pivotally mounted to the foot pedal lever at a pivot point 802. The latch lever 803 further has a latch arm 806 mounted at a right angle thereto and a latch 801 formed at the end of the latch arm 806. When the driver's feet push the latch lever 803 forward to the foot rest 120, the latch 801 is disengaged from the tab 805 mounted on the stop 127. The foot rest 120 stops the latch lever 803 from further relative movement when contact is made between the foot rest 120 and the latch lever 803. At this time driver leg effort is transferred to the foot pedal lever 122. When the driver's feet are removed from the latch lever 803, the foot pedal lever is driven rearward by the air spring 132 (FIG. 1), forcing the latch 801 to reengage with the tab 805. The spring 800 holds the latch 801 in the engaged position, and the counterweight 804 locates the center of gravity of the mechanism below the pivot point 802 to prevent the inertia generated in a head-on collision from unlocking the latch 801.

The embodiments of single track vehicles heretofore discussed have included a pair of nonsteerable fixed side wheels. The use of a nonsteerable or non swiveling side wheel which is not in alignment with the rear wheel 18 forces the side wheel tire to be scrubbed sideways when the vehicle is turning while being held upright by side wheels. In order to prevent such side wheel tire scrubbing, it is desirable for the axles of the side wheels 12 to be in, or as close as possible to, the same lateral vertical plane 840 (FIGS. 30 and 40) as the axle of rear wheel 18. If the engine is located behind the rear wheel 18, a substantial rearward weight bias is created, which allows each side wheel to be located adjacent to the rear wheel 18. If a midvehicle engine location is desired, as it is in the single track vehicle of FIG. 30, and the side wheels are in alignment with the rear wheel 18, as also shown in FIG. 30, then, under some extreme conditions of imbalance, the vehicle 10 can tip over on an axis between the front wheel 16 and the extended side wheel 12.

According to the embodiment shown in FIGS. 30–33, adding an extra side wheel 12A or skid per side at the front of the longitudinal torque tube 100 can solve the potential tipping problem. The forward side wheels 12A are designed such that they normally do not touch the road (FIGS. 30–33) except when the vehicle tips up on the front wheel 16 and a first of the rear side wheels 12 (i.e., only the front wheel 16 and a first of the rear side wheels 12 contact the pavement). In such case, the forward side wheel 12a, which is on the same side of the vehicle 11 as the first of the rear side wheels 12, also contacts the road surface, preferably after the rear wheel 18 leaves the pavement by one or two inches, which then prevents the vehicle 10a from continuing to roll over, as shown in FIG. 34. The approach of FIGS. 30–33 results in a single track retractable side wheel vehicle 10a having at least a pair of side wheels 12, 12A per side. The forward mounted side wheels 12A are positioned such that they do not contact the road surface except under extreme tipping conditions in order to prevent front side wheel scrubbing while turning under normal driving conditions with side wheels 12, 12A extended.

FIGS. 35–44 illustrate a side wheel steering system embodiment which allows the side wheels 12 to be mounted at any point along the vehicle length and to be turned as the front wheel 16 is turned. This system includes several improvements. First, the side wheel steering is mechanically isolated from the steering linkage of the front wheel 16. This eliminates most forces related to the side wheel steering control system, and all forces relating to the side wheels interacting with the road surface or obstacles, from feeding back through the steering linkage to the handlebars. Second, the side wheels can be turned perpendicular to the vehicle direction. This is valuable, because if the vehicle loses traction and comes to rest at an extreme lean angle on a retracted side wheel, the effort to right the vehicle can be reduced substantially if the side wheel can be turned perpendicular to the vehicle. Prior art ignores the problem of the side wheels being dragged along the road surface when righting a stationary vehicle from an extreme lean angle. The sideways dragging of the side wheel occurs because, as the vehicle is righted from a tilt, the side wheel 12 moves closer laterally to a line on the road surface which connects the front wheel 16 and the rear wheel 18.

FIGS. 35–38 illustrate mounting a side wheel 12 to the arm 14 using a king pin 823 according to a common automotive practice for achieving steering action. A jack screw 826 pivotally mounts to the arm 14 (pivot 825) and to a steering crank arm 822 (pivot 824). A flexible sheathed drive cable 821 rotatably connects a stepper motor 820 to the jack screw 826. The stepper motor position is controlled by an electromechanical steering position detector 830 (FIG. 39), which detects the steering position of the front wheel 16 and provides an electrical signal indicative thereof to the stepper motor 820. Such detector apparatus, per se, is known in the art.

In FIG. 39, the steering position detector 830 is connected electrically to the stepper motor 820 via an electrical wiring harness 827. The steering position detector 830 is mounted to the frame 30 at pivot 828, and to the upright lever arm 62 at pivot 829. As the vehicle is steered, a plunger 831 on the steering position detector 830 is extended or retracted, thereby causing the stepper motor 820 to rotate to new positions, extending or retracting the jack screw 826 and causing steering movement of the side wheels. If the vehicle 10 comes to rest in the tilted position, depressing an emergency button bypasses the steering position detector 830 and causes the left and right jack screws 826 to be driven to full extension, turning the side wheels 12 perpendicular to the vehicle length, thereby reducing the effort required to right the vehicle by allowing the side wheels 12 to rotate as the vehicle is righted. While driving at speed with the side wheels 12 retracted, the side wheel steering system may be held in the straight-ahead position, if desired, to save wear and tear on the side wheel steering system.

FIGS. 39A, 41, 42, 43, and 44 illustrate an alternative side wheel steering system design. This design allows the use of a standard DC electric motor 820A (shown in FIG. 43) to steer the side wheels 12. A pivot 831 located on a side wheel steering crank arm 822 attaches to a tension cable 832. The tension cable 832 runs in a sheath 833 and, as shown in FIGS. 41 and 42, wraps around a slot 859 of a cam 860, which forms part of a steering sensor switch 900. The tension cable 832 then attaches to an anchored tension spring 853. The tension cable 832 causes rotational movement of the cam 860 when the side wheel 12 pivots on the king pin 823. This structure establishes a one-to-one positional relationship between cam 860 and the steered position of the side wheel 12.

Referring to FIG. 39A, a pivot 850 is located on the upright lever arm 62 and is attached to a tension cable 851. The tension cable 851 runs in a sheath 852 and, as shown in FIGS. 41 and 42, wraps around a slot 857 of a switch mount 856 of the steering sensor switch 900. The tension cable 851 then attaches to a second anchored tension spring 853 and causes rotational movement of the switch mount 856 in a one-to-one positional relationship with the steering position the driver selects.

FIG. 42 shows the respective slots 857, 859 associated with each tension cable 851, 832, but omits cable wrap and tension springs. As noted, each tension cable 851, 832 is constantly held in tension by separate springs 853. The switch mount 856 (FIG. 42) and cam 860 are pivotally mounted on a pin 854, separated slightly by a bushing 864 and axially located by respective collars 855. The switch mount 856 mounts a single-pole, double-throw snap action switch 861 and a double-pole, double-throw snap action switch 862 over cam 860, staggered in rotation.

Relative rotation between the switch mount 856 and the cam 860 allows three switching conditions: (1) both switches compressed, (2) one switch compressed and one extended, and (3) both switches extended. Condition (2), the neutral switching condition (FIGS. 41 and 44-2), occurs when the high land of the cam 860 is compressing switch 861 (FIG. 41), but not compressing switch 862. This is the condition where the side wheel steered position is in the proper relationship to the vehicle steering to follow an arc in the road, resulting in zero side wheel tire scrubbing. When the upright lever arm 62 (FIG. 39A) is moved, as the driver steers the vehicle 10, the movement of the tension cable 851 causes rotation of the switch mount 856 and the switches 861 and 862 so as to cause either mutual compression or mutual extension of the switches 861 and 862. These conditions complete a respective electrical control circuit (FIGS. 44-1 or 44-3), causing either the motor control relay 867 or the motor relay 868 to close, in turn, causing the motor 820A to rotate in the proper direction to steer the side wheel 12 back into the proper relation with the vehicle steering. The steering movement of the side wheel 12, in turn, causes movement of the tension cable 832, which causes rotation of the switch cam 860 until once again switch 861 is compressed and switch 862 is extended. By design, the relative rotation between the switch cam 860 and the switch mount 856 cannot be allowed beyond 360 degrees such that the unused cam ramp land 866 (FIG. 41) is swept by the snap action switches 861 or 862. Otherwise, the system logic would reverse and incapacitate the system.

FIGS. 44-1, 44-2, and 44-3 illustrate the electrical conditions in switching conditions (1), (2), and (3). The motor control relays 867 and 868 direct the rotation of the shaft of the motor 820A in opposing directions and cannot be energized simultaneously.

FIGS. 23a and 23b illustrate a similar switch and jack screw or linear actuator system used in the extension and retraction of the side wheels 12, as discussed above. A difference between the just-disclosed side wheel steering system and the earlier-disclosed side wheel extension and retraction system is that it is desirable to eliminate feedback in the side wheel steering system. The steering position detector 830 or the switch 900 can be adapted to conventional steering, or side steering, as described above.

For clarity of understanding, the definitions of various terms used herein are summarized as follows:

1. Maximum static lean angle: The lean angle measured from the vertical when the vehicle is stationary and resting on three wheels: a retracted side wheel and the front and the rear wheel, with no driver or payload. The vehicle suspension extends when a vehicle is leaned from vertical to the maximum static lean angle because a large portion of the vehicle weight carried by the front and rear wheels is transferred to the side wheel supporting the vehicle at the maximum static lean angle.

2. Maximum dynamic lean angle ("MDLA") (vehicle maximum lean angle, maximum usable lean angle): The maximum lean angle measured from the vertical that the vehicle can achieve when cornering in dynamic balance at normal road speed or greater, without side wheels or other vehicle parts contacting the road and disrupting the dynamic balance. The vehicle lean angle is less than the maximum static lean angle due to suspension compression due to vehicle and payload weight and due to centrifugal force loading the suspension. MDLA cannot be used as an average lean angle sustained over the entirety of the turning of a corner, due to lean oscillation.

3. Greatest average lean angle: This is the average lean angle measured from the vertical a vehicle can maintain while rounding a corner. Driver-induced lean angle oscillation causes all but the most expert drivers to vary the lean angle of the vehicle while rounding a corner. Road surface irregularities such as bumps and potholes tend to magnify driver-induced lean angle oscillation.

4. Optimum tire traction loss lean angle: The lean angle at which tire traction is lost by the vehicle using factory equipment tires while driving on the intended use road surface offering the best tire traction under optimum conditions for tire traction. This concept defines a design feature which controls the ability of a side wheel-equipped single-track vehicle to turn while dynamically balanced. If the vehicle can achieve tire traction loss under ideal conditions at or before side wheel touchdown, then in routine use the chances of side wheel touchdown disrupting dynamic balance (premature side wheel touchdown) are minimized. This is a "must" consideration in order for a vehicle with side wheels to have the same turning capabilities as the equivalent vehicle without side wheels, allowing the side wheels to be a safety improvement rather than a safety hazard.

5. Feedback: Information supplied the driver through the foot pedal lever as to the position of the side wheels and as to the force required to hold the vehicle upright or at a chosen lean angle supported by a side wheel. Side wheel position is indicated by foot pedal lever position, due to the one-to-one relationship or correlation between side wheel position and foot pedal lever position, and force required to hold the vehicle upright is indicated by the effort required by the driver to hold the foot pedal lever in a selected position. When driving with side wheels extended, as driver effort required to hold foot pedal lever extended is lessened, the driver knows from this feedback that the vehicle is approaching dynamic balance. When driver effort required to hold the foot pedal lever is minimized (at the effort level generated by the side wheel retraction system, for example, air spring 132), the driver knows from this feedback that the side wheels can be retracted without affecting vehicle control, and the vehicle will be in dynamic balance.

6. Dynamic balance: The normal driving method employed with bicycles and motorcycles where forward movement makes the two-wheel vehicle more stable and easier to keep from falling over. Steering, primarily, and leaning, secondarily, are the components of the control method for driving in dynamic balance.

7. Held up by side wheels: The driving mode used for stopping and moving slowly where one or both side wheels contact the road, holding the vehicle from falling over.

8. Three-wheel driving mode: When the vehicle loses tire traction in the dynamically-balanced driving mode, the vehicle may fall to the inside of a corner on a retracted side wheel, or to the outside of a corner on a retracted side wheel, and thereafter be supported by the side wheel in a drivable, steerable, three-wheel mode.

9. Motorized side wheelpartial extension and retraction: Using a motor-driven device to partially extend the side wheels, in this case, to replace the first stroke necessary to partially extend the side wheels, such that the effort to extend side wheels is reduced just as in a two-stroke system, while removing the requirement for the driver to stroke the foot pedal lever twice to lower the side wheels.

10. Premature touchdown of side wheels: Retracted side wheel touchdown to the road during cornering disrupting vehicle balance by contacting the road while front and rear wheels are not skidding (front and rear wheel tire traction to the road is intact).

11. Power assist side wheel control: Provides the bulk of the force to extend the side wheels, but still should require some effort within the range of strength of the driver to provide feedback to the driver as to the effort required to extend the side wheels.

12. Transitioning from held upright to dynamic balance: When starting from a stop, the main goal of the driver is to travel in a chosen desired direction. At the same time, the driver desires to retract the side wheels when adequate speed is achieved (five miles per hour, more or less, depending on driver skill) to transition to driving in the dynamically-balanced mode. The side wheels cannot be retracted without affecting the direction of travel of the vehicle unless the side wheels are carrying no weight. This is accomplished by manipulating the side wheels and leaning the vehicle to the angle which dynamic balance requires to occur while driving in the desired direction. At this point, feedback from the foot pedal lever indicates to the driver that no force is required to hold the vehicle up with the side wheels, and the side wheels can therefore be retracted without affecting the direction of vehicle travel.

13. Vehicle lean angle oscillation: The variation in vehicle lean angle during the turning of a corner, more obviously demonstrated by turning a constant radius corner such as a 360-degree circle on a skid pan.

14. Single track vehicle: A bicycle or motorcycle-like vehicle supported by two wheels, a front wheel and a rear wheel, the rear wheel generally following in the track of the front wheel while moving forward, capable of traveling in the dynamically-balanced driving mode.

15. Vehicle lean angle or vehicle tilt angle: The angle between the vertical centerline of the vehicle as viewed from a fore or aft direction and a gravitationally vertical line. The vertical line may be defined by a stationary plumb bob suspended on a string from a stationary point and lying immediately adjacent the road's surface, substantially at the point where the vehicle centerline intersects the road surface. Measurements from side wheels to the road surface cannot be used to establish vehicle lean angles, as distances vary with suspension compression, causing erroneous measurements.

Those skilled in the art will appreciate that various modifications, improvements, and adaptations may be made to the just-described preferred embodiment without departing from the scope and spirit of my invention. Therefore, I do not wish to be understood as limiting myself to the exact details described, but instead wish to cover those modifications that will occur to those skilled in this art upon examining my disclosure and which are properly within the scope of the following claims.

What is claimed is:

1. In combination with a single track vehicle having a driver's seat disposed between a steerable front wheel and a motor-driven rear wheel, the apparatus comprising:

at least a single pair of side wheels;

means including a foot pedal lever pivotally mounted to pivot about a pivot point and having a first end located beneath said pivot point, said first end comprising means for activating said foot pedal lever using a driver's foot to move said foot pedal lever counterclockwise for extending said side wheels to an extended position;

means for moving said foot pedal lever clockwise to a stowed position, said clockwise movement of said foot pedal lever causing retraction of said side wheels to a retracted position; and wherein said means for activating said foot pedal lever includes a foot rest and said apparatus further comprises means for automatically locking the means for activating the foot pedal lever in the stowed position, the locking being releasable only upon driver actuation of said means for activating said foot pedal lever and wherein said means for locking comprises:

a latch lever pivotally mounted on said foot pedal lever and positioned to be engaged and moved by said foot as said foot approaches said foot rest and to be pivoted into contact with said foot rest in response to further movement of said foot;

latch means mounted on said latch lever for engaging a stationary portion of said vehicle and for releasing engagement with said stationary portion in response to movement of said latch lever by said foot;

the rotational directions "clockwise" and "counterclockwise" and the location of said pivot point being determined in a frame of reference wherein said vehicle is viewed from the side parked upright on a surface with the front wheel to the right of the rear wheel.

2. In a single track vehicle having a steering front wheel and a steering system for said steering front wheel, the apparatus comprising:

a pair of retractable side wheels; and means for steering said side wheels and positionally slaving a position of the side wheels to the vehicle steering front wheel steering system such that the side wheel position is dependent on the position of the steering front wheel while the position of the steering front wheel is independent of the side wheel position, and where the positional slaving is such that feedback and friction forces from the side wheels and from the side wheel steering system are isolated from the vehicle steering system.

3. The apparatus of claim 2 wherein said means comprises:

means pivotally mounting each said side wheel and responsive to a driving force for pivoting said side wheels;

steering position detection means for detecting the position of the front steering wheel of the vehicle and for generating a signal indicative thereof; and means responsive to said signal for supplying said driving force to position said side wheel in a position slaved to that of said front steering wheel.

4. The apparatus of claim 3 wherein said means responsive to said signal comprises an electrical stepper motor.

5. The apparatus of claim 4 wherein said means for pivoting said side wheels comprises respective jack screws.

6. The apparatus of claim 3 wherein said means responsive to said signal for supplying said driving force to position said side wheel in a position slaved to that of said front wheel is hydraulically driven.

7. The apparatus of claim 2 wherein said means for steering said side wheels includes:

a cam;

means including tension cable means for establishing a one-to-one positional relationship between the position of said cam and the position of a side wheel;

a switch mount pivotally mounted with respect to said cam; and tension cable means for establishing a one-to-one positional relationship between the driver-selected steering position and the position of said switch mount.

8. In combination with a single track vehicle having a driver's seat disposed between a steerable front wheel and a motor-driven rear wheel, the apparatus comprising:

a pair of retractable side wheels;

means including a foot pedal lever pivotally mounted about a pivot point and having a first end located below said pivot point, said first end comprising means for activating said foot pedal lever using a driver's foot to move said foot pedal lever from a stowed position counterclockwise past the vertical for extending said side wheels to a fully extended position;

means for applying a bias to said foot pedal lever for retracting said side wheels clockwise to a retracted position, the rotational directions "clockwise" and "counterclockwise" and the location of said pivot point being determined in a frame of reference wherein said vehicle is viewed from the side parked upright on a surface with the front wheel to the right of the rear wheel;

means located beneath said pivot point for halting the clockwise wheel-retracting motion of said foot pedal lever, said means for halting being positioned such that said foot pedal lever moves clockwise past the vertical toward the driver's seat to the stowed position where said means for halting causes said foot pedal lever to come to rest; and wherein said means for activating said foot pedal lever includes a foot rest and said apparatus further comprises means for automatically locking the means for activating the foot pedal lever in said stowed position, the locking being releasable only upon driver actuation of said means for activating said foot pedal lever; and wherein said means for automatically locking further comprises:

a latch lever pivotally mounted on said foot pedal lever and positioned to be engaged and moved by said foot as said foot approaches said foot rest and to be pivoted into contact with said foot rest in response to further movement of said foot; and latch means mounted on said latch lever for engaging a stationary portion of said vehicle and for releasing engagement with said stationary portion in response to movement of said latch lever by said foot.

* * * * *